United States Patent
Takeuchi et al.

(10) Patent No.: US 9,796,241 B2
(45) Date of Patent: Oct. 24, 2017

(54) VEHICLE TEMPERATURE CONTROL APPARATUS AND IN-VEHICLE THERMAL SYSTEM

(75) Inventors: Masayuki Takeuchi, Nukata-gun (JP); Hiroshi Kishita, Anjo (JP); Yasumitsu Omi, Okazaki (JP); Nobuharu Kakehashi, Toyoake (JP); Hideaki Okawa, Kariya (JP); Kouji Miura, Okazaki (JP); Michio Nishikawa, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 751 days.

(21) Appl. No.: 14/112,487

(22) PCT Filed: Apr. 6, 2012

(86) PCT No.: PCT/JP2012/002422
§ 371 (c)(1),
(2), (4) Date: Oct. 17, 2013

(87) PCT Pub. No.: WO2012/144151
PCT Pub. Date: Oct. 26, 2012

(65) Prior Publication Data
US 2014/0041826 A1 Feb. 13, 2014

(30) Foreign Application Priority Data

Apr. 18, 2011 (JP) .................................. 2011-091847
Feb. 24, 2012 (JP) .................................. 2012-038731

(51) Int. Cl.
*B60H 1/00* (2006.01)
*B60L 1/02* (2006.01)
(Continued)

(52) U.S. Cl.
CPC ..... *B60H 1/00735* (2013.01); *B60H 1/00899* (2013.01); *B60L 1/003* (2013.01);
(Continued)

(58) Field of Classification Search
CPC . B60H 1/00735; B60H 1/00899; B60L 1/003; B60L 1/02; B60L 1/08; B60L 11/1816; B60L 11/1874; B60L 11/1875
(Continued)

(56) References Cited

U.S. PATENT DOCUMENTS 6,047,770 A 4/2000 Suzuki et al.
6,464,027 B1 * 10/2002 Dage .................... B60H 1/004
123/41.14

(Continued)

FOREIGN PATENT DOCUMENTS

DE 102008062176 A1 6/2010
DE 102009043316 A1 3/2011
(Continued)

OTHER PUBLICATIONS

Office Action dated Apr. 7, 2015 in corresponding Japanese Application No. 2012-038731.
(Continued)

*Primary Examiner* — Jianying Atkisson
*Assistant Examiner* — Raheena R Malik
(74) *Attorney, Agent, or Firm* — Harness, Dickey & Pierce, P.L.C.

(57) ABSTRACT

A vehicle temperature control apparatus for controlling temperature of a temperature control object, which is at least one of inside air of a vehicle compartment and a vehicle component, includes a heat capacitive element capable of storing heat, a refrigeration cycle in which heat is absorbed from a low temperature side and is dissipated to a high temperature side, a heat exchanger that causes the heat
(Continued)

capacitive element to exchange heat with refrigerant of the refrigeration cycle, and a heat dissipation portion which dissipates heat in the refrigerant of the refrigeration cycle to the temperature control object. Thus, a temperature control by using the heat capacitive element can be effectively performed.

20 Claims, 29 Drawing Sheets

(51) Int. Cl.
*B60L 1/00* (2006.01)
*B60L 1/08* (2006.01)
*B60L 11/18* (2006.01)

(52) U.S. Cl.
CPC *B60L 1/02* (2013.01); *B60L 1/08* (2013.01); *B60L 11/1816* (2013.01); *B60L 11/1874* (2013.01); *B60L 11/1875* (2013.01); *B60H 2001/00928* (2013.01); *B60H 2001/00949* (2013.01); *B60L 2240/34* (2013.01); *B60L 2240/36* (2013.01); *B60L 2240/545* (2013.01); *B60L 2240/662* (2013.01); *B60L 2250/12* (2013.01); *B60L 2270/44* (2013.01); *B60L 2270/46* (2013.01); *Y02T 10/7005* (2013.01); *Y02T 10/705* (2013.01); *Y02T 10/7072* (2013.01); *Y02T 10/7291* (2013.01); *Y02T 90/14* (2013.01); *Y02T 90/16* (2013.01)

(58) Field of Classification Search
USPC ........................................................ 165/202
See application file for complete search history.

(56) References Cited

U.S. PATENT DOCUMENTS

| | | | |
|---|---|---|---|
| 8,037,954 B2 | 10/2011 | Taguchi | |
| 2005/0167169 A1* | 8/2005 | Gering | B60H 1/00278 237/12.3 B |
| 2009/0020620 A1* | 1/2009 | Douarre | B60H 1/00278 237/12.3 R |
| 2009/0039831 A1* | 2/2009 | Ichikawa | B60L 11/1816 320/118 |
| 2009/0140698 A1* | 6/2009 | Eberhard | H02J 7/045 320/152 |
| 2010/0089669 A1* | 4/2010 | Taguchi | B60H 1/00257 180/65.1 |
| 2010/0307723 A1* | 12/2010 | Thomas | B60H 1/00278 165/104.33 |
| 2011/0139397 A1 | 6/2011 | Haussmann | |
| 2012/0017637 A1 | 1/2012 | Nakajo et al. | |

FOREIGN PATENT DOCUMENTS

| | | |
|---|---|---|
| EP | 1 057 668 A2 | 12/2000 |
| JP | 05-178070 A | 7/1993 |
| JP | 2000-059918 A | 2/2000 |
| JP | 2002-352867 A | 12/2002 |
| JP | 2004-345391 A | 12/2004 |
| JP | 2005-306300 A | 11/2005 |
| JP | 2006-321269 A | 11/2006 |
| JP | 2007-022452 A | 2/2007 |
| JP | 2010-023527 A | 2/2010 |
| JP | 2010-159008 | 7/2010 |
| JP | 2010-268683 A | 11/2010 |

OTHER PUBLICATIONS

International Search Report and Written Opinion of the ISA for PCT/JP2012/002422, ISA/JP, mailed Jul. 3, 2012.

* cited by examiner (a)

(b)

(a) FIRST MODE (b) SECOND MODE

VEHICLE TEMPERATURE CONTROL APPARATUS AND IN-VEHICLE THERMAL SYSTEM

CROSS REFERENCE TO RELATED APPLICATION

The application is a 371 U.S. National Phase of PCT/JP2012/002422, filed Apr. 6, 2012, based on Japanese Patent Applications No. 2011-091847 filed on Apr. 18, 2011 and No. 2012-038731 filed on Feb. 24, 2012, the contents of which are incorporated herein by reference in their entirety.

FIELD OF THE INVENTION

The present invention relates to a vehicle temperature control apparatus which performs a temperature control of at least one of air in a vehicle compartment and a component in a vehicle, and an in-vehicle thermal system.

BACKGROUND OF THE INVENTION

Conventionally, in electrically-driven vehicles such as an electric vehicle, a hybrid vehicle and the like, a motor is used to drive those vehicles by using an electric energy supplied from a battery or the like. The electric energy required for air-conditioning in the vehicle is also supplied from the battery. Thus, in summer and in winter during which a large amount of energy is required for the air conditioning, a cruising range of the electric vehicle may decrease.

For avoiding such a drawback, for example, patent document 1 proposes a technique that stores heat (i.e., thermal energy) in a heat storage device or in a cold storage device for using the stored heat during a vehicle running. However, in such technique, a large amount of a heat storage material or a cold storage material is required, thereby causing an increased vehicle weight or a large installation space in the vehicle.

Therefore, for example, patent documents 2 to 4 propose a technique of using heat capacitive elements such as a battery for storing heat (i.e., thermal energy), instead of using the cold storage device or the heat storage device.

In the patent document 2, a heating assist technique is disclosed in which the heat generated by a battery is introduced into the vehicle compartment and the introduced heat is used for assisting a heating capacity.

The patent documents 3 and 4 describe about a heating/warming up of a battery and a heat storage in the battery by utilizing a heat generation due to a resistance of the battery in a battery charging time as well as utilizing a switching element that serves as a heat generation facilitation device. Further, there are described that conditioned air in, for example, a house is sent to a battery through a hose or the like, so as to control a battery temperature. In addition, there are described that a cold storage material is contained in a container of a battery to store a cold energy (i.e., a cool air energy) by using a refrigeration cycle in the battery charging time, and then to cool air inside the vehicle compartment through a coolant in a vehicle running.

According to the conventional art of the patent documents 2, the heat generated by the battery in the vehicle running and the battery charging time is used for heating. However, such heating capacity may be difficult to be obtained because it does not necessarily provide sufficient energy for heating the vehicle compartment especially in winter during which temperature difference between the battery temperature and the temperature of the inside air in the vehicle compartment is not large enough for providing a required amount of heat.

Although, the patent documents 2 provides a configuration of how to use the introduced heat for heating, it is silent about how to, for example, use the cold energy that is stored in the cold storage device such as a battery for cooling the air. Further, in the patent document 2, although heat generated by the battery at the vehicle running time and at the battery charging time is used for air-conditioning, a positive use of the battery for storing the heat energy and the cooling energy is not disclosed. That is, the heat capacity of a large capacity battery is not fully utilized in the patent document 2.

According to the conventional art of the patent documents 3 and 4, in addition to the same problem as the conventional art of the above-mentioned patent document 2, a temperature difference between the battery temperature and an inside air temperature of the vehicle compartment is also not sufficient in a cooling operation, which leads to an insufficient cooling capacity of the cooling operation. Further, even when the in-house air is introduced to the vehicle, the same problem of insufficient temperature difference is caused, and thereby it may difficult to obtain a sufficient heating/cooling capacity. Further, for the air introduction directly into the vehicle from the house, a hose is required, thereby complicating the structure of such system.

Further, although the patent documents 3 and 4 describe a method of how heat (i.e., thermal energy) at the charging time is stored in the battery (i.e., heat capacitive elements), the patent documents 3 and 4 fail to describe a method of how a remaining heat in the vehicle is stored in a running-related component such as a battery or the like. Further, although the patent documents 3 and 4 have a description about a control flow of pre-air-conditioning, the control flow for accumulating heat (i.e., thermal energy) in a battery (i.e., heat capacitive elements) is not disclosed.

PRIOR ART DOCUMENT

Patent Document

Patent Document 1: Japanese Unexamined Patent Publication No. 2000-059918
Patent Document 2: Japanese Unexamined Patent Publication No. H5-178070
Patent Document 3: Japanese Unexamined Patent Publication No. 2008-92696
Patent Document 4: Japanese Unexamined Patent Publication No. 2010-268683

SUMMARY OF THE INVENTION

In view of the forgoing points, it is a first object of the present disclosure to provide a vehicle temperature control apparatus for effectively controlling temperature by utilizing heat capacitive elements. Further, it is a second objective of the present disclosure to provide an in-vehicle thermal system that reduces a required drive power for an air-conditioning in a vehicle compartment by utilizing a cold energy that is stored in a secondary battery.

According to a first aspect of the present disclosure, a vehicle temperature control apparatus for controlling temperature of a temperature control object, which is at least one of an inside air of a vehicle compartment and a vehicle component, includes a heat capacitive element that is capable of storing or building up heat, a refrigeration cycle that absorbs heat from a low temperature side and dissipates heat to a high temperature side, a heat exchanger that causes the heat capacitive element to exchange heat with a refrigerant of the refrigeration cycle, and a heat dissipation portion that dissipates heat in the refrigerant of the refrigeration cycle to the temperature control object.

According to the above, since the heat exchanger exchanges heat between the heat capacitive element and the refrigerant of the refrigeration cycle, the heat stored in the heat capacitive element can be effectively utilized even when a temperature difference between the heat capacitive element and the temperature control object is small. Therefore, temperature control can be effectively performed by utilizing the heat capacitive element. In the present disclosure, "heat" means both of hot energy and cold energy.

According to a second aspect of the present disclosure, a vehicle temperature control apparatus for controlling temperature of a temperature control object, which is at least one of inside air of a vehicle compartment and a vehicle component, includes: a heat capacitive element that is capable of storing or building up heat; a heat dissipation portion that dissipates heat in the heat capacitive element to the temperature control object; an interrupter that interrupts and resumes heat stored in the heat capacitive element and heat dissipation from the heat capacitive element to the temperature control object; and a controller that controls the interrupter based on a determination result of heat storage requirement whether the heat capacitive element is required to store heat therein. Further, when the controller determines that the heat capacitive element is required to store heat, the controller controls the interrupter so that heat is firstly stored in the heat capacitive element and then the stored heat in the heat capacitive element is dissipated to the heat temperature control.

Accordingly, the heat storage control for storing heat in the heat capacitive element and for dissipating heat from the heat capacitive element to the heat control object is appropriately performed, thereby enabling an effective temperature control by utilizing the heat capacitive element.

According to a third aspect of the present disclosure, an in-vehicle thermal system includes: a battery heat exchanger for exchanging heat between a secondary battery and a cooling fluid; a refrigerant-cooling heat exchanger which cools, by using the cooling fluid, a refrigerant that flows from a condenser to a decompression device in a refrigeration cycle of an air-conditioning device; a pump which circulates the cooling fluid between the battery heat exchanger and the refrigerant-cooling heat exchanger; a bypass passage which guides the cooling fluid discharged from the battery heat exchanger to an inlet side of the battery heat exchanger by bypassing the refrigerant-cooling heat exchanger; a first valve which opens a passage between (i) one of the bypass passage and the refrigerant-cooling heat exchanger and (ii) the battery heat exchanger, and closes a passage between (iii) the other one of the bypass passage and the refrigerant-cooling heat exchanger and (iv) the battery heat exchanger; a cooler which cools the cooling fluid; a first controller which controls the first valve to cool the cooling fluid by the cooler, and to form a closed circuit for circulating the cooling fluid through the battery heat exchanger, the bypass passage, and the pump by opening the passage between the bypass passage and the battery heat exchanger when the secondary battery is charged by a charger; a first temperature obtaining portion which obtains temperature of the cooling fluid; a second temperature obtaining portion which obtains temperature of the refrigerant that flows from the condenser to the decompression device; a first determination portion which determines whether temperature obtained by the first temperature obtaining portion is lower than temperature obtained by the second temperature obtaining portion; and a second controller which controls the first valve to form a closed circuit for circulating the cooling fluid through the battery heat exchanger, the refrigerant-cooling heat exchanger and the pump, by opening a passage between the battery heat exchanger and the refrigerant-cooling heat exchanger, when the first determination portion determines that the temperature obtained by the first temperature obtaining portion is lower than the temperature obtained by the second temperature obtaining portion after the first controller is operated.

In this case, when the secondary battery is charged, the cooler cools the cooling fluid and the closed circuit is formed for the circulation of the cooling fluid through the battery heat exchanger, the bypass passage and the pump. Therefore, the cold energy is stored in the cooling fluid and in the secondary battery. Then, after completion of charging of the secondary battery, a closed circuit is formed to circulate the cooling fluid through the battery heat exchanger, the refrigerant-cooling heat exchanger, and the pump. Therefore, the refrigerant is cooled by the refrigerant-cooling heat exchanger with the cold energy stored in the cooling fluid and in the battery. Thus, the degree of supercooling of the refrigerant which comes out from the condenser is increased, and the efficiency of the air-conditioning device is improved. Thus, the energy for driving the compressor which constitutes the air-conditioning device is reduced. As a result, a power required for the inside air-conditioning of the vehicle compartment is reduced by using the cold energy stored in the secondary battery.

DETAILED DESCRIPTION OF THE PREFERRED EMBODIMENTS

First Embodiment

Figure 1:
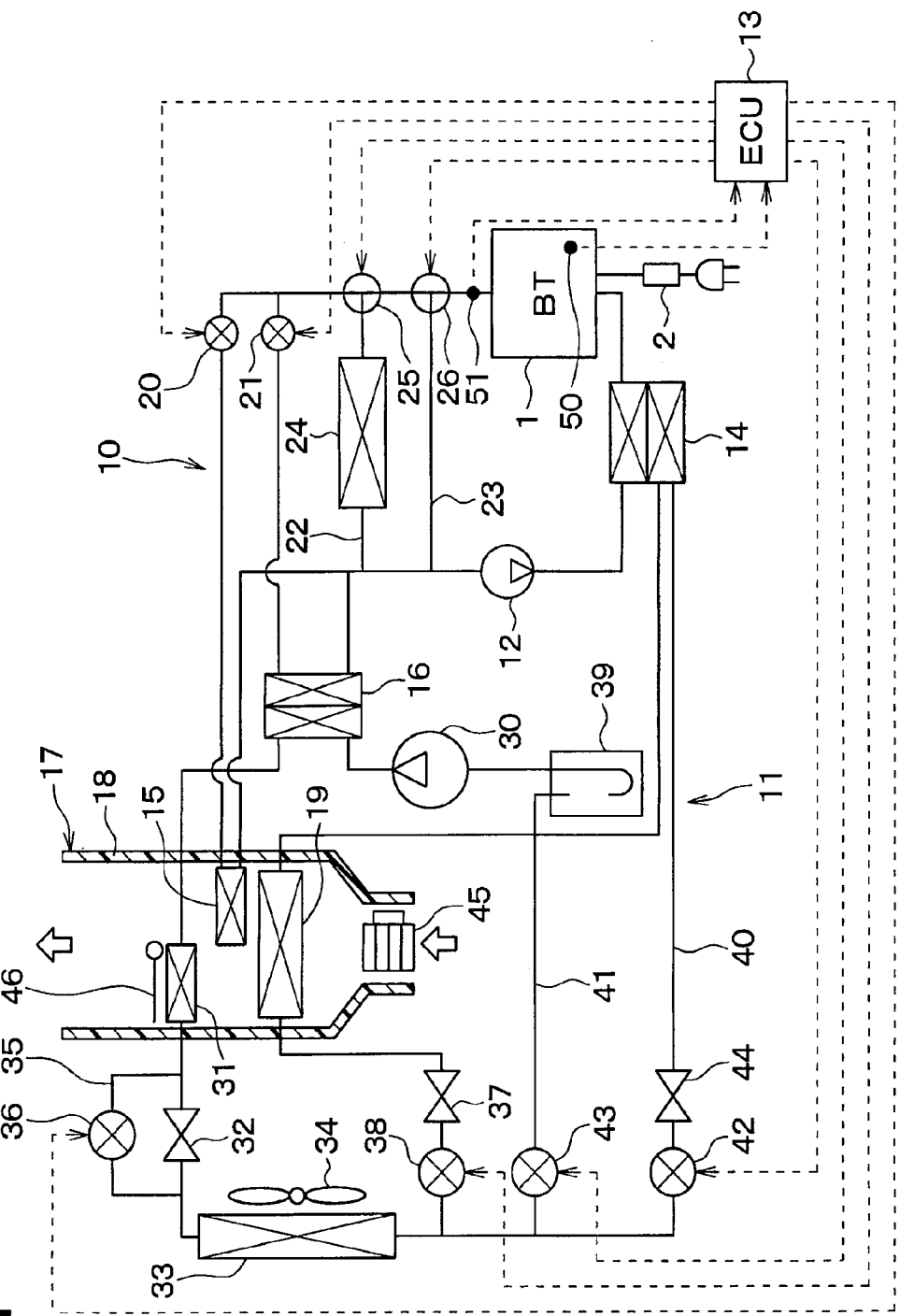
FIG. 1 is an overall schematic diagram of a temperature control apparatus for vehicles in a first embodiment.

The first embodiment is described in the following. FIG. 1 is an overall schematic diagram of a temperature control apparatus for vehicles in the present embodiment. The temperature control apparatus for vehicles in the present embodiment is used as a vehicular air-conditioner, and uses air in a vehicle compartment as a temperature control object.

Specifically, the temperature control apparatus for vehicles in the present embodiment is used as a vehicular air-conditioner of a plug-in hybrid vehicle (i.e., an electric vehicle). The plug-in hybrid vehicle is a vehicle which can charge an electric power supplied from an external power supply (i.e., a commercial power supply) at a time of stop of the vehicle to a secondary battery (i.e., a high-voltage battery), from among hybrid vehicles that derive a drive power for a travel of the vehicle from both of an internal combustion engine and an electric motor for a travel of the vehicle.

In addition, the temperature control apparatus for vehicles in the present embodiment may be usable in various types of vehicles by modifying it. That is, the temperature control apparatus is not only used for the plug-in hybrid vehicles but also used for hybrid vehicles in which the secondary battery is charged by a drive power of an engine (i.e., electrically-driven vehicles), used for electric vehicles that are not equipped with the engine (i.e., electrically-driven vehicles), and used for vehicles that are not equipped with a motor that is used to drive the vehicle (i.e., non-electrically-driven vehicles).

The temperature control apparatus for vehicles is equipped with a battery coolant circuit 10 (i.e., a heat transport part) and a refrigeration cycle 11 (i.e., a heat pump cycle).

The battery coolant circuit 10 is a circuit through which a coolant (i.e., a battery cooling water) for cooling a secondary battery 1 (i.e., an electricity storage device) circulates. The secondary battery 1 supplies the electric power to the electric motor that is used for vehicle running. In this example, a lithium ion battery is used as the secondary battery 1.

The secondary battery 1 is connectable to a charger 2. The charger 2 is used when charging the secondary battery 1 with electric power supplied from an external power source (i.e., an external power).

In the present embodiment, the secondary battery 1 is used also as a heat capacitive element (i.e., a heat mass, a heat accumulation element) which can store/accumulate heat (e.g., a heat energy and a cold energy), and the secondary battery 1 is heated or is cooled with the coolant that circulates through the battery coolant circuit 10.

The battery coolant circuit 10 includes a battery cooling water pump 12 which circulates the coolant in the circuit 10. The battery cooling water pump 12 is implemented as an electric water pump, and the number of rotations (i.e., a flow amount of coolant) of the battery cooling water pump 12 is controlled by a control signal outputted from a controller 13.

A first coolant-refrigerant heat exchanger 14 (i.e., a heat exchanger) is connected to a coolant outlet side of the battery cooling water pump 12 and to a coolant inlet side of the secondary battery 1. The first coolant-refrigerant heat exchanger 14 is a heat exchanger that performs heat exchange between the coolant of the battery coolant circuit 10 and a low-pressure side refrigerant of the refrigeration cycle 11.

A heater core 15 (heat dissipation portion) and a second coolant-refrigerant heat exchanger 16 (i.e., a heat exchanger) are connected in parallel to a coolant outlet side of the secondary battery 1 and to a coolant inlet side of the battery cooling water pump 12.

The heater core 15 is disposed in an inside of an air-conditioning case 18 of an interior air-conditioning unit 17, which is a heat exchanger that exchanges heat between the coolant of the battery coolant circuit 10 and, air having passed through an interior evaporator 19 of the refrigeration cycle 11 and to be blown into the vehicle compartment. A flow of the coolant flowing to the heater core 15 is interrupted and resumed by a first electromagnetic valve 20 (i.e., a switch unit, an interrupter).

The second coolant-refrigerant heat exchanger 16 is a heat exchanger that exchanges heat between the coolant of the battery coolant circuit 10 and a high-pressure side refrigerant of the refrigeration cycle 11. A flow of the coolant to the second coolant-refrigerant heat exchanger 16 is interrupted and resumed by a second electromagnetic valve 21 (i.e., a switch unit, an interrupter).

Further, a first bypass coolant passage 22 and a second bypass coolant passage 23 are connected in parallel, to a coolant outlet side of the secondary battery 1. The first bypass coolant passage 22 and the second bypass coolant passage 23 respectively allow the coolant that flows out from the secondary battery 1 to bypass the heater core 15 and the second coolant-refrigerant heat exchanger 16 and to flow to a coolant inlet side of the battery cooling water pump 12.

The first bypass coolant passage 22 is provided with a battery cooling radiator 24 therein. The battery cooling radiator 24 is a heat exchanger that dissipates heat from the coolant that flows in an inside of the radiator 24 to outside air so as to cool the coolant.

A first three-way valve 25 is disposed at an inlet part of the first bypass coolant passage 22 for switching a coolant passage. At an inlet part of the second bypass coolant passage 23, a second three-way valve 26 (i.e., a switch unit, an interrupter) for switching a coolant passage is disposed.

The opening/closing operations of the first and second electromagnetic valves 20 and 21 and the first and second three-way valves 25 and 26 are controlled by a control signal that is output from the controller 13.

The refrigeration cycle 11 is a heat cycle device which absorbs heat from a low temperature side and dissipates heat to a high temperature side, and provides a function to cool or heat air that is to be sent into the vehicle compartment used as an air-conditioning object space. In the present embodiment, the refrigeration cycle 11 functions also as a heat generation unit which generates heat (i.e., a heat energy and/or a cold energy) that is accumulated in the secondary battery 1.

Among components of the refrigeration cycle 11, a compressor 30 is a device that sucks, compresses, and discharges a refrigerant, and is disposed in, for example, a space under a hood of the vehicle. In this example, the compressor 30 is an electric compressor which accommodates a compression mechanism and an electric motor in an inside of a housing that forms an outer shell of the compressor 30.

An operation (i.e., the number of rotations) of the electric motor of the compressor 30 is controlled according to a control signal that is outputted from the controller 13, and a refrigerant discharge capacity of the compressor 30 is changed by such control of the number of rotations. The electric motor may be an AC motor or a DC motor.

The compression mechanism of the compressor 30 may be implemented in various forms, such as a scrolled-type compression mechanism, a vane-type compression mechanism, a rolling piston type compression mechanism, or the like.

A refrigerant inlet side of the second coolant-refrigerant heat exchanger 16 is connected to a discharge side of the compressor 30. A refrigerant inlet side of an interior condenser 31 (i.e., a heat dissipation portion) is connected to a refrigerant outlet side of the second coolant-refrigerant heat exchanger 16. The interior condenser 31 is disposed in the air-conditioning case 18 of the interior air-conditioning unit 17 at a downstream side of the heater core 15 in an air flow sent into the vehicle compartment, and serves as a refrigerant radiator which radiates heat from the high-pressure refrigerant that is discharged from the compressor 30 to heat the air having passed through the interior evaporator 19 and blown into the vehicle compartment.

A refrigerant inlet side of a first expansion valve 32 is connected to a refrigerant outlet side of the interior condenser 31. The first expansion valve 32 decompresses the high-pressure refrigerant flowing out of the interior condenser 31 to provide an intermediate pressure refrigerant.

A refrigerant inlet side of an exterior heat exchanger 33 is connected to a refrigerant outlet side of the first expansion valve 32. The exterior heat exchanger 33 is disposed in a space under a hood of the vehicle, and exchanges heat between the low-pressure refrigerant flowing therein and outside air that is blown by a blower fan 34. The operation (i.e., the air blowing amount) of the blower fan 34 is controlled by a control signal which is outputted from the controller 13.

In a heating mode (i.e., a heating operation), the exterior heat exchanger 33 functions as an evaporator which evaporates the low-pressure refrigerant, and, in a cooling mode (i.e., a cooling operation), the exterior heat exchanger 33 functions as a refrigerant radiator that dissipates heat from the high-pressure refrigerant.

Further, an expansion valve bypass passage 35, which guides a refrigerant that flows out from the interior condenser 31 to a refrigerant inlet side of the exterior heat exchanger 33 while bypassing the first expansion valve 32, is connected to a refrigerant outlet side of the interior condenser 31. The expansion valve bypass passage 35 is opened and closed by a first electromagnetic refrigerant valve 36.

A refrigerant inlet side of a second expansion valve 37 is connected to the refrigerant outlet side of the exterior heat exchanger 33. The second expansion valve 37 is a decompression device that decompresses the refrigerant that flows out from the exterior heat exchanger 33 in the cooling mode. The refrigerant inlet side of the second expansion valve 37 is opened and closed by a second electromagnetic refrigerant valve 38.

A refrigerant inlet side of the interior evaporator 19 is connected to an outlet side of the second expansion valve 37. Therefore, a decompressed refrigerant that is decompressed by the second expansion valve 37 flows into the interior evaporator 19.

The interior evaporator 19 is disposed within the air-conditioning case 18 of the interior air-conditioning unit 17 at an upstream side in a flow direction of air with respective to the heater core 15 and the interior condenser 31, and cools the air in the cooling mode by evaporating the refrigerant therein and by causing a heat absorption effect.

An inlet side of an accumulator 39 is connected to an outlet side of the interior evaporator 19. The accumulator 39 is a low-pressure side gas-liquid separator in which gas and liquid of the refrigerant flowing therein are separated from each other and a surplus refrigerant is stored therein. A suction side of the compressor 30 is connected to a gaseous phase refrigerant outlet of the accumulator 39.

Further, a first bypass refrigerant passage 40 and a second bypass refrigerant passage 41, which guide the refrigerant that flows out of the exterior heat exchanger 33 to the inlet side of the accumulator 39 while bypassing the second expansion valve 37 and the interior evaporator 19, are connected in parallel to the refrigerant outlet side of the exterior heat exchanger 33.

The first bypass refrigerant passage 40 is opened and closed by a third electromagnetic refrigerant valve 42. The second bypass refrigerant passage 41 is opened and closed by a fourth electromagnetic refrigerant valve 43.

A third expansion valve 44 is disposed in the first bypass refrigerant passage 40. The third expansion valve 44 is a decompression device which decompresses the refrigerant which has flowed out from the exterior heat exchanger 33. The first coolant-refrigerant heat exchanger 14 is disposed at a refrigerant outlet side of the third expansion valve 44 in the first bypass refrigerant passage 40.

The opening/closing operation of the first to fourth electromagnetic refrigerant valves 36, 38, 42, 43 is controlled by a control signal which is output from the controller 13.

The interior air-conditioning unit 17 is described in the following. The interior air-conditioning unit 17 is disposed in an inside of a dash board (i.e., an instrument panel) at a frontmost part of the vehicle, and includes the air-conditioning case 18 that forms an outer shell of the interior air-conditioning unit 17 and that provides an air passage through which air flows into the vehicle compartment. Further, in such air passage of the air-conditioning case 18, an air blower 45, the interior evaporator 19, the heater core 15, and the interior condenser 31 are housed.

On a most upstream side of an air flow in the air-conditioning case 18, an inside/outside air switching device (not illustrated) which selectively introduces outside air (air outside of the vehicle compartment) or/and inside air (i.e., air inside of the vehicle compartment) is disposed. The inside/outside air switching device variably adjusts an open area of an inside air introduction hole and an open area of an outside air introduction hole by using an inside/outside air switching door, for continuously adjusting a ratio of an amount of the inside air and an amount of the outside air.

At a downstream side of an air flow in the inside/outside air switching device, the air blower 45 is disposed to blow air drawn through the inside/outside air switching device into the vehicle compartment. The air blower 45 is an electric blower which drives a centrifugal multi-blade fan (i.e., a sirocco fan) by an electric motor, and the number of rotations (i.e., an air blowing amount) is controlled by a control voltage that is outputted from the controller 13.

On a downstream side of an air flow from the air blower 45, the interior evaporator 19, the heater core 15, and the interior condenser 31 are disposed along an air flow direction in this order.

In the air-conditioning case 18, there is provided with a bypass passage that guides the air having passed through the interior evaporator 19 to bypass the heater core 15, and a bypass passage that guides the air to bypass the interior condenser 31.

Further, in an inside of the air-conditioning case 18, an air amount adjustment door 46 that adjusts a flow amount of air that passes through the interior condenser 31 is provided. The air amount adjustment door 46 is driven by a servo motor which is not illustrated, and an operation of the servo motor is controlled by a control signal which is output from the controller 13.

At a most downstream position of an air flow in the air-conditioning case 18, an opening is provided through which the air having passed through the interior evaporator 19, the heater core 15 and the interior condenser 31 is blown into the vehicle compartment which is a cooling object space to be cooled. As such opening, not-illustrated various openings are provided, such as a defroster opening that blows air-conditioned air against an inner surface of a vehicle's front windshield, a face opening that blows air-conditioned air toward an upper body of an occupant in the vehicle compartment, a foot opening that blows air-conditioned air toward a foot area of the occupant, together with other openings.

Although not illustrated, a defroster door which adjusts an opening area of the defroster opening is disposed at the defroster opening, and a face door which adjusts an opening area of the face opening is disposed at the face opening, and a foot door which adjusts an opening area of the foot opening is disposed at the foot opening.

These doors, i.e., the defroster door, the face door, and the foot door constitute an outlet mode switching device which switches an outlet mode, and are driven by a servo motor (which is not illustrated) through a linkage mechanism or the like. The operation of the servo motor is controlled by a control signal which is output from the controller 13.

Further, the defroster opening, the face opening, and the foot opening are connected to a defroster air outlet port, a face air outlet port, and a foot air outlet port which are provided in the vehicle compartment, through ducts which form air passages, respectively.

Next, the electric control part of the present embodiment will be described. The controller 13 is configured by a well-known microcomputer and its peripheral circuit, including a CPU, a ROM, a RAM, etc, and performs various operations and processings based on an air-conditioning control program that is memorized in the ROM, for the control of the operation of various control apparatuses (i.e., the battery cooling water pump 12, the first and second electromagnetic valves 20, 21, the first and second three-way valves 25, 26, the compressor 30, the first to fourth electromagnetic refrigerant valves 36, 38, 42, 43, the air blower 45 etc.) that are connected to an output side of the controller 13.

An input side of the controller 13 is connected to a battery temperature sensor 50 which detects temperature of the secondary battery 1, and is also connected to a battery coolant temperature sensor 51 which detects a coolant temperature on an outlet side of the secondary battery 1.

Further, the input side of the controller 13 is connected to a group of various sensors that are used for air-conditioning, such as an inside air sensor that detects temperature of the vehicle compartment, an outside air sensor that detects temperature of the outside air, a solar radiation sensor that detects an amount of solar radiation entering an inside of the vehicle compartment, an evaporator temperature sensor that detects a temperature of air that is blown out from the interior evaporator 19 (i.e., an evaporator temperature), a discharge pressure sensor that detects a pressure of the high-pressure refrigerant that is discharged from the compressor 30, and a suction pressure sensor that detects a pressure of suction refrigerant that is sucked by the compressor 30.

Further, the input side of the controller 13 is connected to an operation panel (not illustrated) disposed at a proximity of the instrument board at a front part of the vehicle compartment, into which an operation signal is input from various air-conditioning operation switches that are disposed on the operation panel. Various air-conditioning operation switches disposed on the operation panel may include, for example, an operation switch of the vehicular air conditioner, a room temperature set switch which sets up a vehicle compartment temperature, a selection switch that selects a cooling mode or a heating mode, and the like.

In addition, the controller 13 is a device that is formed as an integrated body of many control parts, each of which controls an operation of one of the various air-conditioning apparatuses. However, the control part for each of the various air-conditioning apparatuses may be provided as an individual part that has a separate body from the controller 13.

The operation of the above-described configuration is described. First, an operation in winter is described based on FIGS. 2 to 5. In FIGS. 2 to 5, a flow of the refrigerant is indicated by a thick solid line in each of the operation states. Further, in FIGS. 2 to 5, the details of the controller 13 are omitted for the purpose of illustration.

Figure 2:
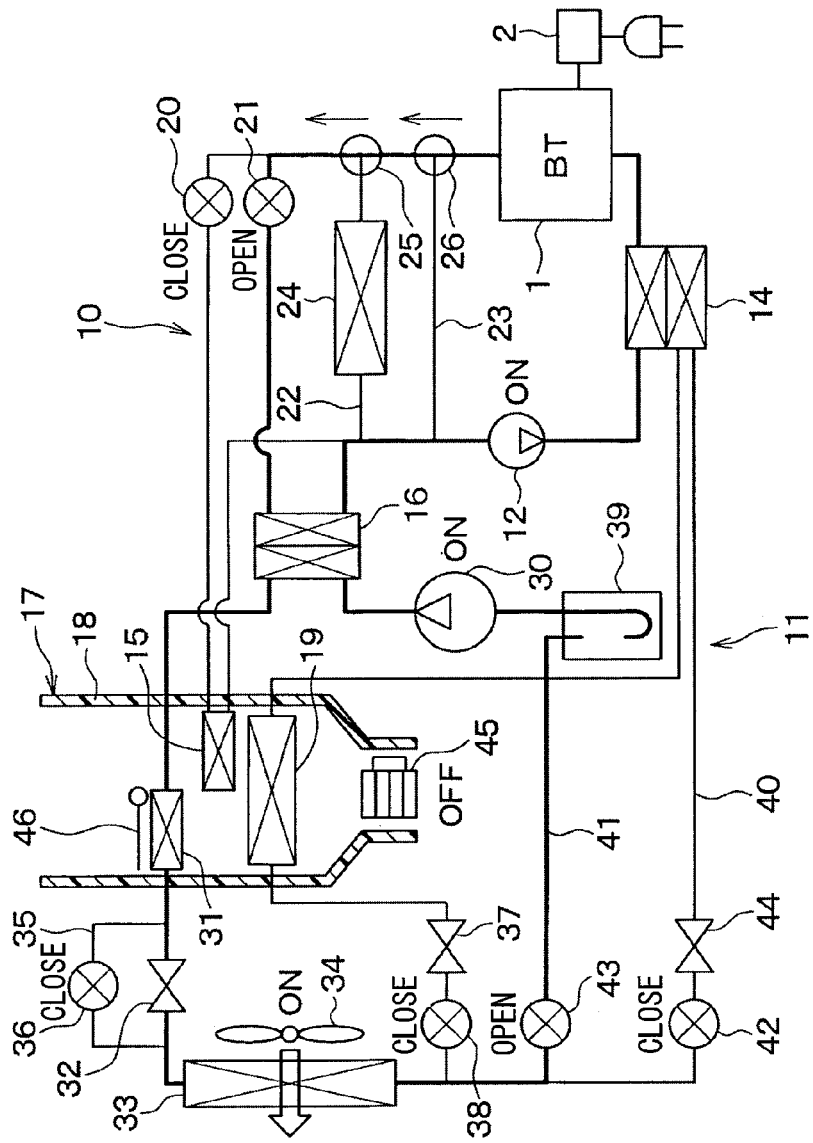
FIG. 2 is a diagram for explaining an operation of the temperature control apparatus for vehicles at a charging time in winter in the first embodiment.

FIG. 2 shows an operation at a charging time in winter, when the secondary battery 1 is connected to an external power supply. At the charging time in winter, the compressor 30 is driven by the electric power supplied from an external power supply (i.e., an external power), and the heat energy generated by the refrigeration cycle 11 (i.e., a heat pump cycle) is transferred to the battery coolant circuit 10 through the second coolant-refrigerant heat exchanger 16, for heating the secondary battery 1.

More specifically, at the charging time in winter, the controller 13 controls the battery cooling water pump 12, the first and second electromagnetic valves 20, 21, and the first and second three-way valves 25, 26, so that the coolant of the battery coolant circuit 10 circulates from the first water pump 12 to the first coolant-refrigerant heat exchanger 14 to the secondary battery 1 to the second coolant-refrigerant heat exchanger 16 and then back to the battery cooling water pump 12 in this order.

Further, at the charging time in winter, the controller 13 controls the compressor 30 and the first to fourth electromagnetic refrigerant valves 36, 38, 42, 43, so that the refrigerant of the refrigeration cycle 11 circulates from the compressor 30 to the second coolant-refrigerant heat exchanger 16 to the interior condenser 31 to the first expansion valve 32 to the exterior heat exchanger 33 to the accumulator 39 and then back to the compressor 30 in this order. At such time, the compressor 30 is driven by the external power.

Further, at the charging time in winter, the controller 13 operates the blower fan 34 (ON), and stops the air blower 45 (OFF).

In such manner, the refrigeration cycle 11 absorbs heat from the exterior heat exchanger 33, and dissipates heat from the second coolant-refrigerant heat exchanger 16, so that the battery coolant circuit 10 heats the secondary battery 1 with the heat dissipated from the second coolant-refrigerant heat exchanger 16. As a result, the heat energy is stored in the secondary battery 1.

Figure 3:
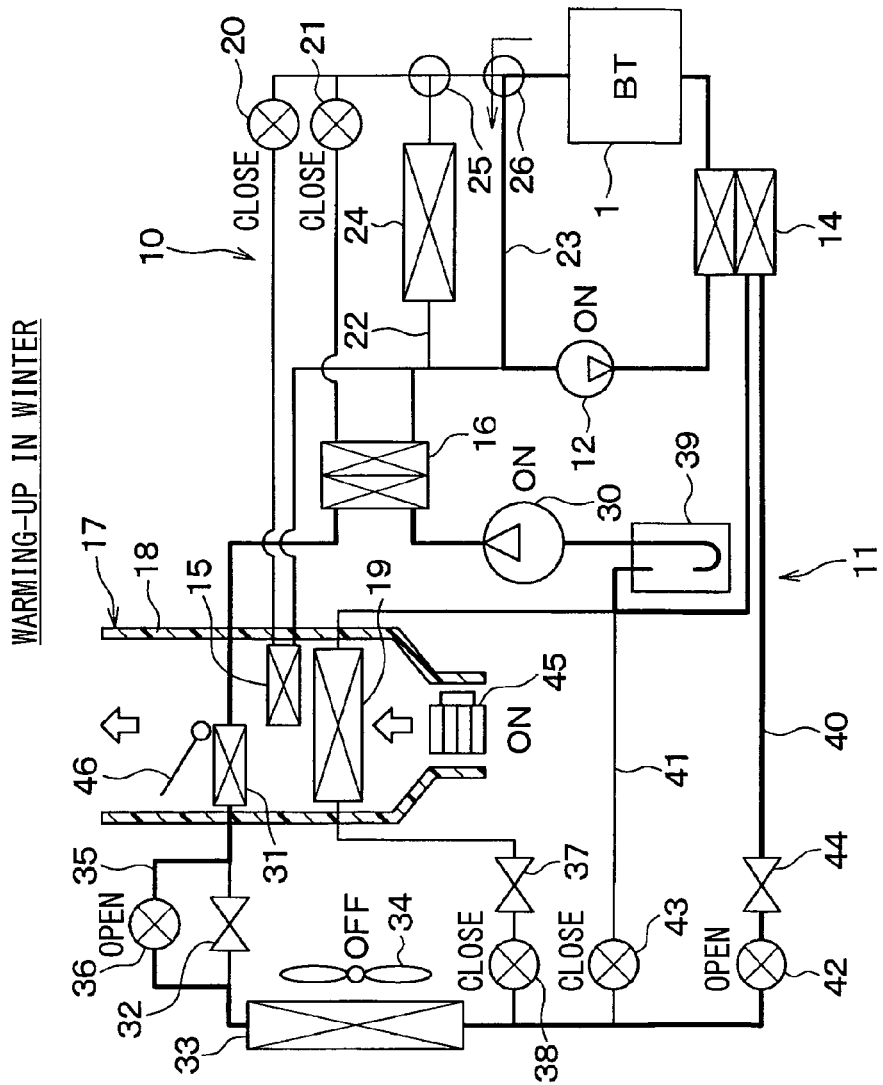
FIG. 3 is a diagram for explaining an operation of the temperature control apparatus for vehicles at a warming-up time in winter in the first embodiment.

FIG. 3 shows an operation at a warming-up time in winter (i.e., immediately after a start of the heating operation). In the warming-up operation in winter, the heat energy stored in the secondary battery 1 at the charging time is exchanged to a heat absorption side of the refrigeration cycle 11.

More specifically, in the warming-up time in winter, the controller 13 controls the battery cooling water pump 12, the first and second electromagnetic valves 20, 21, and the first and second three-way valves 25, 26, so that the coolant of the battery coolant circuit 10 circulates from the first water pump 12 to the first coolant-refrigerant heat exchanger 14 to the secondary battery 1 to the second bypass coolant passage 23 and then back to the battery cooling water pump 12 in this order.

Further, in the warming-up time in winter, the controller 13 controls the compressor 30 and the first to fourth electromagnetic refrigerant valves 36, 38, 42, 43, so that the refrigerant of the refrigeration cycle 11 circulates from the compressor 30 to the second coolant-refrigerant heat exchanger 16 to the interior condenser 31 to the expansion valve bypass passage 35 to the exterior heat exchanger 33 to the third expansion valve 44 to the first coolant-refrigerant heat exchanger 14 to the accumulator 39 and then back to the compressor 30 in this order.

Further, in the warming-up operation in winter, the controller 13 stops the blower fan 34 (OFF), operates the air blower 45 (ON), and opens the air amount adjustment door 46.

In such manner, the battery coolant circuit 10 dissipates the heat energy stored in the secondary battery 1 to the heat absorption side of the refrigeration cycle 11 through the first coolant-refrigerant heat exchanger 14, and the refrigeration cycle 11 dissipates heat, which is received at the first coolant-refrigerant heat exchanger 14, from the interior condenser 31 to heat the inside air (i.e., the air blown by the air blower 45).

Figure 4:
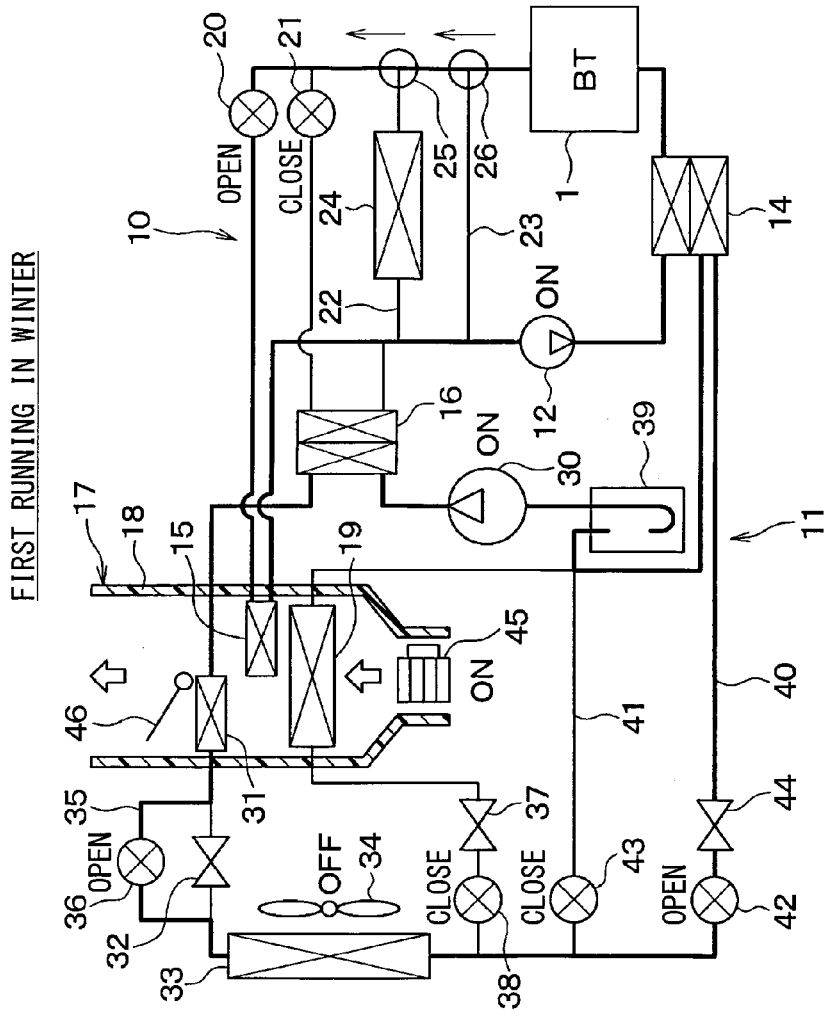
FIG. 4 is a diagram for explaining an operation of the temperature control apparatus for vehicles at a first running time in winter in the first embodiment.

FIG. 4 shows an operation at a first running time in winter, after warming-up. When the vehicle compartment is heated to some degree by the operation in the warming-up time, the heat stored in the secondary battery 1 at the charging time is used for both of the heat exchange with the heat absorption side of the refrigeration cycle 11 and the heat exchange in the heater core 15.

More specifically, at the first running time in winter, the controller 13 controls the battery cooling water pump 12, the first and second electromagnetic valves 20, 21, and the first and second three-way valves 25, 26, so that the coolant of the battery coolant circuit 10 circulates from the first water pump 12 to the first coolant-refrigerant heat exchanger 14 to the secondary battery 1 to the heater core 15 and then back to the battery cooling water pump 12 in this order.

Further, at the first running time in winter, the controller 13 controls the compressor 30 and the first to fourth electromagnetic refrigerant valves 36, 38, 42, 43 so that the refrigerant of the refrigeration cycle 11 circulates in the same order as that of the warming-up time.

Further, at the first running time in winter, the controller 13 stops the blower fan 34 (OFF), operates the air blower 45 (ON), and opens the air amount adjustment door 46.

In such manner, since the battery coolant circuit 10 dissipates the heat energy that is stored in the secondary battery 1 to the heat absorption side of the refrigeration cycle 11 through the first coolant-refrigerant heat exchanger 14, and dissipates the heat energy through the heater core 15 respectively, so that the air to be blown into the vehicle compartment is heated at both of the interior condenser 31 and the heater core 15.

Figure 5:
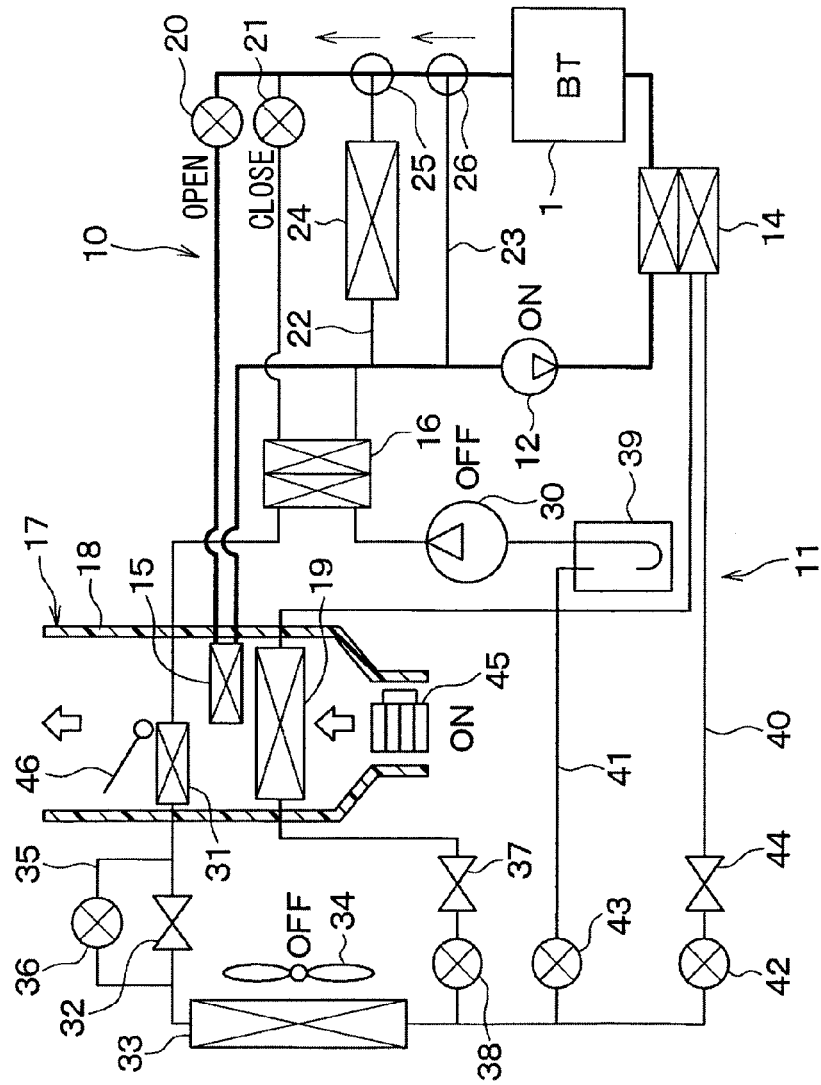
FIG. 5 is a diagram for explaining an operation of the temperature control apparatus for vehicles at a second running time in winter in the first embodiment.

FIG. 5 shows an operation at a second running time in winter. When the vehicle compartment is heated further by the operation at the first running time, heat stored in the secondary battery 1 at the charging time is used for the heat exchange in the heater core 15, but heat is not used for the heat exchange at the heat absorption side of the refrigeration cycle 11.

More specifically, at the second running time in winter, the controller 13 controls the battery cooling water pump 12, the first and second electromagnetic valves 20 21, and the first and second three-way valves 25, 26, so that the coolant of the battery coolant circuit 10 circulates in the same order as the first running time.

Further, at the second running time in winter, the controller 13 stops the compressor 30 (OFF), so that the refrigerant is not circulated in the refrigeration cycle 11.

Further, at the second running time in winter, the controller 13 stops the blower fan 34 (OFF), and operates the air blower 45 (ON).

In such manner, the battery coolant circuit 10 dissipates the heat energy stored in the secondary battery 1 from the heater core 15 to heat the air to be blown into the vehicle compartment (i.e., the air blown by the air blower 45). In this case, since the battery coolant circuit 10 does not dissipate the heat energy stored in the secondary battery 1 to the heat absorption side of the refrigeration cycle 11 (i.e., the first coolant-refrigerant heat exchanger 14), the interior condenser 31 does not heat the air to be blown into the vehicle compartment (i.e., the air blown by the air blower 45).

In the above-described conventional art, it is difficult to provide a sufficient heating capacity due to a small temperature difference between the heat energy stored in the battery and the inside air. However, in the first embodiment of the present disclosure, heat stored in the secondary battery 1 is pumped to the refrigeration cycle 11 (i.e., a heat pump cycle), heat or the heat energy stored in the secondary battery 1 can be effectively utilized for the heating operation.

Further, the refrigeration cycle 11 (i.e., a heat pump cycle) by itself cannot provide a large heating capacity when outside air temperature is low, at such time because the low outside air temperature causes a low suction pressure and a low suction density. However, in the present embodiment, a large heating capacity is realized by utilizing heat stored in the secondary battery 1 which is used to raise a suction pressure. Such heating operation is especially beneficial in the warming-up time which demands a large capacity.

Further, in the present embodiment, a heat exchange on a heat absorption side of the refrigeration cycle 11 (i.e., a heat pump cycle) and a direct heat exchange with the air (i.e., a heat exchange in the heater core 15) are switchable. Therefore, heat stored in the secondary battery 1 is optimally used depending on the environment, i.e., depending on temperature of the secondary battery 1, as well as an inside/outside temperature, a target air temperature, and the like. Further, when the vehicle compartment temperature has already been raised, thereby not demanding a large heating capacity any more, heat in the secondary battery 1 is directly dissipated to the air, thereby reducing the operation time of the refrigeration cycle 11 (i.e., a heat pump cycle) or even stopping the refrigeration cycle 11 (i.e., a heat pump cycle).

Further, even though heat at the running time and the charging time was used in the above-described conventional art, such usage of heat in the conventional art is merely a heat recovery of a waste heat, which does not fully utilize a potential of a heat capacity of the battery. However, in the present embodiment, the secondary battery 1 is adapted as a heat storage member, i.e., the battery 1 is positively heated for storing heat. Therefore, the stored heat in the secondary battery 1 can be effectively used for the heating operation of the vehicle compartment.

Further, in the present embodiment, heat generation and heat storage are performed by utilizing the external power at the charging time. Therefore, heat generation energy for performing an air-conditioning at the running time is reduced, thereby extending a cruising range of the vehicle.

Further, in the present embodiment, since the refrigeration cycle 11 (i.e., a heat pump cycle) is used for heating the battery at the charging time, heat generation can be performed at a higher efficiency in comparison to the heat generation by using a heater such as an electric heater or the like.

In the following, the operation in summer is described based on FIGS. 6 to 9. In FIGS. 6 to 9, a flow of the refrigerant is indicated by a thick solid line in each of the operation states. Further, in FIGS. 6 to 9, the details of the controller 13 are omitted for the purpose of illustration.

Figure 6:
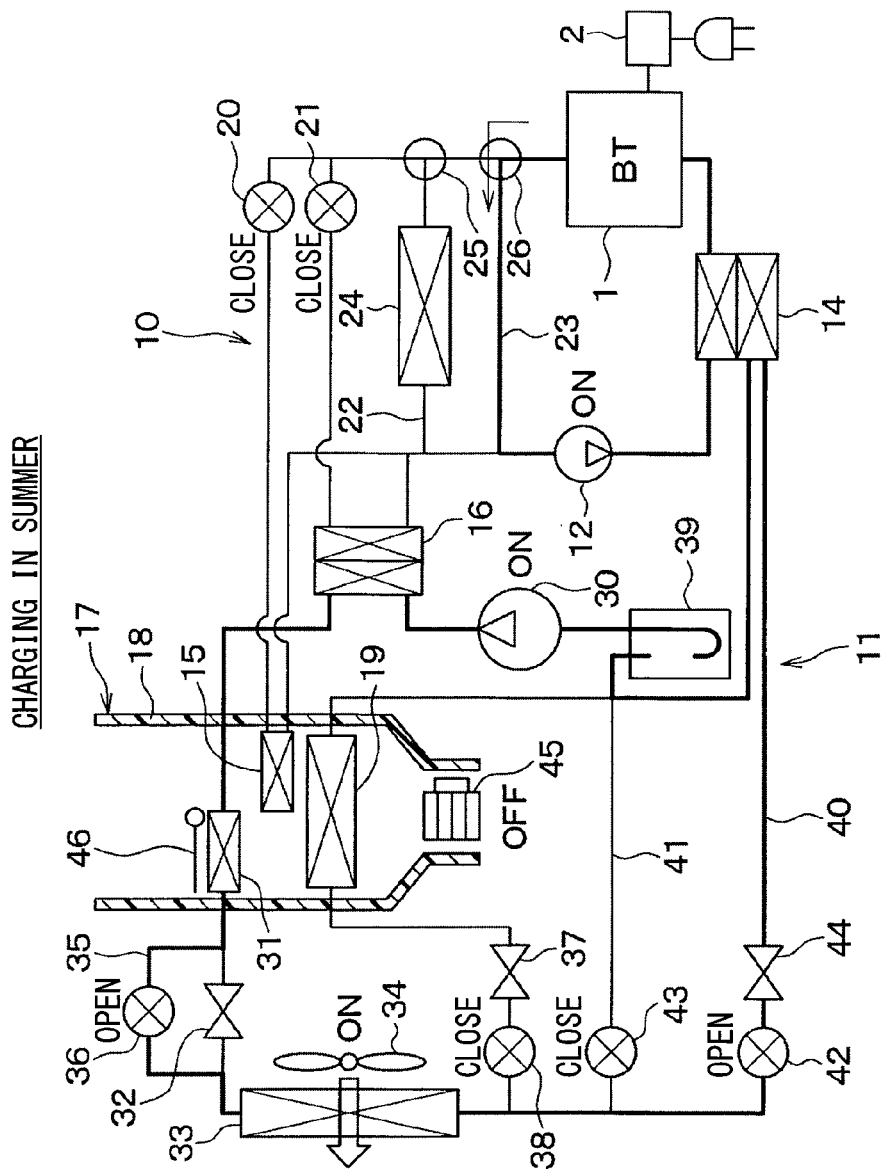
FIG. 6 is a diagram for explaining an operation of the temperature control apparatus for vehicles at a charging time in summer in the first embodiment.

FIG. 6 shows an operation at a charging time in summer, when the secondary battery 1 is connected to the external power supply. At the charging time in summer, the compressor 30 is driven by using the electric power (i.e., the external power) supplied from an external power source, and cold energy generated by the refrigeration cycle 11 is dissipated to the battery coolant circuit 10 from the first coolant-refrigerant heat exchanger 14, for the cooling of the secondary battery 1.

More specifically, at the charging time in summer, the controller 13 controls the battery cooling water pump 12, the first and second electromagnetic valves 20, 21, and the first and second three-way valves 25, 26, so that the coolant of the battery coolant circuit 10 circulates from the first water pump 12 to the first coolant-refrigerant heat exchanger 14 to the secondary battery 1 to the second bypass coolant passage 23 and then back to the battery cooling water pump 12 in this order.

Further, at the charging time in summer, the controller 13 controls the compressor 30 and the first to fourth electromagnetic refrigerant valves 36, 38, 42, 43, so that the refrigerant of the refrigeration cycle 11 circulates from the compressor 30 to the second coolant-refrigerant heat exchanger 16 to the interior condenser 31 to the expansion valve bypass passage 35 to the exterior heat exchanger 33 to the third expansion valve 44 to the first coolant-refrigerant heat exchanger 14 to the accumulator 39 and then back to the compressor 30 in this order. At such time, the compressor 30 is driven by the external power.

Further, at the charging time in summer, the controller 13 operates the blower fan 34 (ON), and stops the air blower 45 (OFF).

In such manner, the refrigeration cycle 11 absorbs heat from the first coolant-refrigerant heat exchanger 14, and dissipates heat from the exterior heat exchanger 33, and the battery coolant circuit 10 cools the secondary battery 1 by the cold energy dissipated through the first coolant-refrigerant heat exchanger 14. As a result, the cold energy is stored in the secondary battery 1.

Figure 7:
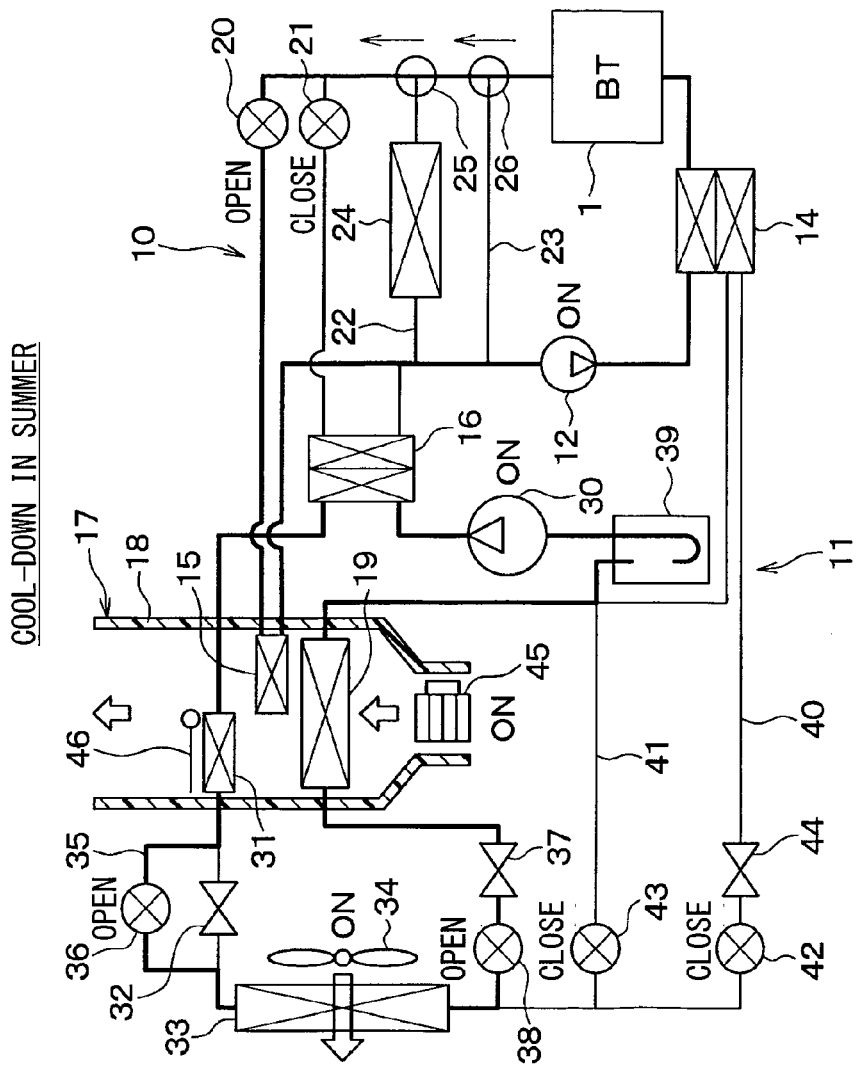
FIG. 7 is a diagram for explaining an operation of the temperature control apparatus for vehicles at a cool-down time in summer in the first embodiment.

FIG. 7 shows an operation at a cool-down time in summer (i.e., immediately after a start of a cooling operation of the vehicle compartment). At the cool-down time in summer, heat exchange is performed at the heater core 15 for discharging the cold energy that is stored in the secondary battery 1 at the charging time to the inside air.

More specifically, at the cool-down time in summer, the controller 13 controls the battery cooling water pump 12, the first and second electromagnetic valves 20, 21, and the first and second three-way valves 25, 26, so that the coolant of the battery coolant circuit 10 circulates from the first water pump 12 to the first coolant-refrigerant heat exchanger 14 to the secondary battery 1 to the heater core 15 back, and then back to the battery cooling water pump 12 in this order.

Further, at the cool-down time in summer, the controller 13 controls the compressor 30 and the first to fourth electromagnetic refrigerant valves 36, 38, 42, 43, so that the refrigerant of the refrigeration cycle 11 circulates from the compressor 30 to the second coolant-refrigerant heat exchanger 16 to the interior condenser 31 to the expansion valve bypass passage 35 to the exterior heat exchanger 33 to the second expansion valve 37 to the interior evaporator 19 to the accumulator 39, and then back to the compressor 30 in this order.

Further, at the cool-down time in summer, the controller 13 operates the blower fan 34 (ON), operates the air blower 45 (ON), and closes the air amount adjustment door 46.

In such manner, the battery coolant circuit 10 dissipates the cold energy stored in the secondary battery 1 through the heater core 15, and the refrigeration cycle 11 absorbs heat from the interior evaporator 19 and radiates heat from the exterior heat exchanger 33. Therefore, air blown into the vehicle compartment (i.e., the air blown by the air blower 45) is cooled at both of the heater core 15 and the interior evaporator 19.

Figure 8:
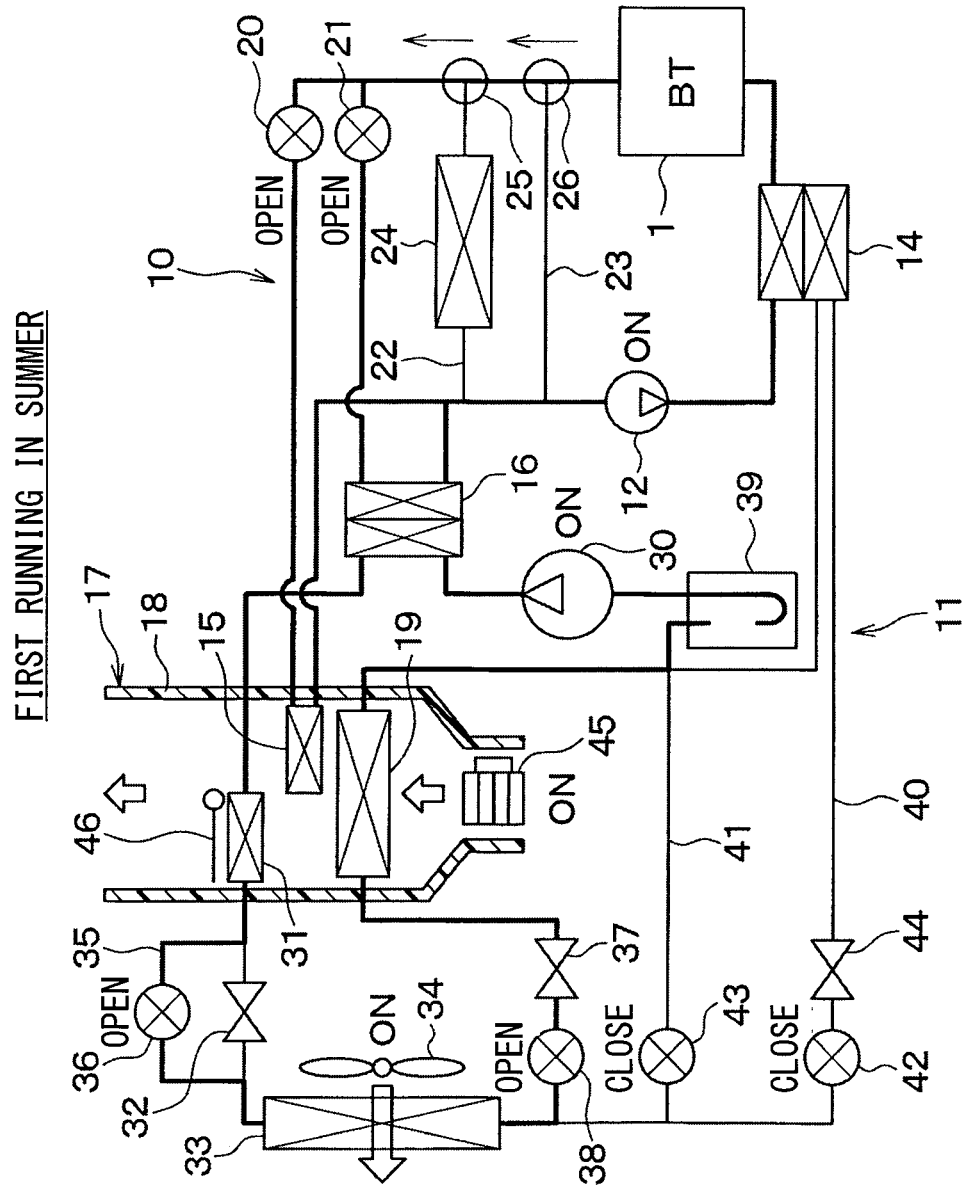
FIG. 8 is a diagram for explaining an operation of the temperature control apparatus for vehicles at a first running time in summer in the first embodiment.

FIG. 8 shows the operation at a first running time in summer, after the cool-down operation. When the vehicle compartment is cooled to some degree by the operation at the cool-down time, the cold energy stored in the secondary battery 1 at the charging time is used for both of the heat exchange at the heater core 15 and the heat exchange at the low pressure side of the refrigeration cycle 11.

More specifically, at the first running time in summer, the controller 13 controls the battery cooling water pump 12, the first and second electromagnetic valves 20, 21, and the first and second three-way valves 25, 26, so that the coolant of the battery coolant circuit 10 circulates from the first water pump 12 to the first coolant-refrigerant heat exchanger 14 to the secondary battery 1 to both the heater core 15 and the second coolant-refrigerant heat exchanger 16 (i.e., two parallel coolant flows), and then back to the battery cooling water pump 12 in this order.

Further, at the first running time in summer, the controller 13 controls the compressor 30 and the first to fourth electromagnetic valves 36, 38, 42, 43 so that the coolant of the refrigeration cycle 11 circulates in the same order as the cool-down time.

Further, at the first running time in summer, the controller 13 operates the blower fan 34 (ON), operates the air blower 45 (ON), and closes the air amount adjustment door 46.

In such manner, the battery coolant circuit 10 dissipates the cold energy stored in the secondary battery 1 through both of the heater core 15 and the second coolant-refrigerant heat exchanger 16, and the refrigeration cycle 11 absorbs heat from the interior evaporator 19 and dissipates heat from both of the second coolant-refrigerant heat exchanger 16 and the exterior heat exchanger 33. Therefore, the air blown into the vehicle compartment (i.e., the air blown by the air blower 45) is cooled by both of the heater core 15 and the interior evaporator 19.

Figure 9:
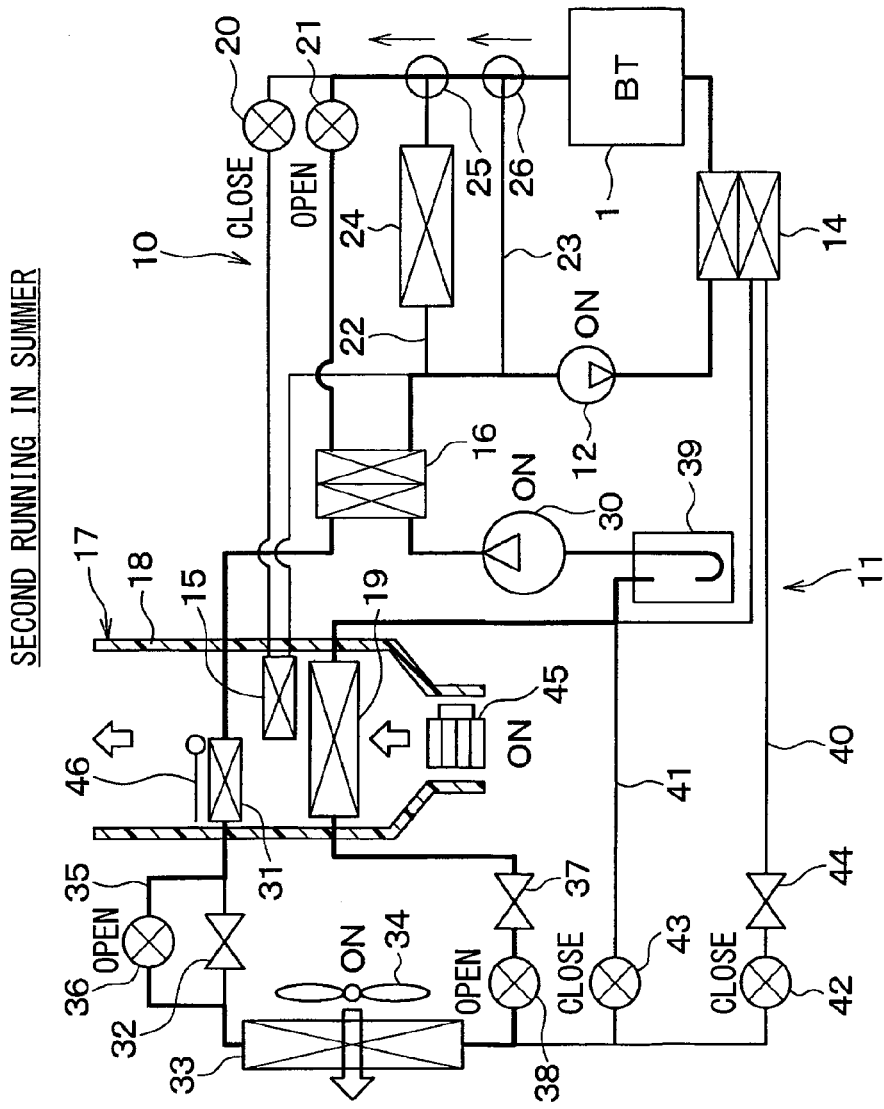
FIG. 9 is a diagram for explaining an operation of the temperature control apparatus for vehicles at a second running time in summer in the first embodiment.

FIG. 9 shows an operation at a second running time in summer. When the vehicle compartment is cooled further by the operation at the first running time in summer, the cold energy stored in the secondary battery 1 at the charging time is used for heat exchange in the refrigeration cycle 11, and the cold energy is not used for heat exchange in the heater core 15.

More specifically, at the second running time in summer, the controller 13 controls the battery cooling water pump 12, the first and second electromagnetic valves 20, 21, and the first and second three-way valves 25, 26, so that the coolant of the battery coolant circuit 10 circulates from the first water pump 12 to the first coolant-refrigerant heat exchanger 14 to the secondary battery 1 to the second coolant-refrigerant heat exchanger 16, and then back to the battery cooling water pump 12 in this order.

Further, at the second running time in summer, the controller 13 controls the compressor 30 and the first to fourth electromagnetic valves 36, 38, 42, 43 so that the refrigerant of the refrigeration cycle 11 circulates in the same order as the first running time.

Further, at the second running time in summer, the controller 13 operates the blower fan 34 (ON), operates the air blower 45 (ON), and closes the air amount adjustment door 46.

In such manner, the battery coolant circuit 10 dissipates the cold energy stored in the secondary battery 1 through the second coolant-refrigerant heat exchanger 16, and the refrigeration cycle 11 absorbs heat from the interior evaporator 19 and dissipates heat from both of the second coolant-refrigerant heat exchanger 16 and the exterior heat exchanger 33. Therefore, the air blown into the vehicle compartment (i.e., the air blown by the air blower 45) is cooled only by the interior evaporator 19. At such time, the battery coolant circuit 10 does not dissipate cold energy stored in the secondary battery 1 to the heater core 15, thereby not enabling the heater core 15 to cool the air blown into the vehicle compartment (i.e., the air blown by the air blower 45).

At the second running time in summer, the refrigerant of the refrigeration cycle 11 is cooled by the second coolant-refrigerant heat exchanger 16 prior to the cooling at the exterior heat exchanger 33. Therefore, high pressure in the refrigeration cycle 11 is lowered.

In the cooling operation in summer, the battery temperature is gradually raised in the course of heat transfer from the cold energy to the air, even when the secondary battery 1 has been fully cooled at the charging time. The conventional heat exchange method between the battery-stored cold energy and the air cannot contribute much to the cooling operation when the battery temperature is raised to 20° C., due to little temperature difference between the battery temperature and the air temperature.

In the present embodiment of the present disclosure, however, by performing heat exchange between the cold energy in the secondary battery 1 and the high-pressure side of the refrigeration cycle 11 at the heat exchanger 16, an enthalpy of the high pressure side in the refrigeration cycle can be enlarged, thereby enabling an improved cooling capacity and a power saving.

Further, in the present embodiment, a switching between the two heat exchange portions, i.e., heat exchange to the high pressure side of the refrigeration cycle 11 and heat exchange directly to the air (i.e., heat exchange in the heater core 15) is performed to enable an optimal utilization of the cold energy stored in the secondary battery 1 depending on various factors, e.g., depending on temperature of the secondary battery 1, an inside/outside air temperature, a target air temperature (i.e., target temperature of the air blown into the vehicle compartment), and the like.

Further, in the present embodiment, the cold energy is generated and stored by utilizing the external power at the charging time. Therefore, heat generation energy for performing an air-conditioning at the running time is reduced, thereby extending a cruising range of the vehicle.

Further, in the present embodiment, the secondary battery 1 is considered as a cold energy storage member, i.e., the secondary battery 1 is positively cooled for the storage of the cold energy. Therefore, the cold energy stored in the secondary battery 1 can be effectively utilized for the cooling operation of the vehicle compartment.

In summary, in comparison to the above-described conventional art, in which the heat energy stored in the battery is dissipated to the inside air by heat exchange through air and/or water, the thermal energy (e.g., the heat energy and the cold energy) stored in the battery in the present embodiment is dissipated by heat exchange through the refrigerant of the refrigeration cycle used for air conditioning, thereby enabling an effective utilization of the battery-stored thermal energy (i.e., the heat energy and the cold energy) in the air-conditioning.

Further, in the present embodiment, the battery-stored thermal energy can be also dissipated to a target object other than the refrigeration cycle, heat exchange with the refrigeration cycle and heat exchange with other target object are switchable with each other, or both of two ways of heat exchange may simultaneously be performed. Therefore, according to the required heating/cooling capacity on demand, the battery-stored thermal energy can be optimally utilized.

Further, in the present embodiment, the secondary battery 1 which is an existing vehicle compartment is used as a thermal energy storage element, thereby advantageously saving the weight and the space in comparison to the conventional art that uses a new heat storage member dedicated for the heat storage.

Second Embodiment

Figure 10:
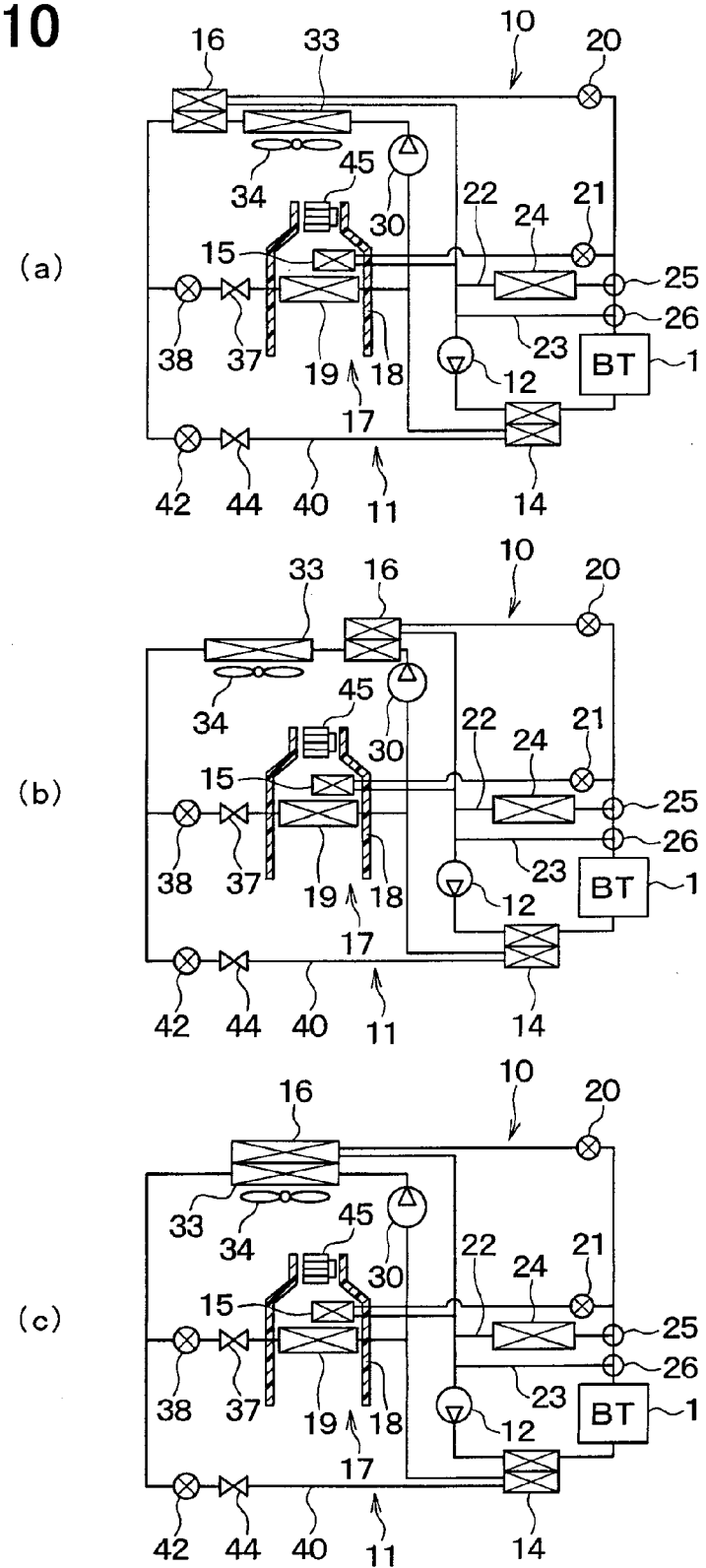
FIGS. 10 (*a*), (*b*), (*c*) are respectively overall schematic diagrams of a temperature control apparatus for vehicles in a second embodiment.

Although the above-described first embodiment is presented as an example configuration in which the refrigeration cycle 11 serves as a heat pump cycle that is usable for both of the heating operation and the cooling operation, a refrigeration cycle 11 in this second embodiment of the present disclosure is used as a cooler cycle for the cooling operation of the vehicle compartment, as shown in FIGS. 10 (*a*), (*b*), (*c*).

More specifically, in the second embodiment, the interior condenser 31, the air amount adjustment door 46, the first expansion valve 32, the expansion valve bypass passage 35, the first electromagnetic refrigerant valve 36, the second bypass refrigerant passage 41, and the fourth electromagnetic refrigerant valve 43 described in the above-described first embodiment are now omitted.

In an example of FIG. 10 (*a*), the second coolant-refrigerant heat exchanger 16 is disposed in the refrigeration cycle 11 between the exterior heat exchanger 33 and the second and third expansion valves 37, 44. Alternatively, as shown in FIG. 10 (*b*), the second coolant-refrigerant heat exchanger 16 may be disposed between the compressor 30 and the exterior heat exchanger 33 in the refrigeration cycle 11. Further, as shown in FIG. 10 (*c*), the second coolant-refrigerant heat exchanger 16 may be used as the exterior heat exchanger 33 itself.

When being used only in the cooling operation and not used in the heating operation as in the present embodiment, the heater core 15 is preferably disposed on an upstream air side of the interior evaporator 19 in the interior air-conditioning unit 17. The reason why such arrangement is preferable is that a windward-side heater core 15 relative to the interior evaporator 19 can efficiently cool the blowing air due to the temperature difference between the two devices, i.e., the coolant temperature in the heater core 15 of 10 to 40 degrees Celsius against the refrigerant temperature of the interior evaporator 19 of 0 to 10 degrees Celsius.

Third Embodiment

Figure 11:
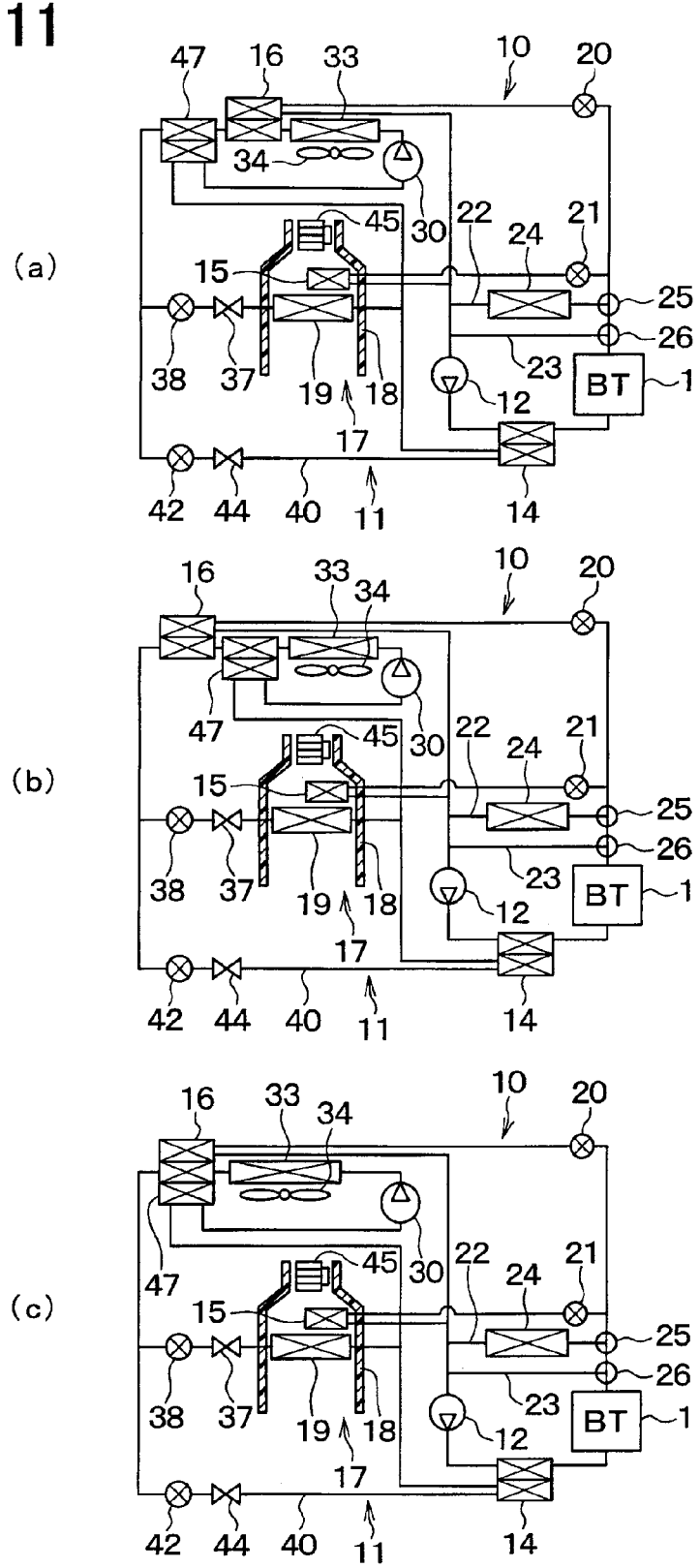
FIGS. 11 (*a*), (*b*), (*c*) are respectively overall schematic diagrams of a temperature control apparatus for vehicles in a third embodiment.

The third embodiment further adds an inner heat exchanger 47 to the examples of the above-described second embodiment, as shown in FIGS. 11 (*a*), (*b*), (*c*).

The inner heat exchanger 47 is used for heat exchange between the high-pressure refrigerant flowing out of the exterior heat exchanger 33 and the low-pressure refrigerant flowing out of one of the first coolant-refrigerant heat exchanger 14 and the interior evaporator 19. Thus, the inner heat exchanger 47 cools the high-pressure refrigerant flowing out of the exterior heat exchanger 33, for realizing an enthalpy reduction function for reducing an enthalpy of the refrigerant that flows into the interior evaporator 19 and for realizing a liquid compression suppression function for preventing a liquid compression in the compressor 30 by raising an enthalpy of the sucked refrigerant to be sucked into the compressor 30 to a level that makes the sucked refrigerant of the compressor 30 to be in a gas phase.

In an example of FIG. 11 (*a*), the second coolant-refrigerant heat exchanger 16 is disposed between the exterior heat exchanger 33 and the inner heat exchanger 47 in the refrigeration cycle 11. Alternatively, as shown in FIG. 11 (*b*), the second coolant-refrigerant heat exchanger 16 may be disposed in the refrigeration cycle 11 between the inner heat exchanger 47 and the second and third expansion valves 37, 44. Further, as shown in FIG. 11 (*c*), the second coolant-refrigerant heat exchanger 16 may be disposed in the inner heat exchanger 47.

Fourth Embodiment

In the above-described first embodiment, the refrigeration cycle 11 (i.e., a heat pump cycle) is used as a battery heating device (i.e., a heat generation unit) in winter. However, as shown in FIG. 12, in this fourth embodiment, a heating apparatus 48 beside the refrigeration cycle 11 is used as the battery heating device (i.e., a heat generation unit) in winter.

As the heating apparatus 48, any apparatus which converts electricity into heat is usable, such as an electric heater, a PTC heater, and a Peltier device, and the like.

Figure 12:
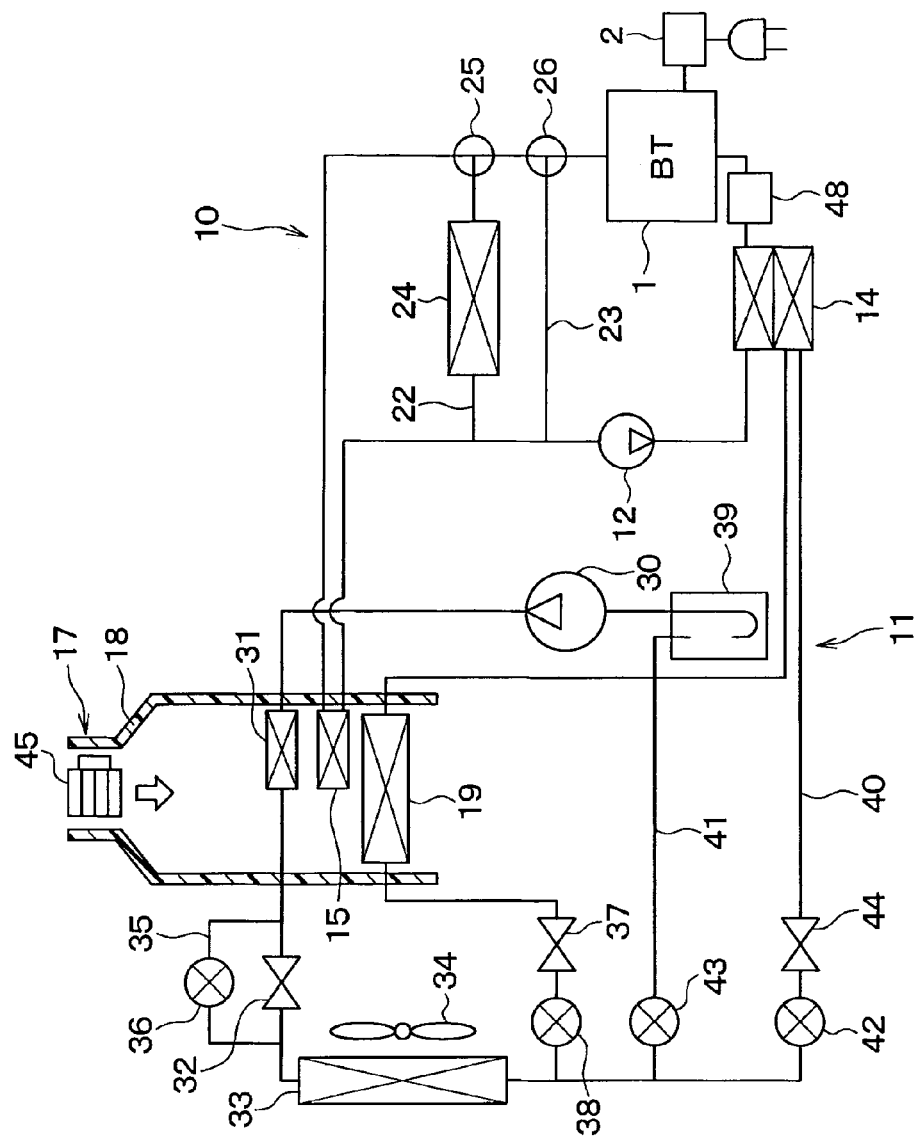
FIG. 12 is an overall schematic diagram of a temperature control apparatus for vehicles in a fourth embodiment.

In an example of FIG. 12, the heating apparatus 48 is disposed in the battery coolant circuit 10, and heats the battery coolant. In addition, the heating apparatus 48 may be installed in a battery pack of the secondary battery 1 for directly heating the secondary battery 1.

In the present embodiment, the second coolant-refrigerant heat exchanger 16 of the above-described first embodiment can be omitted, because the heating apparatus 48 beside the refrigeration cycle 11 is used as a battery heating device in winter. Therefore, configuration of the present embodiment can be simplified in comparison to the above-described first embodiment.

Fifth Embodiment

Figure 13:
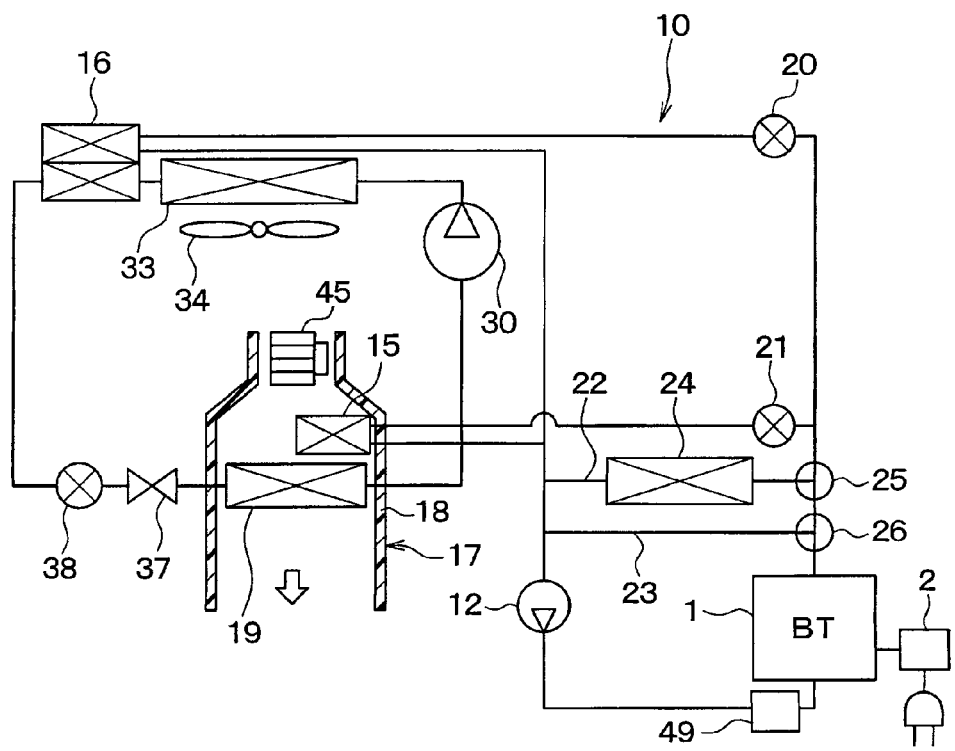
FIG. 13 is an overall schematic diagram of a temperature control apparatus for vehicles in a fifth embodiment.

In the above-described second and third embodiments, the refrigeration cycle 11 is used as a battery cooling device (i.e., a heat generation unit) in summer. However, in the fifth embodiment, as shown in FIG. 13, a cooling apparatus 49 beside the refrigeration cycle 11 is used as a battery cooling device (i.e., a heat generation unit) in summer. As the cooling apparatus 49, a Peltier device or the like may be used, for example.

In an example of FIG. 13, the cooling apparatus 49 is disposed in the battery coolant circuit 10, and cools the battery coolant. In addition, the cooling apparatus 49 is installed in a battery pack of the secondary battery 1 for directly cooling the secondary battery 1.

In the present embodiment, the first coolant-refrigerant heat exchanger 14 of the above-described second and third embodiments can be omitted, because the cooling apparatus 49 beside the refrigeration cycle 11 is used as a battery heating device in winter. Therefore, configuration of the present embodiment can be simplified in comparison to the above-described second and third embodiments.

Sixth Embodiment

The sixth embodiment is an example of a control process performed by the controller 13. An overall configuration of the present embodiment is described at first. The above-described patent documents 2 to 4 are about a conventional art for air-conditioning which uses heat (i.e., thermal energy) generated by a battery. Further, in the above-described patent documents 2 to 4, another conventional art which stores and builds up heat (i.e., thermal energy) in a battery at the charging time is also described.

In the present embodiment, a heat storage mode for positively storing heat in the battery is devised, and, by changing a target battery temperature at the charging time according to switching ON and OFF of the heat storage mode, heating/cooling amount of the battery at the charging time is changed. Such control aims at the use of a heat storage amount by utilizing a heat capacity of the battery to the full when it is determined that a large amount of heat storage is required, which is then used for air-conditioning at the running time or the like, for a reduction of the heat generation energy for air-conditioning during the running time and also for an extension of the cruising range of the vehicle.

In the present embodiment, a pre-air-conditioning is performable beside a normal air-conditioning which is an air-conditioning of the vehicle compartment at the running time of the vehicle. The pre-air-conditioning is an air-conditioning operation during the charging of the secondary battery 1 by the external power supply, and performs air-conditioning of the vehicle compartment before an occupant gets in the vehicle.

In such case, if heating/cooling of the secondary battery 1 is started immediately after parking, heating/cooling finishes early, thereby leading to a wasteful dissipation of an elaborately stored thermal energy to the air during a standing time to the next operation after finishing the heating/cooling. In view of such problem, the heating/cooling of the secondary battery 1 is associated with the pre-air-conditioning, which enables a power saving by finishing the heat energy storage operation immediately before the start of the pre-air-conditioning, i.e., by reducing the standing time after the heating/cooling.

Figure 14:
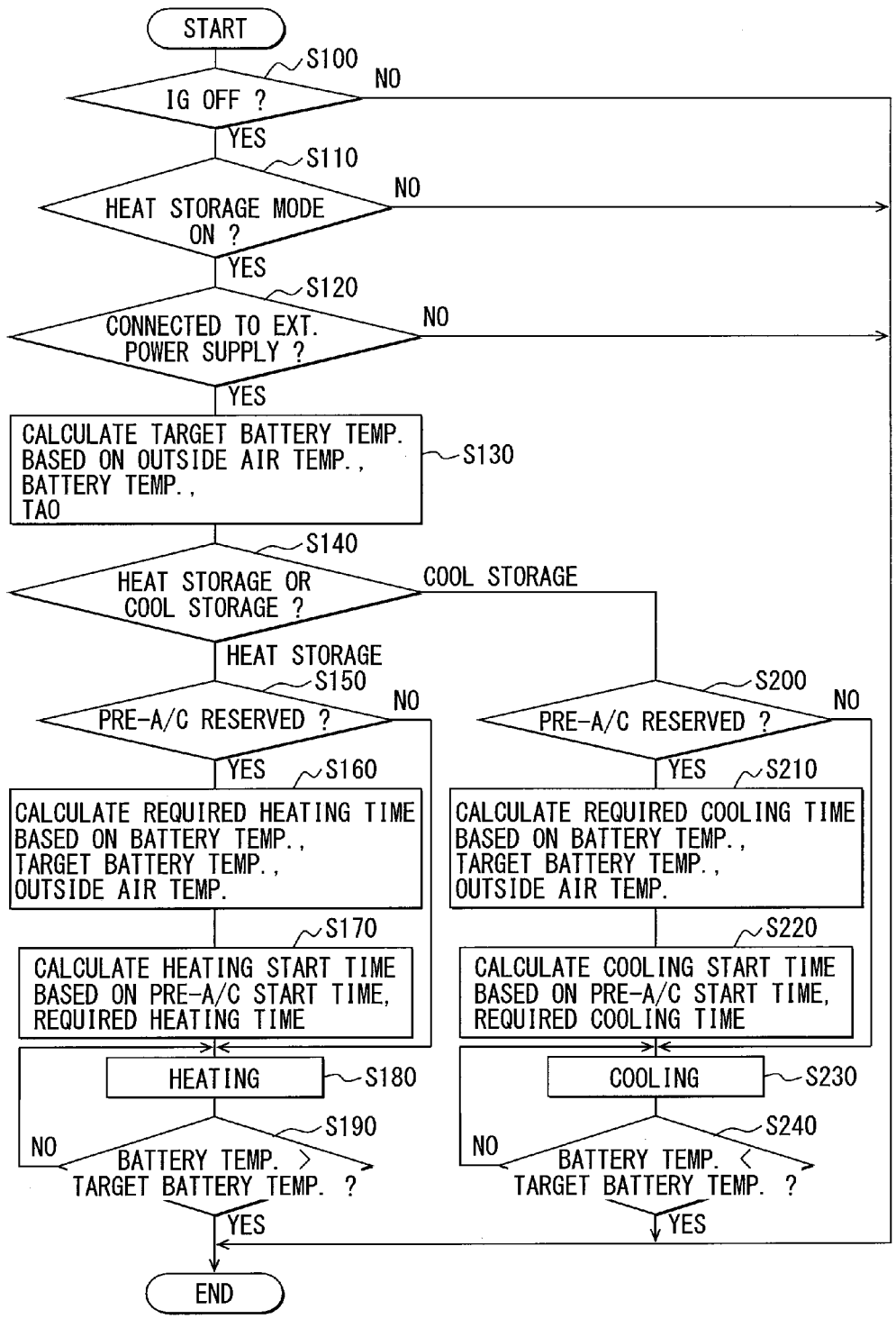
FIG. 14 is a flowchart of a part of a control process in a sixth embodiment.

The present embodiment is described concretely. The overall configuration of the temperature control apparatus for vehicles regarding the present embodiment is same as that of the above-described first embodiment. FIG. 14 is a flowchart of a part of a control process which is performed by the controller 13.

In step S100, it is determined whether an ignition switch (IG) of the vehicle is turned off (OFF). When it is determined that the ignition switch (IG) of the vehicle is turned off (OFF) (i.e., when it is determined as YES), the process proceeds to step S110. On the other hand, the control flow is finished when it is determined that the ignition switch (IG) of the vehicle is not turned off (OFF) (i.e., when it is determined as NO).

In step S110, it is determined whether the heat storage mode is turned on (ON). In this example, when an occupant (i.e., a user) operates the heat storage mode changeover switch on the operation panel, ON or OFF of the heat storage mode is switched.

In this example, when the heat storage mode is ON, storage of heat to the secondary battery 1 is performed in accordance with necessity, and, when the heat storage mode is OFF, storage of the heat to the secondary battery 1 is not performed. ON and OFF of the heat storage mode may also be automatically changed by the controller 13 based on various information.

When it is determined that the heat storage mode is set to ON (i.e., when it is determined as YES at step S110), the process proceeds to step S120, and, when it is determined that the heat storage mode is not set to ON (i.e., when it is determined as NO at step S110), this control flow is finished.

In step S120, it is determined whether the secondary battery 1 is connected to the external power supply. When it is determined that the secondary battery 1 is being connected to the external power supply (i.e., when it is determined as YES at step S120), the process proceeds to step S130, and, when it is determined that the secondary battery 1 is not being connected to the external power supply (i.e., when it is determined as NO at step S120), this control flow is finished.

In step S130, a target battery temperature (i.e., a target temperature) is calculated. In this example, the target battery temperature is calculated based on the outside air temperature, the battery temperature, the air-conditioning target temperature TAO (i.e., a target air temperature), etc.

Figure 15:
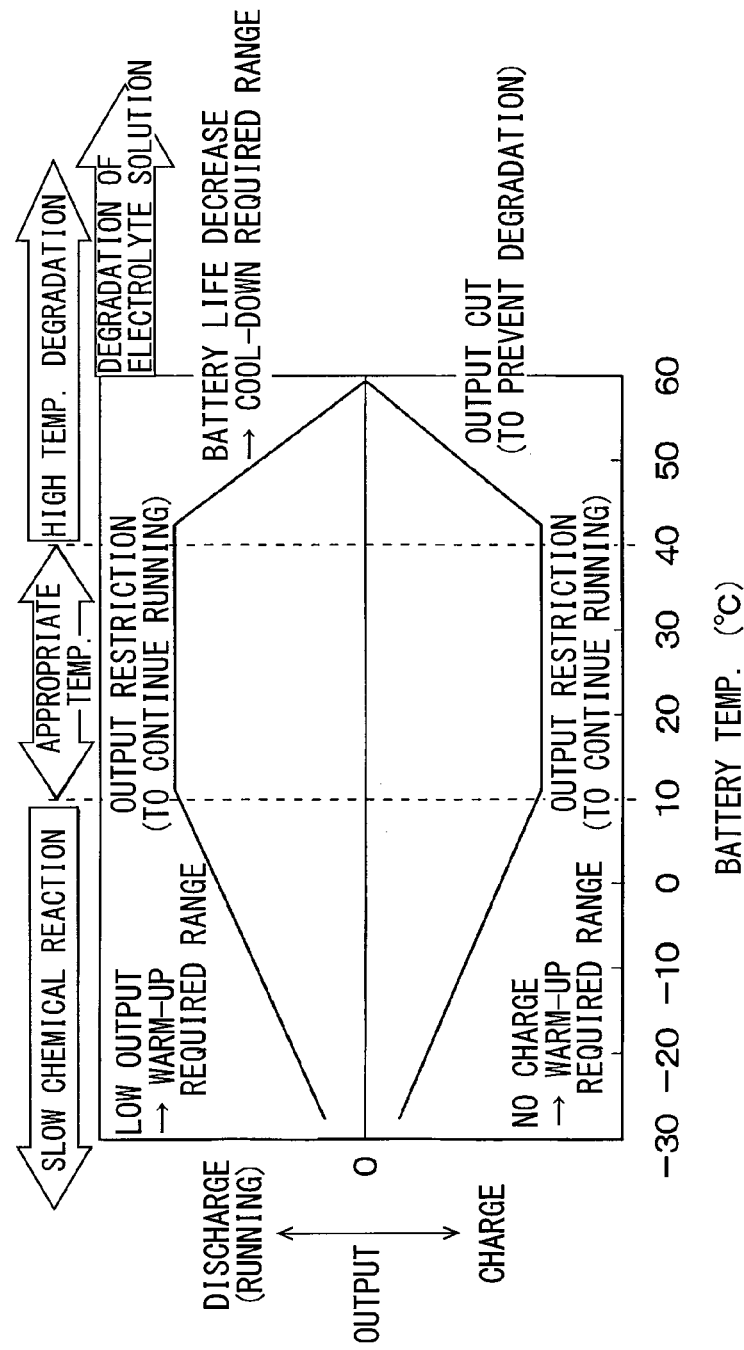
FIG. 15 is a diagram for explaining an output characteristic of a lithium ion battery.

Here, the output characteristic of the secondary battery 1 (i.e., a lithium ion battery) is illustrated in FIG. 15. As shown in FIG. 15, generally in the lithium ion battery currently used in the present embodiment, a sufficient input/output characteristic will not be exhibited at the time of low temperature, especially in a temperature range under 10 degrees Celsius, due to a slow chemical reaction etc. Further, at the time of high temperature, especially, in a temperature range over 40 degrees Celsius, the input and output are restricted for preventing degradation. Therefore, in order to fully utilize the capacity of the battery, it is necessary to perform a temperature management for keeping the battery temperature in a range between 10 to 40 degrees Celsius during a battery use time.

Thus, in step S140 which is subsequent to step S130, it is determined which of heat storage or cool storage (cold storage) is required. In this example, the target battery temperature and an actual battery temperature are compared for such determined. More specifically, when the target battery temperature is higher than the actual battery temperature, it is determined that heat storage is required, and, when the target battery temperature is lower than the actual battery temperature, it is determined that cool storage is required.

When it is determined that heat storage is required, the process proceeds to steps S150 to S190, and heat storage is performed. When it is determined that cool storage is required, the process proceeds to steps S200 to S240, and cool storage is performed.

In the control process of heat storage time in steps S150 to S190, it is determined first whether the pre-air-conditioning (pre-A/C) is reserved in step S150. Subsequently, in step S160, a required heating time (i.e., time required for heating the secondary battery 1) is calculated. In this example, required heating time is calculated based on the battery temperature, the target battery temperature, an outside air temperature, etc.

Subsequently, a heating start time is calculated in step S170. More specifically, by computing backward from a start time of the pre-air-conditioning, the heating start time is determined. Subsequently, the secondary battery 1 is heated in step S180. Specifically, the operation in FIG. 2 (i.e., the operation at the charging time in winter) is performed.

Subsequently, in step S190, it is determined whether the battery temperature has exceeded the target battery temperature. When it is determined that the battery temperature having exceeded the target battery temperature (i.e., when it is determined as YES), heating is finished. When it is determined that the battery temperature has not exceeded the target battery temperature yet on the other hand (i.e., when it is determined as NO), the process returns to step S180 and heating of the secondary battery 1 is continued.

In the control process at the cool storage time in steps S200 to S240, it is determined first whether the pre-air-conditioning is reserved in step S200. Subsequently, in step S210, a required cooling time (i.e., time required for cooling the secondary battery 1) is calculated. In this example, the required cooling time is calculated based on the battery temperature, the target battery temperature, the outside air temperature, etc.

Subsequently, a cooling start time is calculated in step S210. More specifically, by computing backward from a pre-air-conditioning start time, the cooling start time is determined as a time before the start time of the pre-air-conditioning by a time amount of the required cooling time. Subsequently, the secondary battery 1 is cooled in step S220. Specifically, the operation in FIG. 6 (i.e., the operation at the charging time in summer) is performed.

Subsequently, in step S240, it is determined whether the battery temperature is below the target battery temperature. When it is determined that the battery temperature is below the target battery temperature (i.e., when it is determined as YES), cooling is finished. When it is determined that the battery temperature is not below the target battery temperature on the other hand (i.e., when it is determined as NO), the process returns to step S230 and cooling of the secondary battery 1 is continued.

In the present embodiment, as readily understood from the above description, the external power is used at the charging time, and the battery is heated or cooled. In such case, if it is in winter, the battery will be heated to have a temperature that is higher than a heat storage mode OFF time (i.e., when it is determined that storage of the heat energy to the secondary battery 1 is not required). On the other hand, if it is in summer, the battery will be cooled to a temperature that is lower than a heat storage mode OFF time (i.e., when it is determined that storage of the cold energy to the secondary battery 1 is not required).

In the control of the conventional art, in order to secure the battery input/output characteristic, the battery is heated to about 10 degrees Celsius that is within a temperature management range (i.e., the target battery temperature=10 degrees Celsius), when, for example, the outside air temperature is 0 degrees Celsius in winter. In the present embodiment, in order to store, or to store, a superadded amount of heat in the battery for the heating operation at the running time or for a warming-up of the engine, the target battery temperature is set to 30 degrees Celsius and the battery is heated to 30 degrees Celsius. Such a target battery temperature is calculated based on the outside air temperature, the battery temperature, the air-conditioning target temperature TAO, etc. in the present embodiment.

For example, when a battery weight is 200 kg and a battery's specific heat is 0.9 J/gK, by setting the target battery temperature to a 20 degrees Celsius higher than the conventional art, the amount of heat to be stored in the battery is increased by about 3600 kJ. This means that, if we ignore a heating efficiency for the ease of calculation, the stored amount of heat equals to 3 kW multiplied by 20 minutes.

Figure 16:
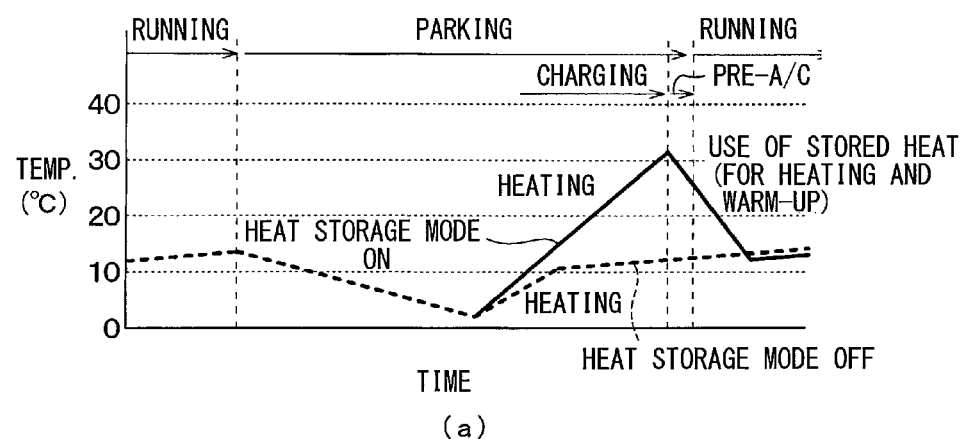
FIGS. 16 (a), (b) are graphs each showing a battery temperature and a target battery temperature.
Figure 16:
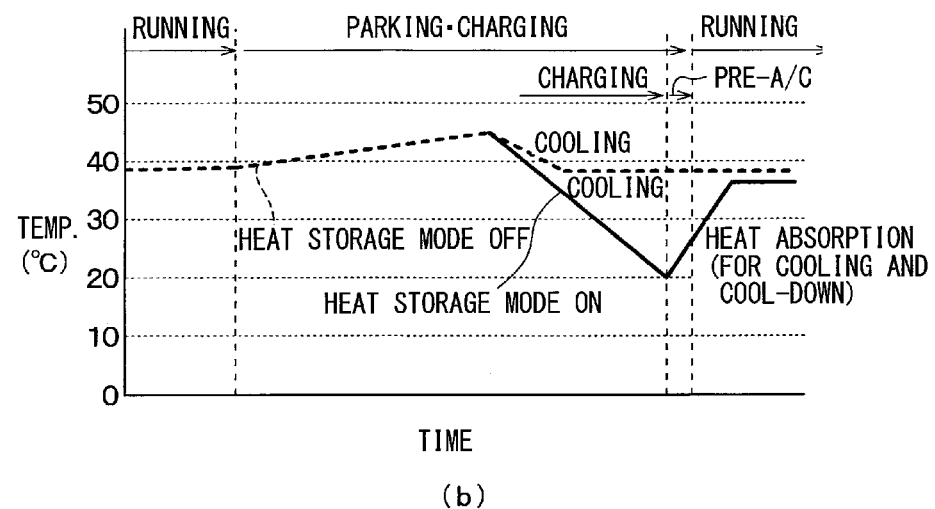

In FIG. 16 (a), a relationship between the battery temperature in winter and the target battery temperature is illustrated. A dashed line in FIG. 16 (a) indicates a heat storage mode OFF time of the present embodiment (equivalent to the conventional art), and a solid line in the same illustration indicates a heat storage mode ON time of the present embodiment.

On the other hand, in an example of a summer operation, in case that the outside air temperature is 45 degrees Celsius, the control of the conventional art cools the battery to about 40 degrees Celsius (i.e., the target battery temperature=40 degrees Celsius) to have the battery temperature in the temperature management range, in order to secure the battery input/output characteristic, for example. In the present embodiment, in order to further cool the battery for the cooling operation at the running time or for a cooling-down of the engine, the target battery temperature is set to 20 degrees Celsius so that a battery is cooled to 20 degrees Celsius. Such a target battery temperature is calculated based on the outside air temperature, the battery temperature, and the air-conditioning target temperature TAO in the present embodiment.

For example, when a battery weight is 200 kg and a battery specific heat is 0.9 J/gK, by setting the target battery temperature to a 20 degrees Celsius lower than the conventional art, the amount of cold energy to be stored in the battery is increased by about 3600 kJ. This means that, if we ignore a cooling efficiency for the ease of calculation, the stored amount of cold energy equals to 3 kW multiplied by 20 minutes.

In FIG. 16 (b), a relationship between the battery temperature in summer and the target battery temperature is illustrated. A dashed line in FIG. 16 (b) indicates a heat storage mode OFF time of the present embodiment (equivalent to the conventional art), and a solid line in the same illustration indicates a heat storage mode ON time of the present embodiment.

As readily understood from the above description, the controller 13 in the present embodiment determines whether it is required to store heat to the secondary battery 1, and controls storage of heat to the secondary battery 1 based on a determination result of such requirement. More specifically, when it is determined that the building up (storage) of heat to the secondary battery 1 is required, heat is firstly stored in the secondary battery 1, and, then, the built-up (i.e., stored) heat in the secondary battery 1 is dissipated to the inside air of the vehicle.

In such manner, i.e., by appropriately storing heat to the secondary battery 1 and dispensing heat to the inside air, a temperature control can be performed much more efficiently by using the secondary battery 1.

Further, since the target temperature of the secondary battery 1 is changed depending on a situation in the present embodiment, i.e., a target temperature for a heat storage required time and a target temperature for a heat storage non-required time are differently configured, the heat is more appropriately stored and stored in the secondary battery 1.

Further, since thermal energy conserved by using the external power can be used for air-conditioning at the running time and/or for heating/cooling the devices in the present embodiment, the cruising range of the vehicle is extended by the saved amount of electricity that is otherwise taken out from the battery at the running time as the air-conditioning energy.

Further, since the existing battery (i.e., an originally installed battery in the vehicle) is used as a heat capacitive element, in comparison to the case in which a heat/cool storage member is newly installed, a weight and a space of such member is reduced. Furthermore, since the battery having a very large heat capacity is used as the heat capacitive element, a large amount of thermal energy is conserved.

Further, since the battery heating/cooling is associated with the pre-air-conditioning reservation for completing the heat energy storage to the battery at a scheduled start time of the pre-air-conditioning, the standing time between the completion of the heating/cooling and use of the vehicle is reduced. Therefore, a loss of the stored heat energy caused by a heat dissipation to the air is reduced, which enables an electricity saving (i.e., an energy saving).

Seventh Embodiment

In comparison to the above-described first and sixth embodiments in which heat is stored in the secondary battery 1 by using the external power at the charging time, the seventh embodiment stores a waste heat of the vehicle in the secondary battery 1.

Figure 17:
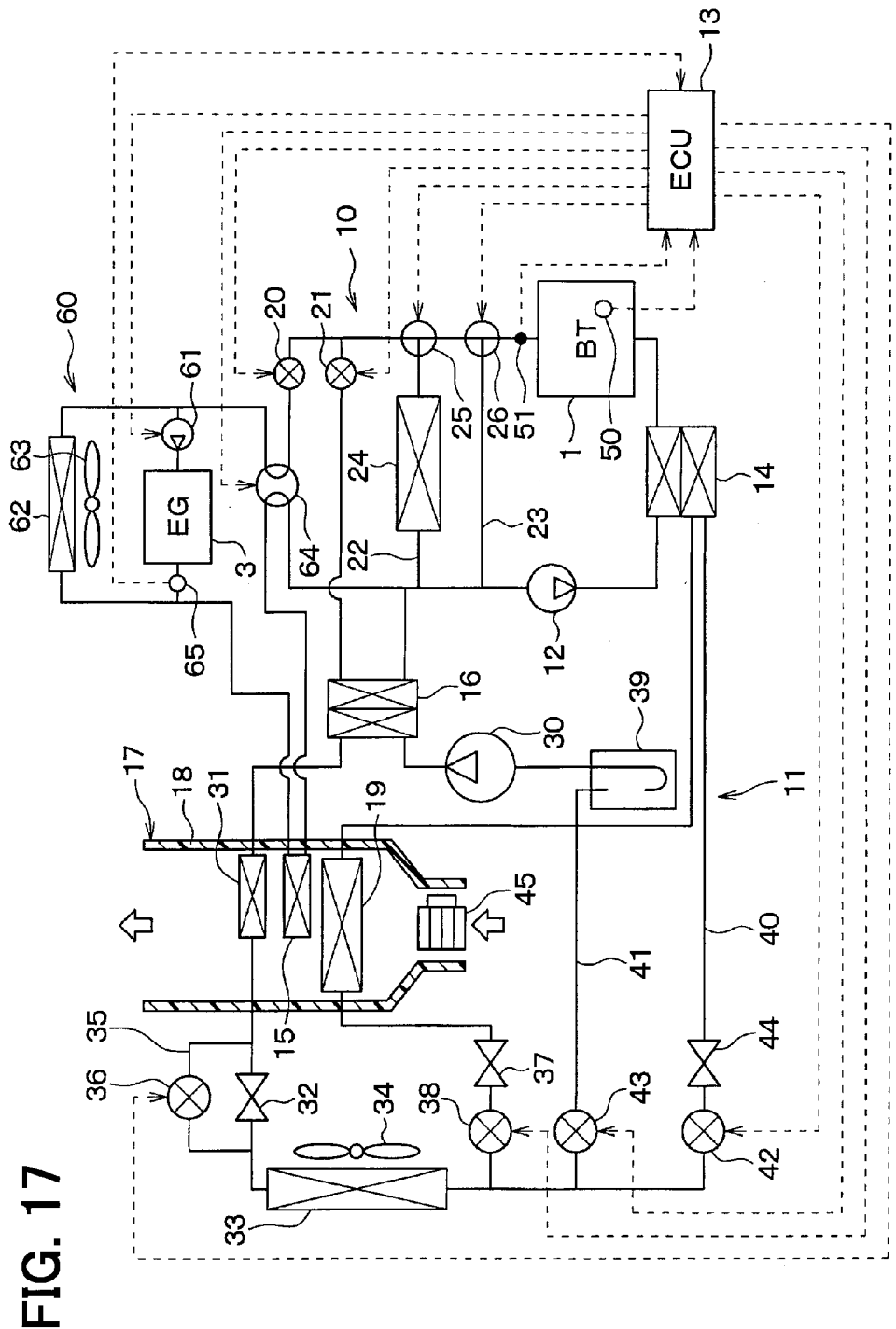
FIG. 17 is an overall schematic diagram of a temperature control apparatus for vehicles in a seventh embodiment.

FIG. 17 is an overall configuration of a temperature control apparatus for vehicles in the present embodiment. In the present embodiment, a heater core 15 is disposed in an engine coolant circuit 60.

The engine coolant circuit 60 is a circuit through which the coolant (i.e., an engine coolant) for cooling the engine 3 circulates. An engine cooling water pump 61 for circulating the engine coolant is disposed in the engine coolant circuit 60. In this example, the engine cooling water pump 61 is provided as an electric water pump, and the number of rotations (i.e., a flow amount of coolant) is controlled by a control signal output from the controller 13.

An engine cooling radiator 62 is connected to the coolant outlet side of the engine 3 and to a coolant inlet side of the engine cooling water pump 61. The engine cooling radiator 62 is a heat exchanger which dissipates heat from the engine coolant to a blow air that is blown by a blower fan 63, for the cooling of the engine coolant.

The heater core 15 is connected to the coolant outlet side of the engine 3 and to the coolant inlet side of the battery cooling water pump 12 in parallel with the engine cooling radiator 62. A four-way valve 64 (i.e., an interrupter) is disposed on the coolant outlet side of the heater core 15 and to the coolant inlet side of the battery cooling water pump 12.

The four-way valve 64 is disposed on the coolant outlet side of the first electromagnetic refrigerant valve 20 and on the coolant inlet side of the battery cooling water pump 12 in the battery coolant circuit 10. Therefore, the heater core 15 is connectable to the battery coolant circuit 10 through the four-way valve 64. The opening/closing operation of the four-way valve 64 is controlled according to an output signal that is output from the controller 13.

An engine coolant temperature sensor 65 which detects an engine coolant temperature on an outlet side of the engine 3 is connected to an input side of the controller 13.

Figure 18:
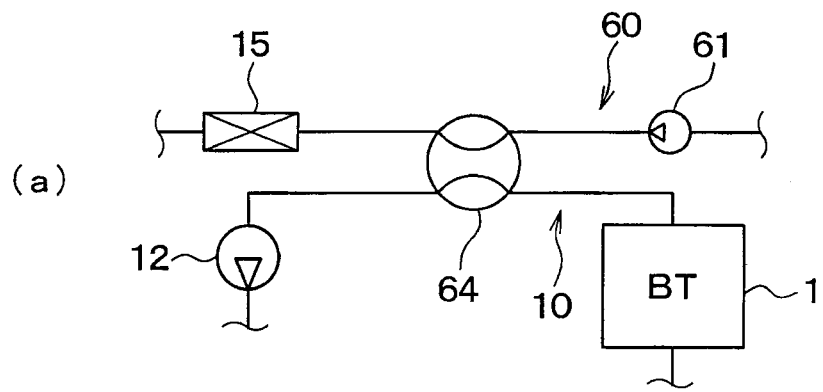
FIGS. 18 (a), (b) are respectively schematic diagrams in first and second modes of a four-way valve in the seventh embodiment.
Figure 18:
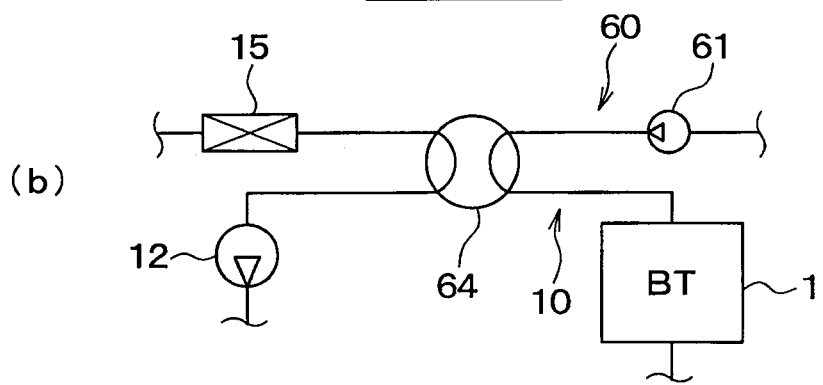

FIGS. 18 (*a*) and 18 (*b*) are schematic diagrams for illustrating a mode change configuration of the four-way valve 64. In a first mode shown in FIG. 18 (*a*), the engine coolant circuit 60 and the battery coolant circuit 10 are separated, and the engine coolant flowing out of the heater core 15 is sucked by the engine cooling water pump 61 without circulating through the battery coolant circuit 10.

In a second mode shown in FIG. 18 (*b*), a communication between the engine coolant circuit 60 and the battery coolant circuit 10 is established, and a circulation of the engine coolant flowing out of the heater core 15 into the battery coolant circuit 10 is enabled. In such manner, the engine coolant circuit 60 and the battery coolant circuit 10 are enabled to function as a heat collection portion for recovering and collecting a waste heat of the engine 3 to the secondary battery 1.

In other words, by switching between the first mode and the second mode, collection of the waste heat of the engine 3 is interruptively enabled.

Figure 19:
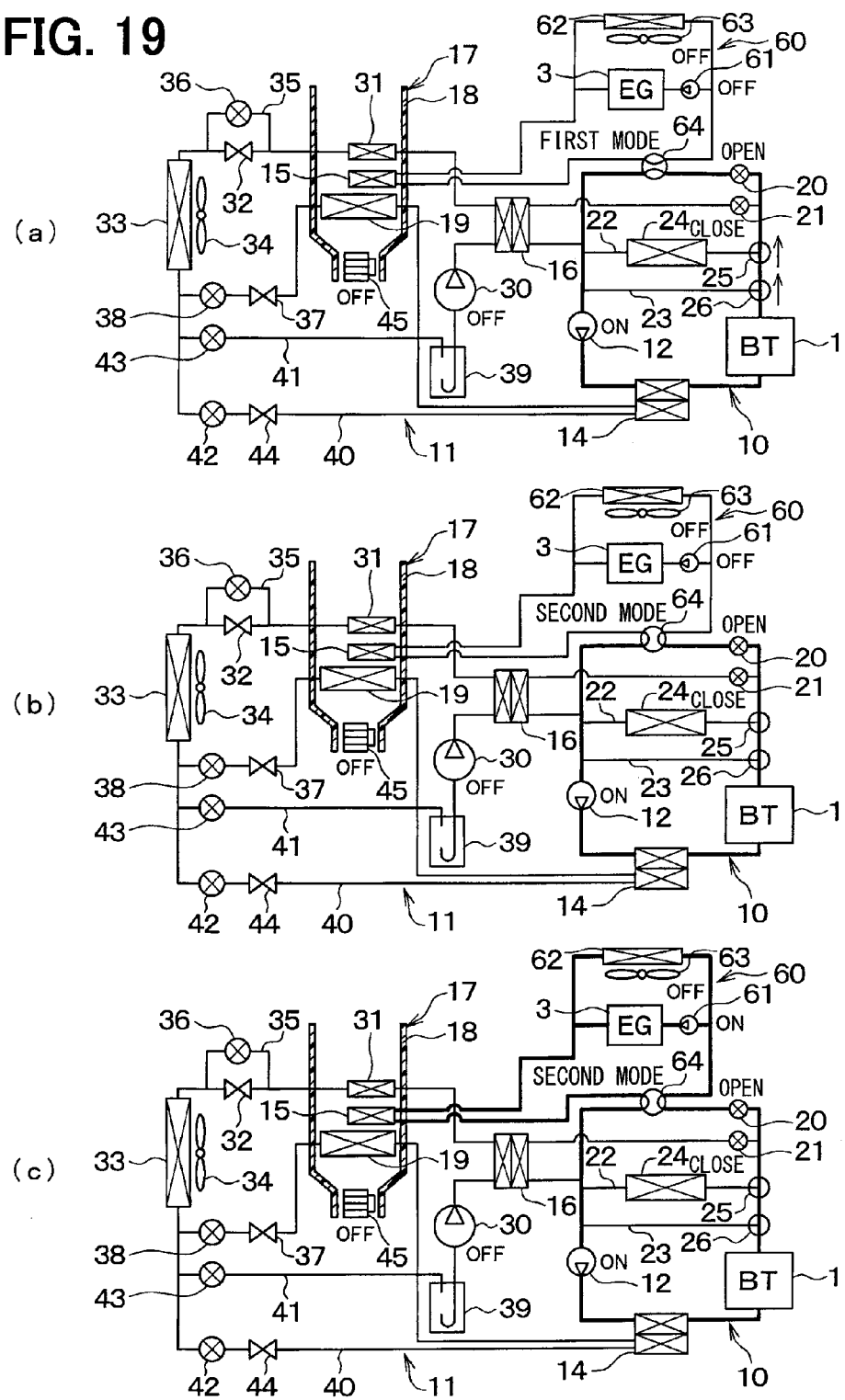
FIGS. 19 (a), (b), (c) are schematic diagrams each showing an operation of the temperature control apparatus for vehicles in winter in the seventh embodiment.

Next, the operation of the above-described configuration is described. FIGS. 19 (*a*) to (*c*) show examples of an operation in winter (i.e., a heating mode). In addition, FIGS. 19 (*a*) to (*c*) use a thick solid line to represent a flow of the coolant in each operation state. Further, in FIG. 19 (*a*) to (*c*), the details of controller 13 are omitted for the illustration purposes.

When the heat storage mode is turned ON after parking and turning off of an ignition switch (i.e., after IG OFF), the battery temperature sensor 50 detects temperature of the secondary battery 1. In case that the battery temperature exceeds 40 degrees Celsius at this point, heat storage to the secondary battery 1 will not be performed because heating of the secondary battery 1 above such level will lead to the degradation of the secondary battery 1.

When the battery temperature is equal to or lower than 40 degrees Celsius, the battery cooling water pump 12 is driven in a state in which the engine coolant circuit 60 and the battery coolant circuit 10 are separated from each other, as shown in FIG. 19 (*a*).

More specifically, the controller 13 switches the four-way valve 64 to the first mode, and controls the battery cooling water pump 12, the first and second electromagnetic valves 20, 21, and the first and second three-way valves 25, 26, so that the coolant of the battery coolant circuit 10 circulates from the battery cooling water pump 12 to the first coolant-refrigerant heat exchanger 14 to the secondary battery 1 to the four-way valve 64 to the battery cooling water pump 12.

Further, the controller 13 stops the engine cooling water pump 61 (OFF), for stopping the circulation of the engine coolant in the engine coolant circuit 60. Further, the controller 13 stops the compressor 30 (OFF), so as to stop the circulation of the refrigerant of the refrigeration cycle 11. Further, the controller 13 stops the air blower 45 (OFF).

Next, as shown in FIG. 19 (*b*), a communication between the engine coolant circuit 60 and the battery coolant circuit 10 is established, and the heat of the engine coolant circuit 60 is moved to the battery coolant circuit 10 so as to be stored in the battery 1.

More specifically, the controller 13 switches the four-way valve 64 to the second mode, and controls the battery cooling water pump 12, the first and second electromagnetic refrigerant valve 20, 21, and the first and second three-way valves 25, 26, so that the coolant of the battery coolant circuit 10 circulates from the battery cooling water pump 12 to the first coolant-refrigerant heat exchanger 14 to the secondary battery 1 to the four-way valve 64 to the engine coolant circuit 60 to the four-way valve 64, and then back to the battery cooling water pump 12.

At such moment, the controller 13 stops the engine cooling water pump 61 (OFF). Further, the controller 13 stops the compressor 30 (OFF), so as to stop the circulation of the refrigerant of the refrigeration cycle 11. Further, the controller 13 stops the air blower 45 (OFF).

Here, if the battery coolant temperature steeply rises, such temperature steep rise may cause damage to the secondary battery 1. Therefore, when the battery coolant temperature exceeds 40 degrees Celsius, the four-way valve 64 is returned to the first mode. In such state, the decreasing of temperature of the battery coolant circuit 10 to below 40 degrees Celsius is waited, and the four-way valve 64 will again be switched to the second mode when the temperature of the battery coolant circuit 10 to below 40 degrees Celsius. During such operation, if the battery temperature reaches 40 degrees Celsius, heat storage is stopped at such moment.

If the battery coolant temperature comes down to 40 degrees Celsius or below 40 degrees Celsius even when the four-way valve 64 is kept at the second mode, by driving the engine cooling water pump 61, heat remaining in the engine 3 is moved to the battery coolant circuit 10 to be stored in the secondary battery 1, as shown in FIG. 19 (c).

During such operation, if the battery coolant temperature exceeds 40 degrees Celsius, the four-way valve 64 is switched back to the first mode, and decreasing of temperature of the battery coolant circuit 10 to below 40 degrees Celsius is waited, and the four-way valve 64 will again be switched to the second mode when the temperature of the battery coolant circuit 10 becomes below 40 degrees Celsius. During such operation, if the battery temperature reaches 40 degrees Celsius, heat storage is stopped at such moment.

The above-described control is repeatedly performed, and, even when the battery temperature does not reach 40 degrees Celsius, the waste heat collection from the engine 3 is determined to be ending if the battery coolant temperature and the battery temperature are sufficiently close to each other.

In addition, instead of switching the four-way valve 64, the flow amount of the battery cooling water pump 12 may be changed. That is, even with the four-way valve 64 is kept at the state in the second mode, if the flow amount of the battery cooling water pump 12 is increased, collection of the waste heat from the engine 3 is facilitated; and, if the flow amount of the battery cooling water pump 12 is decreased, collection of the waste heat from the engine 3 is decreased.

Figure 20:
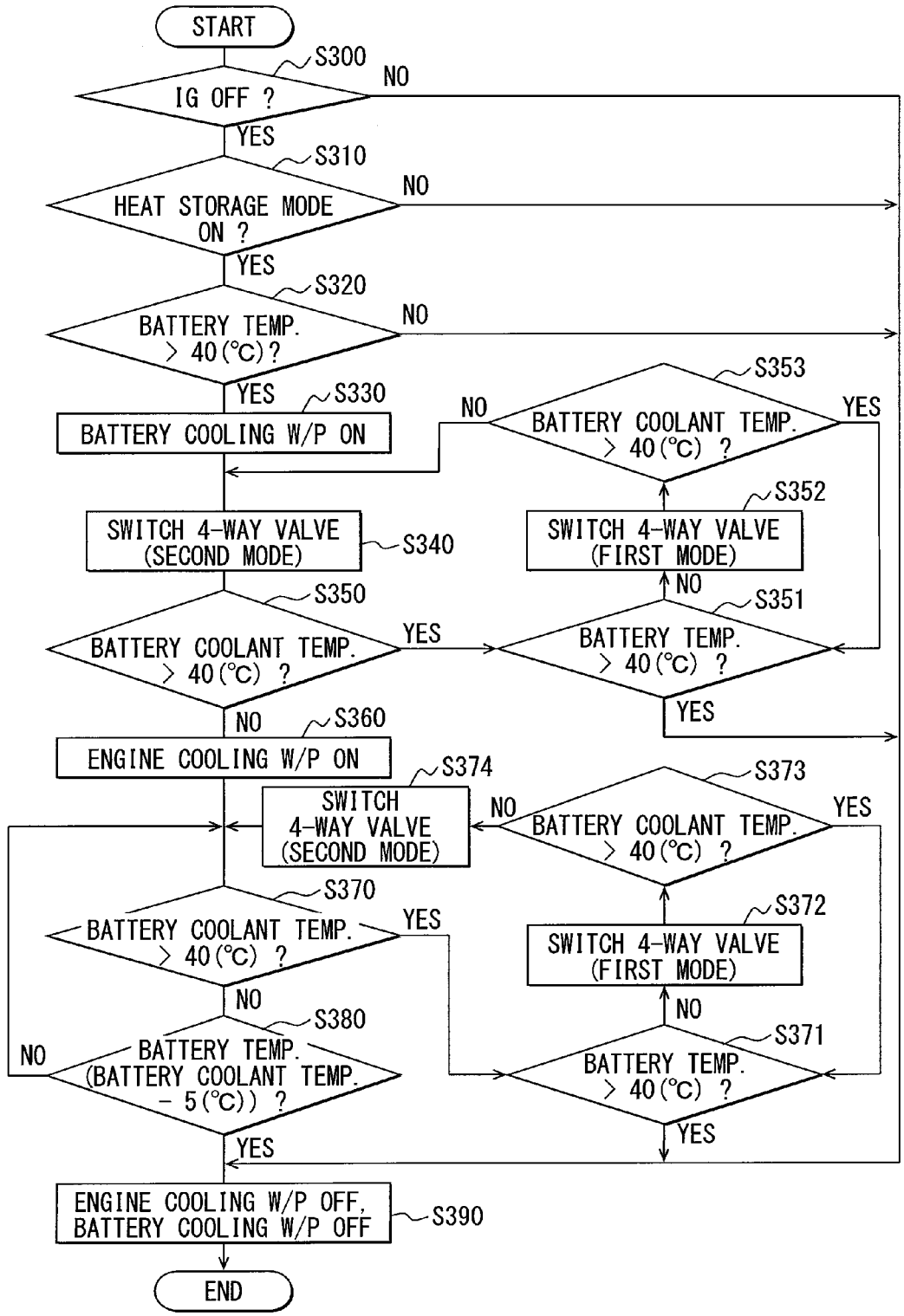
FIG. 20 is a flowchart of a part of the control process in the seventh embodiment.

FIG. 20 is a flowchart of the above-described operation as a control flow performed by the controller 13.

In step S300, it is determined first whether the ignition switch (IG) of the vehicle is turned off (OFF). When it is determined that the ignition switch (IG) of the vehicle is turned off (OFF) (i.e., when S300 is determined as YES), the process proceeds to step S310. When it is determined that the ignition switch (IG) of the vehicle is not turned off (OFF) (i.e., when S300 is determined as NO), this control flow is finished after proceeding to step S390 and stopping both of the engine cooling water pump 61 (i.e., W/P for engine cooling) and the battery cooling water pump 12 (i.e., W/P for battery cooling) (OFF).

In step S310, it is determined whether the heat storage mode is turned on (ON). In this example, when an occupant (i.e., a user) operates the heat storage mode changeover switch on the operation panel, ON and OFF of the heat storage mode is switched. ON and OFF of the heat storage mode may automatically be switched by the controller 13 based on various information.

When it is determined that the heat storage mode is set to ON at step S310 (i.e., when S310 is determined as YES), the process proceeds to step S320. When, on the other hand, it is determined that the heat storage mode is not set to ON at step S310 (i.e., when S310 is determined as NO), this control flow is finished after proceeding to step S390 and stopping both of the engine cooling water pump 61 (i.e., W/P for engine cooling) and the battery cooling water pump 12 (i.e., W/P for battery cooling) (OFF).

In step S320, it is determined whether the battery temperature has exceeded 40 degrees Celsius. When it is determined that the battery temperature has exceeded 40 degrees Celsius (i.e., when S320 is determined as YES), the process proceeds to step S330, and, when it is determined that the battery temperature is not exceeded to 40 degrees Celsius (i.e., when S320 is determined as NO), this control flow is finished after proceeding to step S390 and stopping both of the engine cooling water pump 61 (i.e., W/P for engine cooling) and the battery cooling water pump 12 (i.e., W/P for battery cooling) (OFF).

In step S330, the battery cooling water pump 12 (i.e., W/P for battery cooling) is operated (ON), and the engine cooling water pump 61 is stopped (OFF).

Subsequently, in step S340, the four-way valve 64 is switched to the second mode. In such manner, an operation state shown in FIG. 19 (b) is realized.

Subsequently, in step S350, it is determined whether the battery coolant temperature has exceeded 40 degrees Celsius. When it is determined that the battery coolant temperature has not exceeded 40 degrees Celsius (i.e., when it is determined as NO), the process proceeds to step S360, and, when it is determined that the battery coolant temperature has exceeded 40 degrees Celsius (i.e., when it is determined as YES), the process proceeds to step S351.

In step S360, the engine cooling water pump 61 (i.e., W/P for engine cooling) is operated (ON). In such manner, an operation state shown in FIG. 19 (c) is realized.

Subsequently, in step S370, it is determined whether the battery coolant temperature has exceeded 40 degrees Celsius. When it is determined that the battery coolant temperature has not exceeded 40 degrees Celsius (i.e., when it is determined as NO), the process proceeds to step S380, and, when, on the other hand, it is determined that the battery coolant temperature has exceeded 40 degrees Celsius (i.e., when it is determined as YES), the process proceeds to step S371.

In step S380, it is determined whether the battery temperature has exceeded a temperature that is calculated by subtracting 5 degrees from the battery coolant temperature. In other words, it is determined whether a temperature difference between the battery temperature and the battery coolant temperature (i.e., the battery temperature–the battery coolant temperature) is greater than 5 degrees Celsius. When it is determined that the battery temperature has exceeded a temperature that is calculated by subtracting 5 degrees from the battery coolant temperature (i.e., when it is determined as YES), this control flow is finished after proceeding to step S390 and stopping both of the engine cooling water pump 61 (i.e., W/P for engine cooling) and the battery cooling water pump 12 (i.e., W/P for battery cooling) (OFF). On the other hand, when it is determined that the battery temperature has not exceeded a temperature that is calculated by subtracting 5 degrees from the battery coolant temperature (i.e., when it is determined as NO), the process returns to step S370.

In case when it is determined that the battery coolant temperature has exceeded 40 degrees Celsius in step S350 (i.e., when it is determined as YES), the process proceeds to step S351, and it is determined whether the battery temperature has exceeded 40 degrees Celsius. When it is determined that the battery temperature has not exceeded 40 degrees Celsius (i.e., when it is determined as NO), the process proceeds to step S352, and, when, on the other hand, it is determined that the battery temperature has exceeded 40 degrees Celsius (i.e., when it is determined as YES), this control flow is finished after proceeding to step S390 and stopping both of the engine cooling water pump 61 (i.e., W/P for engine cooling) and the battery cooling water pump 12 (i.e., W/P for battery cooling) (OFF).

In step S352, the four-way valve 64 is switched to the first mode. In such manner, an operation state shown in FIG. 19 (a) is realized.

Subsequently, in step S353, it is determined whether the battery coolant temperature has exceeded 40 degrees Celsius. When it is determined that the battery coolant temperature has not exceeded 40 degrees Celsius (i.e., when it is determined as NO), the process returns to step S340, and, when, on the other hand, it is determined that the battery coolant temperature has exceeded 40 degrees Celsius (i.e., when it is determined as YES), this control flow is finished after proceeding to step S390 and stopping both of the engine cooling water pump 61 (i.e., W/P for engine cooling) and the battery cooling water pump 12 (i.e., W/P for battery cooling) (OFF).

In case when it is determined that the battery coolant temperature has exceeded 40 degrees Celsius in step S370 (i.e., when it is determined as YES), the process proceeds to step S371, and, it is determined whether the battery temperature has exceeded 40 degrees Celsius. When it is determined that the battery temperature has not exceeded 40 degrees Celsius (i.e., when it is determined as NO), the process proceeds to step S372, and, when, on the other hand, it is determined that the battery temperature has exceeded 40 degrees Celsius (i.e., when it is determined as YES), this control flow is finished after proceeding to step S390 and stopping both of the engine cooling water pump 61 (i.e., W/P for engine cooling) and the battery cooling water pump 12 (i.e., W/P for battery cooling) (OFF).

In step S372, the four-way valve 64 is switched to the first mode. Subsequently, in step S373, it is determined whether the battery coolant temperature has exceeded 40 degrees Celsius. When it is determined that the battery coolant temperature has not exceeded 40 degrees Celsius (i.e., when it is determined as NO), the process returns to step S370 after proceeding to step S374 and switching the four-way valve 64 to the second mode, and, when, on the other hand, it is determined that the battery coolant temperature ha exceeded 40 degrees Celsius (i.e., when it is determined as YES), the process returns to step S371.

According to the present embodiment, by storing the waste heat of the engine 3 in a highly-insulated and large heat capacitive secondary battery 1 and by using the stored heat as the thermal energy at the next running time, energy consumption of the secondary battery 1 at the next running time is reduced, thereby realizing an extended cruising range of the vehicle.

Eighth Embodiment

In comparison to the above-described fifth embodiment in which an example of cooling the air blown into the vehicle compartment based on the cold energy stored in the secondary battery is described, an example of the present embodiment is about a supercooling of the refrigerant that comes out from the exterior heat exchanger 33 by using the cold energy stored in the secondary battery.

Figure 21:
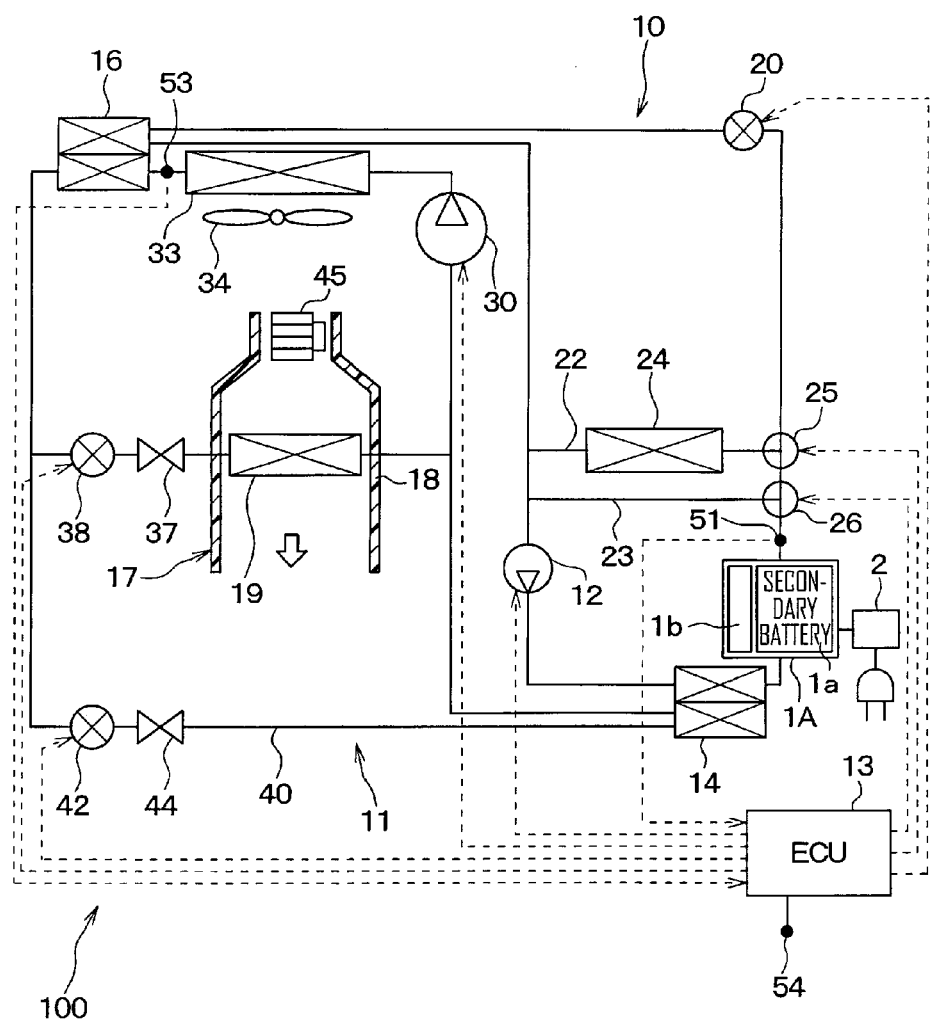
FIG. 21 is a schematic diagram of an in-vehicle thermal system in an eighth embodiment of the present disclosure.

FIG. 21 is a schematic diagram of a configuration of an in-vehicle thermal system 100 of the present embodiment. In FIG. 21, like parts have like numbers in FIG. 21 and FIGS. 12 and 13, for saving the explanation of the like parts.

The in-vehicle thermal system 100 has the following parts added to and deleted from the temperature control apparatus for vehicles in FIGS. 12 and 13, i.e., the parts deleted from FIG. 13 are the heater core 15, the second electromagnetic valve 21, and the cooling apparatus 49, and the parts picked up from FIG. 12 and added to FIG. 13 are the first coolant-refrigerant heat exchanger 14, the first bypass refrigerant passage 40, the third electromagnetic refrigerant valve 42, and the third expansion valve 44.

In the present embodiment, the secondary battery 1 of FIG. 13 is replaced with a battery unit 1A. The battery unit 1A is configured to accommodate a battery heat exchanger 1b and a secondary battery 1a in a heat insulation container which is made of a heat insulation material. The battery heat exchanger 1b is disposed at a space between the outlet of the first coolant-refrigerant heat exchanger 14 and the inlet of the second three-way valve 26. The battery heat exchanger 1b performs heat exchange between the secondary battery 1a and the coolant (i.e., a cooling fluid). The secondary battery 1a is for supplying an electric power to an electric motor for traveling. As the secondary battery 1a, a lithium ion battery may be used, for example. The exterior heat exchanger 33 of the present embodiment serves as a condenser, which includes a heat exchanger for cooling and condensing the high-pressure refrigerant discharged from the compressor 30 and a supercooling unit for supercooling the liquid refrigerant discharged from the heat exchanger.

The controller (i.e., designated as an ECU in the drawing) 13 has a memory, a microcomputer, etc. The memory memorizes map data for computing an outlet side refrigerant temperature of the exterior heat exchanger 33 based on the detected pressure of a pressure sensor 53. Map data is data in which multiple pieces of the detected pressure from the pressure sensor 53 and multiple pieces of the outlet side refrigerant temperature from the exterior heat exchanger 33 are associated with each other in one-to-one manner. The outlet side refrigerant temperature of the exterior heat exchanger 33 is temperature of the refrigerant which flows from the exterior heat exchanger 33 to the second coolant-refrigerant heat exchanger 16.

The microcomputer performs a control process that cools the secondary battery 1a while the battery 1a is charged by the charger 2, and air-conditions the vehicle compartment after charging of the secondary battery 1a. The microcomputer controls, when performing the control process, the battery cooling water pump 12, the first electromagnetic valve 20, the first three-way valve 25, the second three-way valve 26, the second electromagnetic refrigerant valve 38, the third electromagnetic refrigerant valve 42, and the compressor 30, based on the detected temperature of sensors 51 and 54, the detected pressure of the pressure sensor 53 and the map data.

The temperature sensor 51 detects temperature of the coolant which flows from the battery heat exchanger 1b to the second three-way valve 26. The temperature sensor 54 detects temperature of the vehicle outside air (車室外空気). The temperature sensor 54 of the present embodiment detects the air temperature on an upstream side of the air flow which passes through the battery cooling radiator 24. The pressure sensor 53 detects the pressure of the refrigerant which flows from the exterior heat exchanger 33 to the second coolant-refrigerant heat exchanger 16.

The control process of the controller 13 of the present embodiment is described next.

The control process of the controller 13 includes a battery cooling process for cooling the secondary battery 1a during charging of the secondary battery 1a and an air-conditioning control process for air-conditioning the vehicle compartment after execution of the battery cooling process. Hereafter, the battery cooling process and the air-conditioning control process are described separately.

(Battery Cooling Process)

Figure 22:
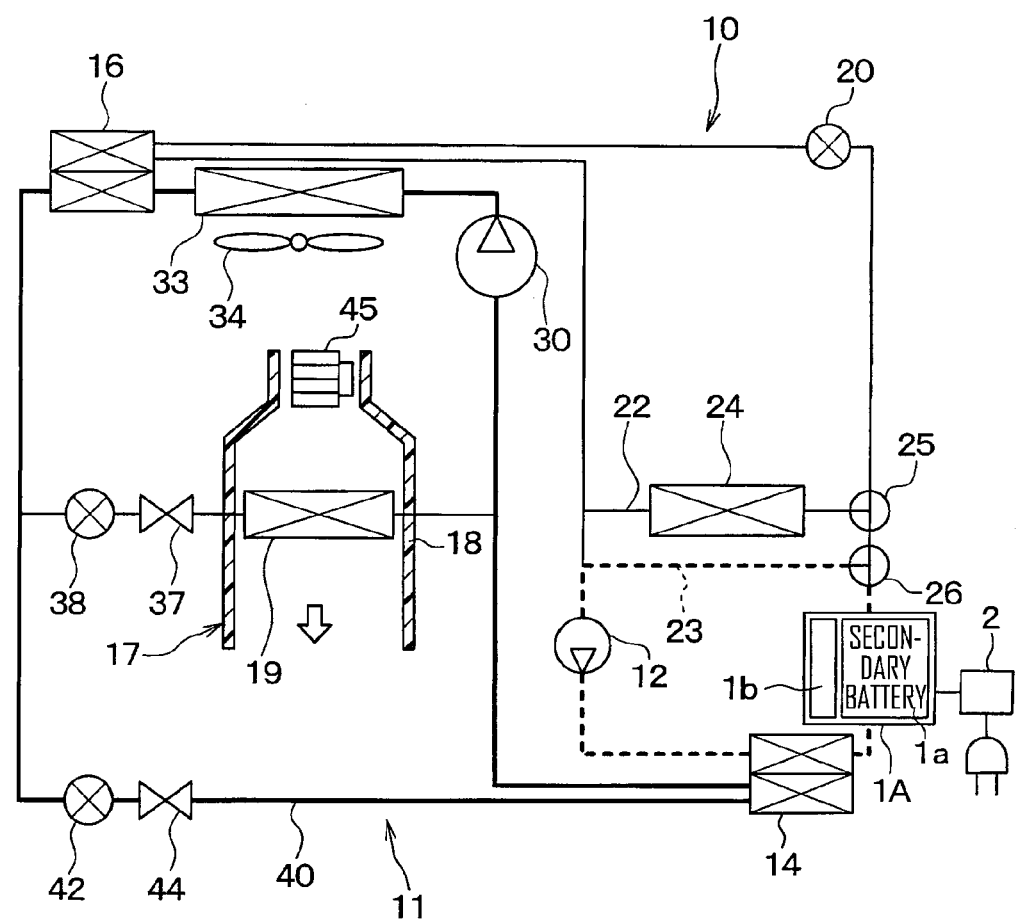
FIG. 22 is a diagram for explaining a flow of a coolant in a battery coolant circuit and a flow of a refrigerant in a refrigeration cycle at a secondary battery charging time in the eighth embodiment.
Figure 23:
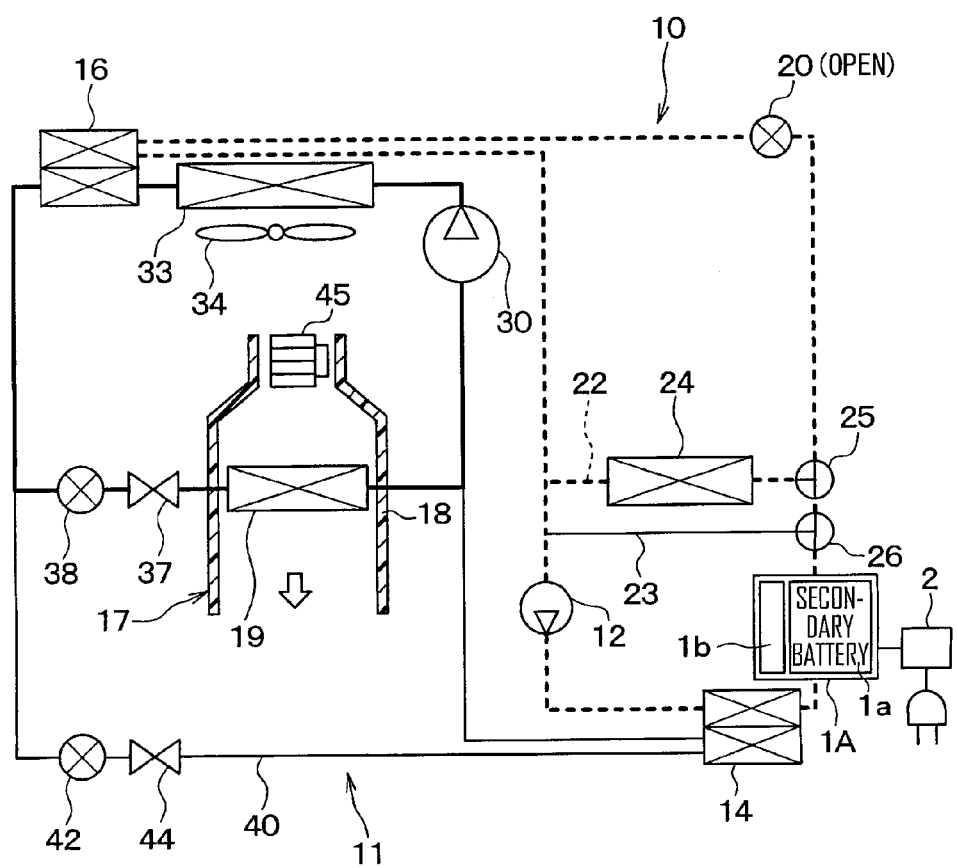
FIG. 23 is a diagram for explaining a flow of the coolant of the battery coolant circuit and a flow of the refrigerant in the refrigeration cycle in an air conditioning control operation of the eighth embodiment.
Figure 24:
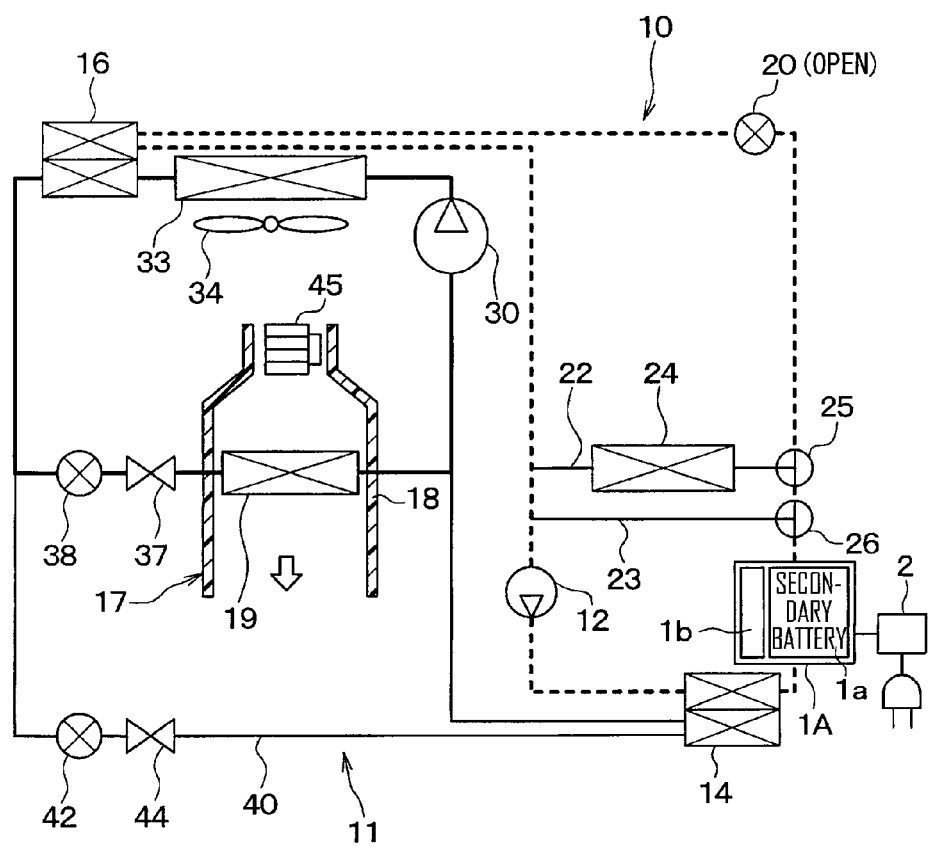
FIG. 24 is a diagram showing a flow of the refrigerant of the battery coolant circuit and a flow of the refrigerant in the refrigeration cycle in the air conditioning control operation of the eighth embodiment.
Figure 25:
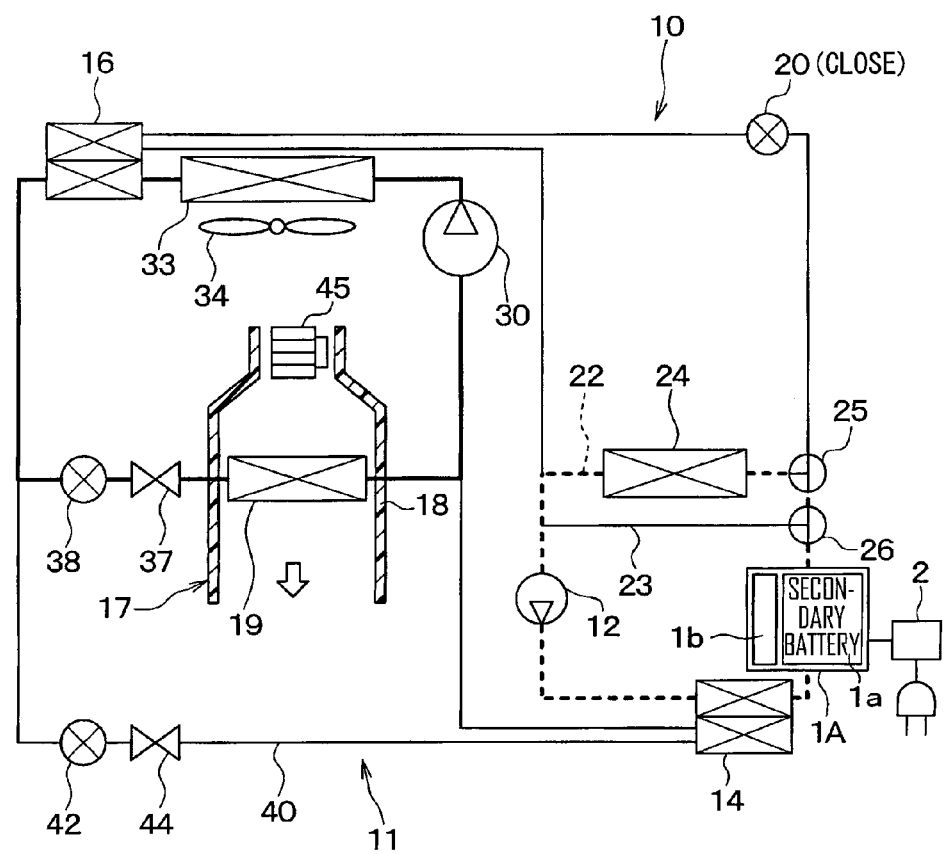
FIG. 25 is a diagram showing a flow of the refrigerant of the battery coolant circuit and a flow of the refrigerant in the refrigeration cycle in the air conditioning control operation of the eighth embodiment.
Figure 26:
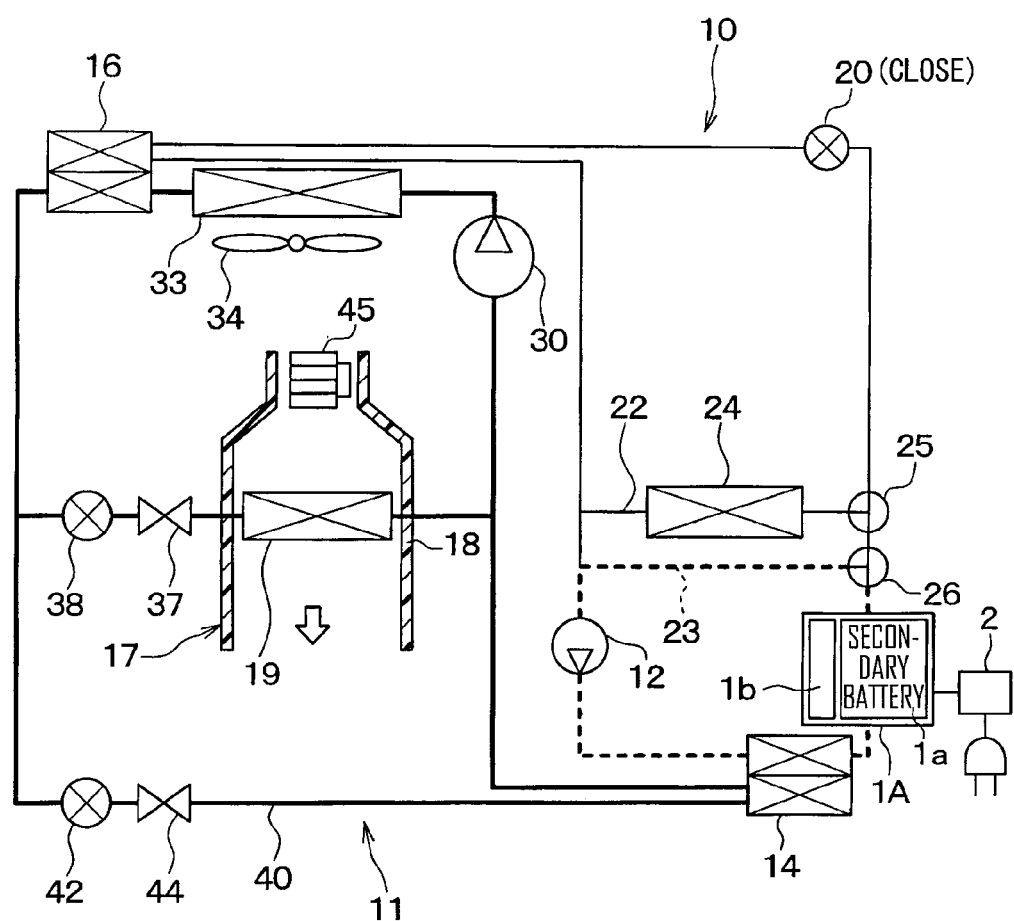
FIG. 26 is a diagram showing a flow of the refrigerant of the battery coolant circuit and a flow of the refrigerant in the refrigeration cycle in the air conditioning control operation of the eighth embodiment.

The battery cooling process is performed for maintaining temperature of the secondary battery 1a within a permissive temperature range (i.e., 10 to 40 degrees Celsius). The permissive temperature range is set up for preserving a sufficient input capacity of the secondary battery 1a and for suppressing a decrease of a usable period of the secondary battery 1a. The input capacity is a capacity for storing the electric power in the secondary battery 1a. In FIG. 22, a circulation passage of the refrigerant and a circulation passage of the coolant in the in-vehicle thermal system 100 at a time when the controller 13 performs the battery cooling process are shown.

First, in the refrigeration cycle 11, a passage between the outlet of the second coolant-refrigerant heat exchanger 16 and the inlet of the third expansion valve 44 is opened by the third electromagnetic refrigerant valve 42 and a passage between the outlet of the second coolant-refrigerant heat exchanger 16 and the inlet of the second expansion valve 37 is closed by the second electromagnetic refrigerant valve 38.

At such time, when the compressor 30 compresses the refrigerant and discharges the high-pressure refrigerant, the high-pressure refrigerant flows to the exterior heat exchanger 33. The high-pressure refrigerant is cooled in the exterior heat exchanger 33 by a blow air from the blower fan 34. Then, the cooled refrigerant passes the second coolant-refrigerant heat exchanger 16 and the third electromagnetic refrigerant valve 42 to flow to the third expansion valve 44, and is decompressed by the third expansion valve 44. The decompressed refrigerant passes the first coolant-refrigerant heat exchanger 14, and returns to the inlet of the compressor 30. That is, as described above, the refrigerant flows from the second compressor 30 to the exterior heat exchanger 33 to the second coolant-refrigerant heat exchanger 16 to the third electromagnetic refrigerant valve 42 to the third expansion valve 44 to the first coolant-refrigerant heat exchanger 14 back to the compressor 30 in the described order (i.e., refer to a thick solid line in FIG. 22).

In the battery coolant circuit 10, a passage between the outlet of the battery heat exchanger 1b and the inlet of the second bypass coolant passage 23 is opened by the second three-way valve 26, and a passage between the inlet of the first three-way valve 25, the inlet of the second bypass coolant passage 23, and the outlet of the battery heat exchanger 1b is closed. Such opening/closing control of the valve 25 is performed by a control portion adapted as a first controller.

In such manner, a closed circuit for circulating the refrigerant is formed by the battery cooling water pump 12, the first coolant-refrigerant heat exchanger 14, and the battery heat exchanger 1b (i.e., refer to a thick chain line in FIG. 22). Therefore, the coolant from the battery cooling water pump 12 flows to the first coolant-refrigerant heat exchanger 14. At such time, the first coolant-refrigerant heat exchanger 14 cools the coolant by using the refrigerant. The cooled coolant flows into the battery heat exchanger 1b to cool the secondary battery 1a in the battery heat exchanger 1b. Therefore, temperature of the secondary battery 1a comes into the permissive temperature range (i.e., 10 to 40 degrees Celsius). Then, the coolant that has passed the battery heat exchanger 1b returns to the inlet of the battery cooling water pump 12 through the second three-way valve 26 and the second bypass coolant passage 23. In such manner, when the refrigerant circulates, the cold energy is stored in the coolant and the secondary battery 1a.

(Air-Conditioning Control Process)

The air-conditioning control process includes a refrigeration cycle control process and a coolant circuit control process. The refrigeration cycle control process and the coolant circuit control process are performed in a time-sharing manner. Hereafter, the refrigeration cycle control process is described first before describing the coolant circuit control process. FIG. 23, FIG. 24, FIG. 25, and FIG. 26 show the refrigerant circulation passage and the coolant circulation passage of the in-vehicle thermal system 100.

First, a passage between the outlet of the second coolant-refrigerant heat exchanger 16 and the inlet of the second expansion valve 37 is opened by the second electromagnetic refrigerant valve 38 and a passage between the outlet of the second coolant-refrigerant heat exchanger 16 and the inlet of the third expansion valve 44 is closed by the third electromagnetic refrigerant valve 42.

At this time, the high-pressure refrigerant discharged from the compressor 30 flows to the second expansion valve 37 through the exterior heat exchanger 33, the second coolant-refrigerant heat exchanger 16, and the second electromagnetic refrigerant valve 38. The refrigerant is decompressed by the second expansion valve 37. The decompressed refrigerant cools the blow air from the air blower 45 at the interior evaporator 19. Then, the coolant which has passed the interior evaporator 19 returns to the inlet of the compressor 30. In such manner, the refrigerant flows from the second compressor 30 to the exterior heat exchanger 33 to the second coolant-refrigerant heat exchanger 16 to the second electromagnetic refrigerant valve 38 to the second expansion valve 37 to the interior evaporator 19 back to the compressor 30 in this order (refer to a thick solid line in FIG. 23, FIG. 24, FIG. 25, and FIG. 26).

Figure 27:
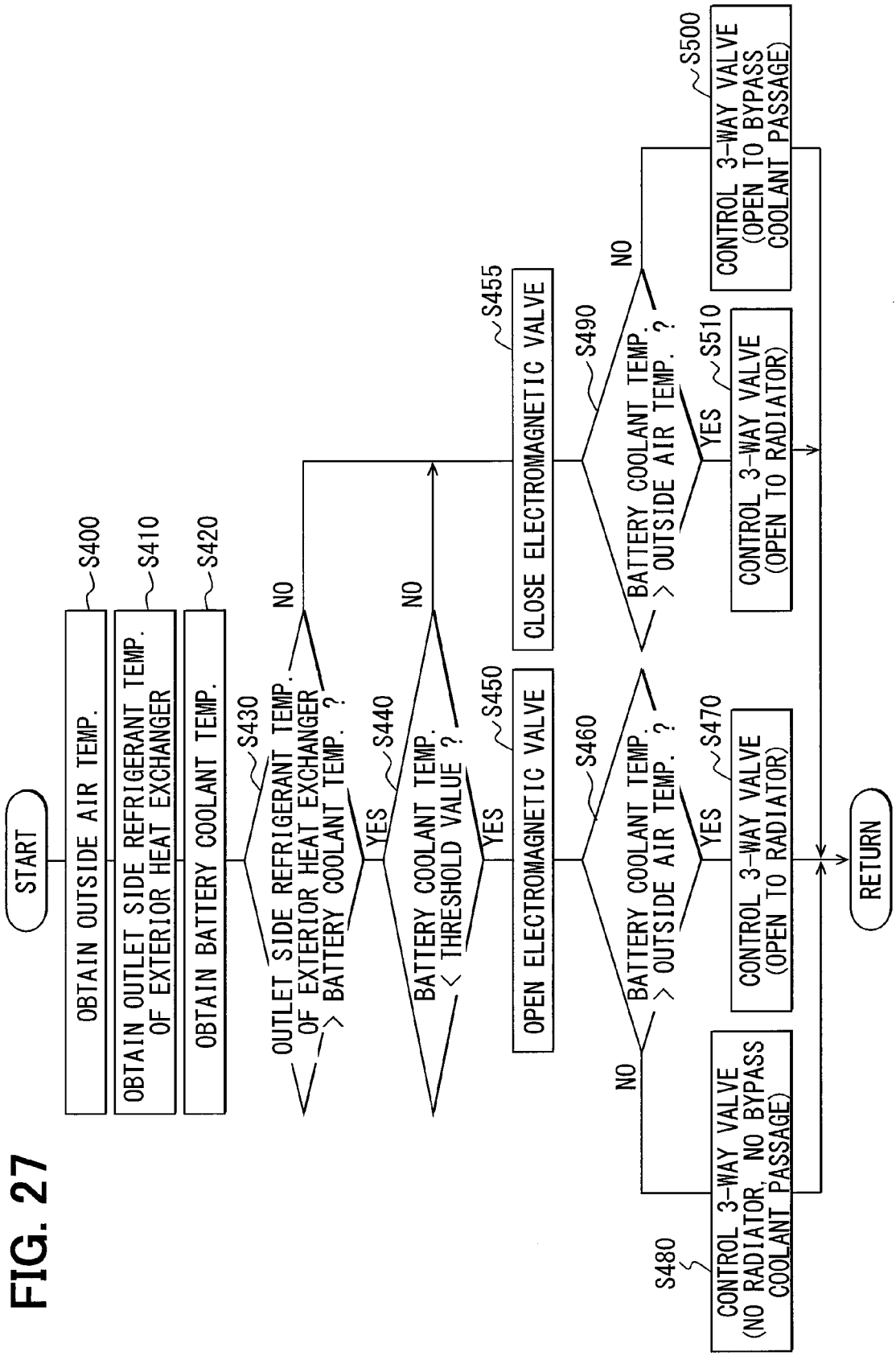
FIG. 27 is a flowchart of a control process of a controller in the eighth embodiment.

Next, the coolant circuit control process is described with reference to FIG. 27. FIG. 27 is a flowchart about the details of the coolant circuit control process. Execution of the coolant circuit control process is started when the drive of the compressor 30 is started after the end of execution of the battery cooling process.

First, in step S400, which serves as a third temperature obtaining portion, a detected temperature of the temperature sensor 54 is obtained as an outside air temperature.

Next, in step S410, which serves as a second temperature obtaining portion, an outlet side refrigerant temperature of the exterior heat exchanger 33 is obtained. More specifically, the detected pressure of the pressure sensor 53 is obtained and the outlet side refrigerant temperature of the exterior heat exchanger 33 corresponding to this detected pressure of the refrigerant is obtained from the above-described map data.

Next, in step S420, which serves as a first temperature obtaining portion, temperature of the temperature sensor 51 is obtained as the battery coolant temperature. Next, in step S430, it is determined as a first determination portion whether the outlet side refrigerant temperature of the exterior heat exchanger 33 is higher than the battery coolant temperature. In such manner, it is determined whether supercooling of the refrigerant by using the coolant in the second coolant-refrigerant heat exchanger 16 is performable.

At such time, when the outlet side refrigerant temperature of the exterior heat exchanger 33 is higher than the battery coolant temperature, it is determined that a determination in step S430 is YES. In other words, it will be determined that supercooling of the refrigerant by using the coolant in the second coolant-refrigerant heat exchanger 16 is performable.

For example, if the coolant supercools the refrigerant in the second coolant-refrigerant heat exchanger 16, temperature of the coolant rises. Accordingly, temperature of the secondary battery 1a rises by the heat exchange between the coolant and the refrigerant in the battery heat exchanger 1b. Then, if temperature of the secondary battery 1a rises higher than the permissive temperature range, it may possibly lead to, in addition to an insufficient output capacity of the secondary battery 1a, a decrease of the usable period of the secondary battery 1a. The output capacity means a capacity of the secondary battery 1a for outputting the electric power.

Then, in the following step S440, which serves as a second determination portion, it is determined whether the battery coolant temperature is lower than a threshold value. The threshold value is a temperature value set to be lower than an upper limit value (e.g., 40 degrees Celsius) of the permissive temperature range of the secondary battery 1a by a predetermined value (e.g., 3 degrees). Then, if the battery coolant temperature is lower than the threshold value, it is determined in step S440 such determination is YES. That is, it is determined that the heat exchange of the second coolant-refrigerant heat exchanger 16 will not cause a problem for the secondary battery 1a. Accordingly, supercooling of the refrigerant in the second coolant-refrigerant heat exchanger 16 is performed in the steps S450, S460, and S470 (or S480).

More specifically, by shifting to step S450, a passage between the outlet of the first three-way valve 25 and the inlet of the second coolant-refrigerant heat exchanger 16 is opened by the first electromagnetic valve 20. Next, in step S460, which serves as a third determination portion, it is determined whether the battery coolant temperature is higher than the outside air temperature. When the battery coolant temperature is higher than the outside air temperature, it is determined that a determination in step S460 is YES, and the process proceeds to step S470.

At such time, the second three-way valve 26 is controlled by a control portion adapted as a second controller, opens a passage between the outlet of the battery heat exchanger 1b and the inlet of the first three-way valve 25, and closes a passage between the outlet of the battery heat exchanger 1b, the inlet of the first three-way valve 25, and the inlet of the second bypass coolant passage 23. In addition, the first three-way valve 25 opens a passage between the outlet of the second three-way valve 26, the inlet of the first electromagnetic valve 20, and the inlet of the battery cooling radiator 24. Therefore, the battery cooling water pump 12, the first coolant-refrigerant heat exchanger 14, the battery heat exchanger 1b, together with the first and second three-way valves 25, 26, the battery cooling radiator 24, the first electromagnetic valve 20, and the second coolant-refrigerant heat exchanger 16 make up a closed circuit through which the coolant circulates (i.e., refer to a thick chain line in FIG. 23).

Therefore, the coolant flowing from the battery cooling water pump 12 passes the first coolant-refrigerant heat exchanger 14, and flows to the battery heat exchanger 1b. In the battery heat exchanger 1b, the coolant is cooled by the secondary battery 1a. The cooled coolant passes the second three-way valve 26. The refrigerant passing through the valve 26 is divided into two coolant flows at the first three-way valve 25, one flow of the coolant flowing toward the first electromagnetic valve 20 and the other flow of coolant flowing toward the battery cooling radiator 24. At such time, the coolant flowing from the first three-way valve 25 to the first electromagnetic valve 20 flows through the first electromagnetic valve 20 to the second coolant-refrigerant heat exchanger 16. The coolant in the second coolant-refrigerant heat exchanger 16 then supercools the refrigerant that has flowed out from the exterior heat exchanger 33. Then, the coolant having passed through the second coolant-refrigerant heat exchanger 16 returns to the inlet side of the battery cooling water pump 12. The coolant flowing from the first three-way valve 25 to the battery cooling radiator 24 is cooled by the outside air in the battery cooling radiator 24. The cooled refrigerant returns to the inlet side of the battery cooling water pump 12. Thus, supercooling of the coolant is performed by a part of the coolant which comes out from the battery heat exchanger 1b, and the remaining coolant is cooled by the vehicle outside air.

Then, the process returns to step S400 of FIG. 27. Therefore, if the following states are kept unchanged, i.e., the outlet side refrigerant temperature of the exterior heat exchanger 33 is higher than the battery coolant temperature, and the battery coolant temperature is lower than a threshold value, and the battery coolant temperature is higher than temperature of the outside air, then the following processes are repeated, i.e., the temperature obtaining process of steps S400, S410, S420, and a YES determination of step S430, and a YES determination of step S440, and an electromagnetic valve open process of step S450, and a YES determination of step S460, and a three-way valve control process of step S470 are repeated.

Next, when the battery coolant temperature falls below the outside air temperature, the process in step S460 is determined as NO, and proceeds to step S480. At such time, the first three-way valve 25 serving as the second controller opens a passage between the outlet of the second three-way valve 26 and the inlet of the first electromagnetic valve 20, and closes a passage between the outlet of the second three-way valve 26, the inlet of the first electromagnetic valve 20, and the inlet of the battery cooling radiator 24. Therefore, the battery cooling water pump 12, the first coolant-refrigerant heat exchanger 14, the battery heat exchanger 1b, the first and second three-way valves 25, 26, the first electromagnetic valve 20, and the second coolant-refrigerant heat exchanger 16 make up a closed circuit through which the coolant circulates (i.e., refer to a thick chain line in FIG. 24). In such manner, while the supercooling of the refrigerant in the second coolant-refrigerant heat exchanger 16 is continued, the cooling of the coolant by the battery cooling radiator 24 is stopped.

Then, the process returns to step S400. Therefore, if the following states are kept unchanged, i.e., the outlet side refrigerant temperature is lower than the exterior heat exchanger 33, and the battery coolant temperature is lower than a threshold value, and the battery coolant temperature is higher than temperature of the outside air, then the following processes are repeated, i.e., the temperature obtaining process of steps S400, S410, S420, and a YES determination of step S430, and a YES determination of step S440, and an electromagnetic valve open process of step S450, and a NO determination of step S460, and a three-way valve control process of step S480.

Then, if the battery coolant temperature rises higher than the outlet side refrigerant temperature of the exterior heat exchanger 33 due to the rise of the battery coolant temperature which is caused when, for example, the secondary battery 1a dissipates heat to the coolant in the battery heat exchanger 1b, the process in step S430 is determined as NO. Then, the process proceeds to step S455, the first electromagnetic valve 20 closes a passage between the inlet of the second coolant-refrigerant heat exchanger 16 and the outlet of the first three-way valve 25. Therefore, the flow of the coolant from the first three-way valve 25 through the first electromagnetic valve 20 to the second coolant-refrigerant heat exchanger 16 is interrupted. Accordingly, heat exchange between the refrigerant and the coolant is no longer performed in the second coolant-refrigerant heat exchanger 16.

Next, in step S490, it is determined whether the battery coolant temperature is higher than the outside air temperature. When the battery coolant temperature is higher than the outside air temperature, it is determined as YES in step S490, and proceeds to step S510. At such time, the first three-way valve 25 opens a passage between the outlet of the second three-way valve 26 and the inlet of the battery cooling radiator 24, and closes a passage between the outlet of the second three-way valve 26, the inlet of the battery cooling radiator 24, and the inlet of the first electromagnetic valve 20. Thus, a coolant circuit for circulating the coolant is formed by the battery cooling water pump 12, the first coolant-refrigerant heat exchanger 14, the battery heat exchanger 1b, the first and second three-way valves 25, 26, and the battery cooling radiator 24 (refer to a thick chain line in FIG. 25). Therefore, the coolant flowing from the battery cooling water pump 12 through the first coolant-refrigerant heat exchanger 14 to the battery heat exchanger 1b absorbs heat from the secondary battery 1a at the battery heat exchanger 1b, and the heat-absorbed coolant flows through the first and second three-way valves 25, 26 to the battery cooling radiator 24. Therefore, the coolant is cooled by the outside air at the battery cooling radiator 24. Thus, the heat absorbed from the secondary battery 1a is dissipated toward an outside of the vehicle compartment.

Then, the process returns to step S400. Then, if the following states are kept unchanged, i.e., the battery coolant temperature is higher than the refrigerant temperature on the outlet side of the exterior heat exchanger 33, and the battery coolant temperature is higher than temperature of the outside air, then the following processes are repeated, i.e., the temperature obtaining process in each of steps S400, S410, S420, and a NO determination of step S430, and an electromagnetic valve close process of step S455, and a YES determination of step S490, and a three-way valve control process of step S510 are repeated.

Next, when the battery coolant temperature falls below the outside air temperature, it is determined as NO in step S490, and the process proceeds to step S500. At such time, the second three-way valve 26 closes a passage between the outlet of the battery heat exchanger 1b, the inlet of the second bypass coolant passage 23, and the inlet of the first three-way valve 25, and opens a passage between the outlet of the battery heat exchanger 1b and the inlet of the second bypass coolant passage 23. Therefore, the second three-way valve 26, the second bypass coolant passage 23, the battery cooling water pump 12, the first coolant-refrigerant heat exchanger 14, and the battery heat exchanger 1b make up a coolant circuit through which the coolant circulates (refer to a thick chain line in FIG. 26).

In such case, in the refrigeration cycle 11, the third electromagnetic refrigerant valve 42 opens a passage between the outlet of the second coolant-refrigerant heat exchanger 16 and the inlet of the third expansion valve 44. Therefore, a part of the refrigerant flowing out of the outlet of the second coolant-refrigerant heat exchanger 16 flows toward the second electromagnetic refrigerant valve 38, and the rest of the refrigerant flows to the first coolant-refrigerant heat exchanger 14 through the third electromagnetic refrigerant valve 42 (i.e., refer to a thick solid line in FIG. 25).

Therefore, the coolant is cooled by the refrigerant in the first coolant-refrigerant heat exchanger 14.

Further, in case that the battery coolant temperature is higher than the threshold value, it is determined as NO in the above-described step S440 in prospect of hindrance to the operation of the secondary battery 1a which is caused by heat exchange at the second coolant-refrigerant heat exchanger 16, and the processes subsequent to the above-described step S455 are performed. In such manner, when the first electromagnetic valve 20 closes a passage between the inlet of the second coolant-refrigerant heat exchanger 16 and the outlets of the first three-way valve 25, heat exchange at the second coolant-refrigerant heat exchanger 16 will no longer be performed.

Figure 28:
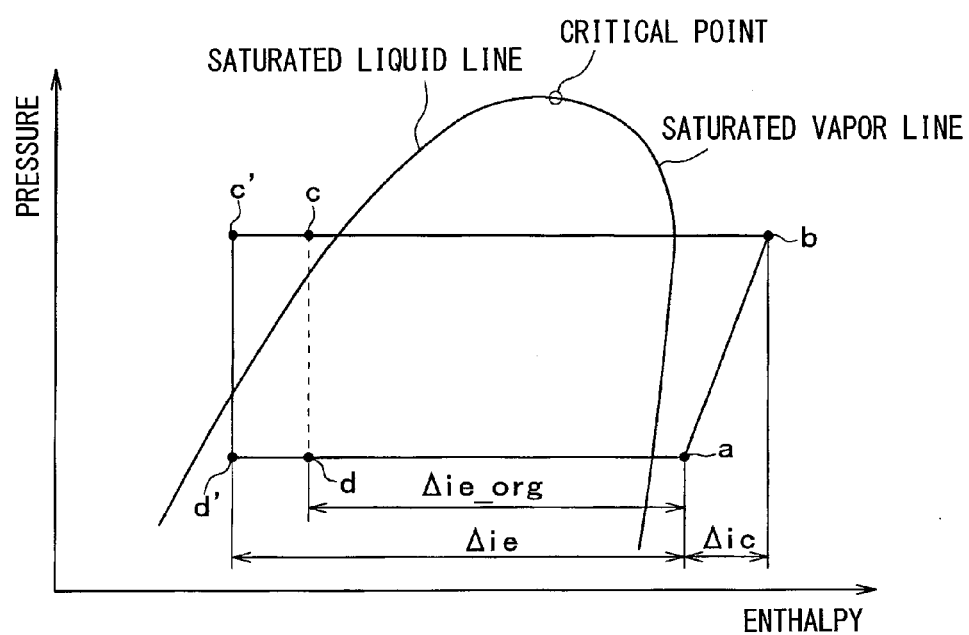
FIG. 28 is a diagram for explaining a relationship between a refrigerant pressure and an enthalpy in the eighth embodiment.

As described above, when the outlet side refrigerant temperature of the exterior heat exchanger 33 is higher than the battery coolant temperature, and the battery coolant temperature is lower than the threshold value, the coolant cooled by the secondary battery 1a in the battery heat exchanger 1b flows to the second coolant-refrigerant heat exchanger 16, and the coolant supercools the refrigerant in the second coolant-refrigerant heat exchanger 16. Therefore, in comparison to a case where the second coolant-refrigerant heat exchanger 16 is not used, an efficiency of the refrigeration cycle 11 is improved. Hereafter, the reason why the efficiency of the refrigeration cycle 11 is improved is described with reference to FIG. 28. FIG. 28 is a Mollier chart of a coolant (i.e., HFC-134a) in which a vertical axis represents a pressure and a horizontal axis represents an enthalpy.

A process transiting from a point a to a point b in the chart shows a compression of the refrigerant by the compressor 30, and a process transiting from the point b to a point c shows a condensation of the refrigerant by the exterior heat exchanger 33, and a process transiting from the point c to a point c' shows a supercooling of the refrigerant by the second coolant-refrigerant heat exchanger 16, and a process transiting from the point c' to a point d' shows a decompression of the refrigerant by the second expansion valve 37 in the present embodiment, and a process transiting from the point d' to the point a shows a heat absorption of the refrigerant by the interior evaporator 19 in the present embodiment. A process transiting from a point c to a point d shows a decompression of the refrigerant by the second expansion valve 37 in a refrigeration cycle which does not use the second coolant-refrigerant heat exchanger 16, and a process transiting from the point d to the point a shows a heat absorption of the refrigerant by the interior evaporator 19 in a refrigeration cycle which does not use the second coolant-refrigerant heat exchanger 16.

When an enthalpy change amount in the process of transiting from the point d' to the point a is designated as Δie, and an enthalpy change amount in the process of transiting from the point d to the point a is designated as Δie_org, a relationship Δie>Δie_org is observed.

First, a required air-conditioning capacity of the interior evaporator 19 is designated as Qreq. Further, a refrigerant flow amount of a refrigeration cycle that does not use the second coolant-refrigerant heat exchanger 16 is designated as Gr_org, and a drive power for driving the compressor 30 in a refrigeration cycle that does not use the second coolant-refrigerant heat exchanger 16 is designated as Lcomp_org. The drive power of the compressor 30 means a required energy for driving the compressor 30.

The following equations (1) and (2) are fulfilled in a refrigeration cycle which does not use the second coolant-refrigerant heat exchanger 16.

$$Qreq = Gr\_org \times \Delta ie\_org \quad \text{Equation (1)}$$

$$Lcomp\_org = Gr\_rg \times \Delta ic \quad \text{Equation (2)}$$

Next, when a refrigerant flow amount of the refrigeration cycle 11 in the present embodiment is designated as Gr, and a drive power for driving the compressor 30 of the refrigeration cycle 11 in the present embodiment is designated as Lcomp, the following equations (3) and (4) are fulfilled.

$$Qreq = Gr \times \Delta ie \quad \text{Equation (3)}$$

$$Lcomp = Gr \times \Delta ic \quad \text{Equation (4)}$$

Here, as described above, ie_org<Δie is true, a relation Gr_org>Gr is fulfilled. Thus, Lcomp_org>Lcomp is fulfilled. Therefore, the interior evaporator 19 of the present embodiment yields the same cooling capacity at a low rotation number of the electric motor in the compressor 30, in comparison to a refrigeration cycle which does not use the second coolant-refrigerant heat exchanger 16. Therefore, a coefficient of performance COP of the refrigeration cycle 11 can be a larger value.

As described above, when the outlet side refrigerant temperature of the exterior heat exchanger 33 is higher than the battery coolant temperature, and the battery coolant temperature is lower than the threshold value, the coolant cooled by the secondary battery 1a in the battery heat exchanger 1b flows to the second coolant-refrigerant heat exchanger 16, and the coolant supercools the refrigerant in the second coolant-refrigerant heat exchanger 16. Therefore, in comparison to a case where the second coolant-refrigerant heat exchanger 16 is not used, an efficiency of the refrigeration cycle 11 is improved. Thus, the drive power of the compressor 30 is reduced in the present embodiment.

In the present embodiment, when the coolant temperature is higher than the threshold value, the electromagnetic valve 20 closes a passage between the first three-way valve 25 and the second coolant-refrigerant heat exchanger 16. Therefore, supercooling of the refrigerant by using the coolant in the second coolant-refrigerant heat exchanger 16 is stopped. In this case, the rise of temperature of the coolant is suppressed by performing heat exchange in the second coolant-refrigerant heat exchanger 16. Thus, the rise of the temperature of the secondary battery 1a in connection to the rise of the coolant temperature is suppressed. Therefore, the rise of temperature of the secondary battery 1a exceeding the permissive temperature range is prevented. In such manner, while securing a sufficient output capacity of the secondary battery 1a, a decrease of the usable period of the secondary battery 1a is suppressed.

In the present embodiment, when outside air temperature is lower than the refrigerant temperature, the second three-way valve 26 opens, in step S470, a passage between the outlet of the battery heat exchanger 1b and the inlet of the battery cooling radiator 24. Therefore, the coolant is cooled by the outside air in the battery cooling radiator 24, and the cooled coolant is controlled to flow through the battery cooling water pump 12, the first coolant-refrigerant heat exchanger 14, the battery heat exchanger 1b, the first and second three-way valves 25, 26, and the first electromagnetic valve 20 to the second coolant-refrigerant heat exchanger 16. Therefore, the coolant cooled by the outside air supercools the refrigerant in the second coolant-refrigerant heat exchanger 16. In such manner, a degree of supercooling of the refrigerant is increased by using the outside air.

In the present embodiment, when the outlet side refrigerant temperature of the exterior heat exchanger 33 is lower than the battery coolant temperature, the coolant is cooled either by the battery cooling radiator 24 or by the first coolant-refrigerant heat exchanger 14. Therefore, the rise of temperature of the secondary battery 1a due to the heat exchange by the battery heat exchanger 1b is suppressed.

Ninth Embodiment

The above-described eighth embodiment describes an example of (i) an interruption of a flow of the coolant that flows from the first three-way valve 25 to the second coolant-refrigerant heat exchanger 16 by the first electromagnetic valve 20 and (ii) a stoppage of heat exchange between the refrigerant and the coolant in the second coolant-refrigerant heat exchanger 16. Instead, in the present embodiment, an example of (iii) an interruption of a flow of the refrigerant that flows from the exterior heat exchanger 33 to the second coolant-refrigerant heat exchanger 16 and (iv) a stoppage of heat exchange in the second coolant-refrigerant heat exchanger 16 is described.

Figure 29:
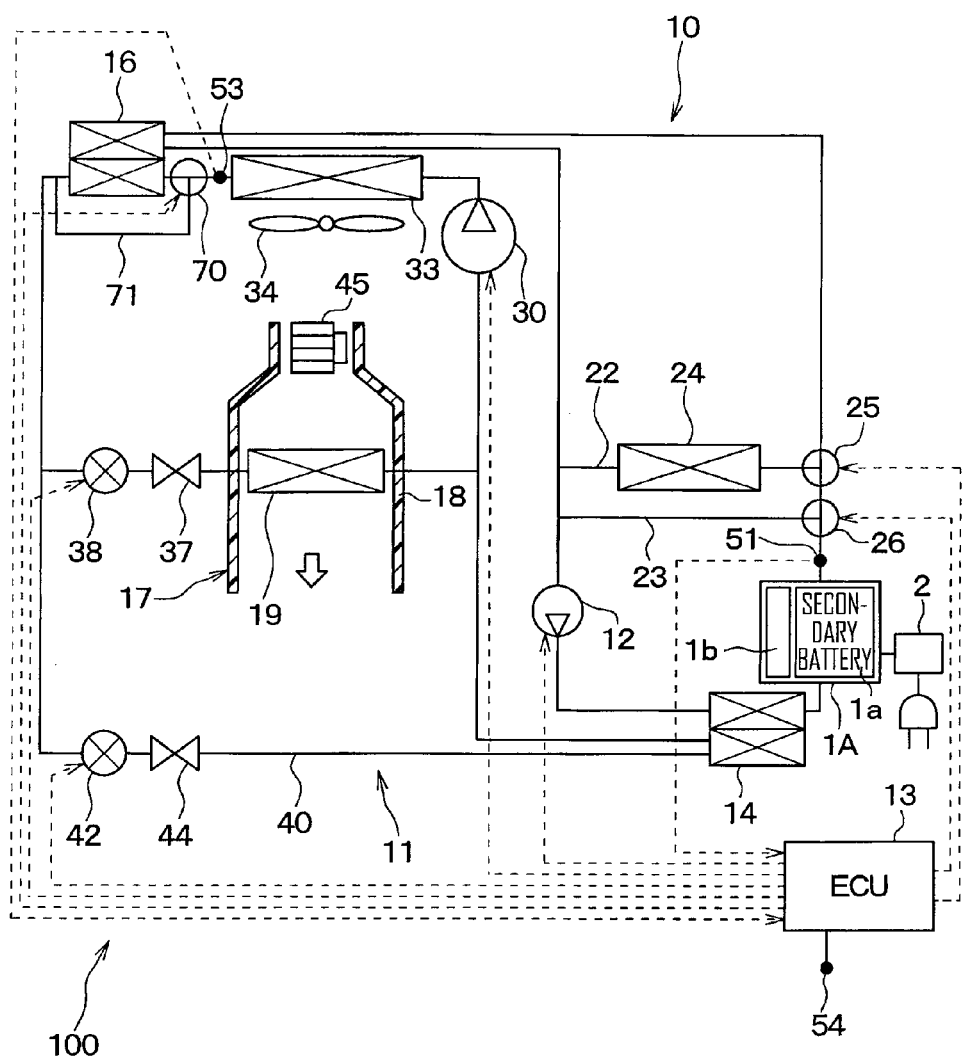
FIG. 29 is a schematic diagram of a in-vehicle thermal system in a ninth embodiment of the present disclosure.

The configuration of the in-vehicle thermal system 100 of the present embodiment is shown in FIG. 29. In FIG. 29, like parts appearing in FIG. 21 have like numbers. The in-vehicle thermal system 100 of the present embodiment is formed on a basis of the in-vehicle thermal system 100 in FIG. 21, from which the first electromagnetic valve 20 is deleted, and, which has added thereto, a three-way valve 70 and a bypass refrigerant passage 71. The bypass refrigerant passage 71 is a passage of the refrigerant that flows from the exterior heat exchanger 33 to the second and third electromagnetic refrigerant valves 38 and 42 by bypassing the second coolant-refrigerant heat exchanger 16. The three-way valve 70 is controlled by the controller 13, for opening a passage between (i) one of the inlet of the second coolant-refrigerant heat exchanger 16 and the inlet of the bypass refrigerant passage 71 and (ii) the outlet of the exterior heat exchanger 33, and for closing a passage between (iii) the other one of the inlet of the second coolant-refrigerant heat exchanger 16 and the inlet of the bypass refrigerant passage 71 and (iv) the outlet of the exterior heat exchanger 33.

In the present embodiment configured in the above-described manner, when the three-way valve 70 (i) opens a passage between the outlet of the exterior heat exchanger 33 and the inlet of the second coolant-refrigerant heat exchanger 16 and (ii) closes a passage between the inlet of the second coolant-refrigerant heat exchanger 16, the inlet of the bypass refrigerant passage 71, and the outlet of the exterior heat exchanger 33, the refrigerant flows from the exterior heat exchanger 33 to the second coolant-refrigerant heat exchanger 16. Therefore, heat exchange between the refrigerant and the coolant in the second coolant-refrigerant heat exchanger 16 is started.

The three-way valve 70 opens a passage between the inlet of the bypass refrigerant passage 71 and the outlet of the exterior heat exchanger 33, and closes a passage between the outlet of the exterior heat exchanger 33, the inlet of the bypass refrigerant passage 71, and the inlet of the second coolant-refrigerant heat exchanger 16. In such manner, the refrigerant flows from the exterior heat exchanger 33 through the bypass refrigerant passage 71 to the second and third electromagnetic refrigerant valves 38 and 42. Therefore, heat exchange between the refrigerant and the coolant in the second coolant-refrigerant heat exchanger 16 is stopped.

According to the present embodiment described above, heat exchange, and the stoppage thereof, between the refrigerant and the coolant in the second coolant-refrigerant heat exchanger 16 is performed by using the three-way valve 70 and the bypass refrigerant passage 71, which replace the first electromagnetic valve 20. Therefore, when, for example, the battery coolant temperature is lower than the threshold value (i.e., refer to step S440 in FIG. 27), similar to the above-described eighth embodiment, the refrigerant is supercooled by the coolant in the second coolant-refrigerant heat exchanger 16 by the opening of the three-way valve 70, which opens a passage from the outlet of the exterior heat exchanger 33 to the inlet of the second coolant-refrigerant heat exchanger 16. Therefore, the same effect as the above-described eighth embodiment is achieved.

Other Embodiments (1) Although the above-described embodiment shows the example which uses heat (i.e., thermal energy) stored in the secondary battery 1 for air-conditioning, heat (i.e., thermal energy) stored in the secondary battery 1 may be used not only for air-conditioning but for warming up and cooling down of vehicle component parts (i.e., temperature control object). The vehicle component parts may be, for example, an engine, a motor, an inverter, a transmission, a transaxle, and the like. That is, for example, by disposing the vehicle component parts in the battery coolant circuit 10, those parts can be heated and cooled by using the battery coolant.

(2) Although the coolant is used as a fluid which takes out heat from the secondary battery 1 in the above-described embodiment, other fluid such as a liquid, i.e., an oil, a gas, i.e., air, functional gas and the like as well as a heat generation unit having a phase change such as a heat pipe and a heat transfer unit such as a Peltier device or the like may also be used.

(3) Although the refrigeration cycle 11 is implemented as a vehicular use air-conditioning device, a refrigeration cycle for other use, which is not a vehicular use, may also be used. For example, a refrigeration cycle may be installed in a battery pack of the secondary battery 1, and the secondary battery 1 may operate such refrigeration cycle as stand-alone device for heating and cooling the battery 1.

(4) Although heat generated by using the external power (i.e., thermal energy) is stored in the secondary battery 1 in the above-described first to sixth embodiments and a waste heat such as heat from an engine is stored in the secondary battery 1 in the above-described seventh embodiment, heat (i.e., thermal energy) to be stored in the battery 1 may also be a waste heat during the travel of the vehicle from other parts such as the secondary battery 1, a motor and an inverter.

(5) Although heat (i.e., thermal energy) is stored in the secondary battery 1 at the charging time (I.e., during a parking time) in the above-described embodiment, heat (i.e., thermal energy) may be stored in the secondary battery 1 during a running time of the vehicle. For example, after determining whether heat (i.e., thermal energy) from an engine and/or air-conditioning is surplus, i.e., sufficient and wasted during the running time, by the controller 13, if it is determined that there is a surplus heat (i.e., thermal energy), such surplus heat (i.e., thermal energy) may be stored in the secondary battery 1 even during the running time.

Further, after a travel of the vehicle, thermal energy (i.e., heat energy and cold energy) in the inside air of the vehicle or in the refrigeration cycle of the vehicle may be stored temporarily as electricity, and such electricity may be used in the next running time.

(6) Although the secondary battery 1 (e.g., a lithium ion battery) is used in the above-described embodiment as a heat capacitive element which builds up (i.e., stores/accumulates) heat, the heat capacitive element is not necessarily be limited to such device. That is, other electricity storage device such as a capacitor or the like may also be used as the heat capacitive element. Further, not only the electricity storage devices but also other in-vehicle components used for the travel of the vehicle such as a motor or the like having a large heat capacity may also be used as the heat capacitive element.

(7) Although ON and OFF of the heat storage mode is selected by an occupant's (i.e., user's) switch operation in the above-described sixth and seventh embodiments, ON and OFF of the heat storage mode may also be selected wirelessly or through wired device from an inside and an outside of the vehicle by using, for example, a remote controller, a cellular phone, a personal computer, or the like.

(8) In addition to the configuration of the above-described embodiments, an occupant (i.e., a user) may be allowed to select an amount of thermal energy to be stored. For example, when an expected travel distance of the next travel is short such as a short-distance commuter use or the like, the user may select "a small heat storage mode," and, when an expected travel distance of the next travel is long such as an excursion or the like, the user may select "a large heat storage mode." In such manner, the heat accumulation is adapted to the vehicle usage, thereby preventing a too-much storage of the thermal energy.

(9) Although ON and OFF of the heat storage mode is selected by an occupant's (user's) switch operation in the above-described embodiment, ON and OFF of the heat storage mode may automatically be switched based on various information. For example, ON/OFF of the heat storage mode may be determined based on a temperature history for a certain period of time, a user's use history for a certain period of time, an outside air temperature, weather forecast information, position information from a vehicle navigation apparatus or the like.

(10) Although the target battery temperature is calculated based on the outside air temperature, the battery temperature, the air-conditioning target temperature TAO, and the like in the above-described embodiment, the target battery temperature may be calculated by other methods. For example, the target battery temperature may be calculated based on a temperature history for a certain period of time, use history information of a certain user for a certain period of time, weather forecast information, position information from a vehicle navigation apparatus or the like.

More specifically, when a user's use history for a certain period of time in the past is used, the target battery temperature (i.e., an accumulation amount of the thermal energy) may preferably be changed in case that only a short distance of travel is expected. In such manner, the thermal energy accumulation amount is adjusted to a minimum amount that can just afford the air-conditioning for an expected time of travel. That is, a wasteful buildup/accumulation of the energy is avoided.

Further, a determination of heat/cool storage may also be performed based on the above-described information.

Although, in the above-described eighth and the ninth embodiments, an example of detecting the outlet side refrigerant temperature of the exterior heat exchanger 33 based on the detected pressure of the pressure sensor 53 is described, the temperature detection may be changed to the following schemes of (i) to (iii).

(i) Use of a Pressure Sensor for Detecting a Coolant Pressure Flowing from the Compressor 30 to the Exterior Heat Exchanger 33

Based on the detected pressure of such pressure sensor, the temperature (i.e., henceforth designated as a condensation temperature) of the refrigerant condensed by the exterior heat exchanger 33 is calculated. Then, by storing a degree of supercooling of the refrigerant corresponding to the supercooling capacity of the exterior heat exchanger 33 in advance in a memory, the outlet side refrigerant temperature of the exterior heat exchanger 33 may be calculated based on the stored degree of supercooling of the refrigerant and the above-described condensation temperature.

(ii) Use of the Pressure Sensor of the Above-Described (i) and the Temperature Sensor 54 which Detects the Outside Air Temperature The degree of supercooling of the refrigerant is calculated by using the detected pressure of the pressure sensor and the detected temperature of the temperature sensor 54. Then, based on the degree of supercooling and the condensation temperature, the outlet side refrigerant temperature of the outer heat exchanger 33 is calculated.

(iii) Use of the Temperature Sensor for Detecting the Refrigerant Temperature Between the Outlet of the Compressor 30 and the Inlet of the Exterior Heat Exchanger 33

The sensor-detected temperature is used as the outlet side refrigerant temperature.

In the example of the above-described eighth embodiment, the temperature sensor 51 detects the refrigerant temperature between the outlet of the battery heat exchanger 1b and the inlet of the second three-way valve 26, and the detected temperature of the temperature sensor 51 is used as the coolant temperature in a determination of steps S430, S440, S460, and S490 of FIG. 27. However, instead of such temperature detection scheme, the following schemes of (iv) to (viii) may be used.

(iv) Determination in Each of Steps S430, S440, S460, and S490 Performed by Using the Temperature which is Calculated by Adding a Predetermined Value to the Detected Temperature of the Temperature Sensor 51

The predetermined temperature value is a value equivalent to a temperature rise which is caused by an absorbed heat in the coolant which is absorbed by the coolant through a pipe that guides the refrigerant from the battery unit 1A to the second coolant-refrigerant heat exchanger 16.

(v) Use of the Temperature Sensor for Detecting Temperature of the Secondary Battery 1a The detected temperature of such temperature sensor is used in a determination in each of steps S430, S440, S460, and S490 as the coolant temperature.

(vi) Use of the Temperature Sensor for Detecting Temperature of the Secondary Battery 1a The detected temperature of such temperature sensor is, after adding the above-described predetermined value added thereto, used in a determination in each of steps S430, S440, S460, and S490 as the coolant temperature.

(vii) Use of the Temperature Sensor which Detects Temperature of the Refrigerant in the Battery Heat Exchanger 1b The detected temperature of such temperature sensor is used as the coolant temperature in a determination in each of steps S430, S440, S460, and S490.

(viii) Use of the Temperature Sensor which Detects Temperature of the Refrigerant in the Battery Heat Exchanger 1b The detected temperature of such temperature sensor is, after adding the above-described predetermined value added thereto, used as the coolant temperature in a determination in each of steps S430, S440, S460, and S490.

Although in the above-described eighth embodiment, disclosure describes an example of parallel arrangement of the battery cooling radiator 24 and the second coolant-refrigerant heat exchanger 16 in parallel with each other at a position between the inlet of the battery cooling water pump 12 and the outlet thereof, such a parallel arrangement may be replaced with a series arrangement of the battery cooling radiator 24 and the second coolant-refrigerant heat exchanger 16 at a position between the inlet and the outlet of the battery cooling water pump 12.

For example, when the battery cooling radiator 24 is disposed between the outlet of the first electromagnetic refrigerant valve 20 and the inlet of the second coolant-refrigerant heat exchanger 16, a bypass passage that flows the coolant flowing out of the first electromagnetic refrigerant valve 20 to the inlet side of the second coolant-refrigerant heat exchanger 16 by bypassing the battery cooling radiator 24, together with an electromagnetic valve that opens and closes such bypass passage, may be provided. Then, by opening/closing of the electromagnetic valve, the coolant may be guided to one of the battery cooling radiator 24 and the bypass passage at a position between the first electromagnetic refrigerant valve 20 and the second coolant-refrigerant heat exchanger 16, and the coolant may be stopped to be guided to the other passage, i.e., a passage other than the one of the battery cooling radiator 24 and the bypass passage described above.

Although, in the above-described eighth and ninth embodiments, an example of the exterior heat exchanger 33 is described as a combination of a heat exchanger that cools and condenses the refrigerant and a supercooling unit that supercools a liquid refrigerant flowing out of the heat exchanger, such exterior heat exchanger 33 may be replaced with the one that has a heat exchanger only configuration, in which only the heat exchanger from among the heat exchanger and the supercooling unit is used. In such case, a receiver may be provided, for guiding, to the second and third expansion valves 37 and 44, only a liquid refrigerant from among various refrigerants that flow out from the outlet of the exterior heat exchanger 33.

Although, in the above-described eighth and ninth embodiments, the coolant is described as an example of the cooling fluid, the cooling fluid may be any fluid other than the coolant, i.e., an oil, a gas, or other fluid.

Although, in the above-described eighth and ninth embodiments, there are described an example arrangement of the first three-way valve 25 arranged at a position between the outlet of the battery heat exchanger 1b, the inlet of the battery cooling radiator 24 and the inlet of the second coolant-refrigerant heat exchanger 16; the first three-way valve 25 may be arranged at other positions such as a position between the inlet of the battery heat exchanger 1b, the outlet of the battery cooling radiator 24, and the outlet of the second coolant-refrigerant heat exchanger 16. Similarly, the second three-way valve 26 may be arranged at a position between the inlet of the battery heat exchanger 1b, the outlet of the battery cooling radiator 24, and the outlet of the second coolant-refrigerant heat exchanger 16. Further, the first electromagnetic refrigerant valve 20 may be arranged at a position between the inlet of the battery heat exchanger 1b, the outlet of the battery cooling radiator 24, and the outlet of the second coolant-refrigerant heat exchanger 16.

Although the above-described eighth ninth embodiments describe an example which uses the first coolant-refrigerant heat exchanger 14 as a cooling device, the Peltier device may also be used as the cooling device.

The above-described embodiments and modifications of the present disclosure may have the following technical features and aspects.

In a first example of the present disclosure, a vehicle temperature control apparatus for controlling temperature of a temperature control object which is at least one of inside air of a vehicle compartment and a vehicle component, includes: a heat capacitive element (1) capable of storing heat; a refrigeration cycle (11) in which heat is absorbed from a low temperature side and is dissipated to a high temperature side; a heat exchanger (14, 16) that causes the heat stored in the heat capacitive element (1) to be exchanged with a refrigerant of the refrigeration cycle (11); and a heat dissipation portion (19, 31) configured to dissipate heat contained in the refrigerant of the refrigeration cycle (11) to the temperature control object.

Since heat exchange is performed to transfer the stored heat in the heat capacitive element (1) to the refrigerant of the refrigeration cycle (11), even when a temperature difference between the heat capacitive element (1) and the temperature control object is small, the heat stored in the heat capacitive element (1) is utilized. Therefore, temperature control is efficiently performed by using the heat capacitive element (1). In the present disclosure, heat means both the heat energy and the cold energy.

In a second example of the present disclosure, the heat dissipation portion (31) may be configured to heat the temperature control object by using the refrigerant of the refrigeration cycle (11), and the heat exchanger (14) may be disposed on a low-pressure side of the refrigeration cycle (11).

In this case, since heat exchange is performed to transfer the heat stored in the heat capacitive element (1) to the low-pressure side refrigerant of the refrigeration cycle (11), the low pressure of the refrigeration cycle (11) is raised when heating the temperature control object, thereby realizing a large heating capacity as well as an electric power saving characteristic of the refrigeration cycle (11).

In a third example of the present disclosure, the heat dissipation portion (19) may be configured to cool the temperature control object by using the refrigerant of the refrigeration cycle (11), and the heat exchanger (16) may be disposed on a high-pressure side of the refrigeration cycle (11).

In a fourth example of the present disclosure, the temperature control apparatus may be further provided with a second heat dissipation portion (15) that dissipates heat stored in the heat capacitive element (1) to the temperature control object without using the refrigerant of the refrigeration cycle (11).

Since the heat stored in the heat capacitive element (1) can be not only dissipated to the temperature control object through the refrigerant of the refrigeration cycle (11), but can also be dissipated to the temperature control object directly without using the refrigerant of the refrigeration cycle (11), the stored heat in the heat capacitive element (1) can be used variously.

In the fifth example of the present disclosure, the vehicle temperature control apparatus may be provided with a switch unit (20, 21, 26) that switches between two modes, one mode that performs heat exchange for transferring heat stored in the heat capacitive element (1) to the refrigerant of the refrigeration cycle (11) by using the heat exchanger (14, 16), and other mode that dissipates the heat stored in the heat capacitive element (1) to the temperature control object by using the second heat dissipation portion (15).

According to the above, the using method of the heat stored in the heat capacitive element (1) can be changed in accordance with a use environment or the like.

In a sixth example of the present disclosure, the heat to be stored in the heat capacitive element (1) may be provided by using an external power for charging an electricity storage device installed in the vehicle.

In this case, the heat stored in the heat capacitive element (1) by using the external power can then be used at the running time. Therefore, the stored heat energy is saved during the running time, thereby enabling an extension of the cruising range of the vehicle. Further, when the cruising range of the vehicle needs not be extended, the heat capacity of the heat capacitive element (1) can alternatively be decreased.

In a seventh example of the present disclosure, the heat capacitive element (1) may be an electricity storage device mounted to the vehicle.

In such manner, an existing electricity storage device can be efficiently utilized as a heat capacitive element. Incidentally, since the electricity storage device generally has a very large heat capacity in comparison to the other in-vehicle parts, such device can advantageously be used to store a large amount of heat. Further, since the electricity storage device is generally disposed at a position which is not susceptible to an external heat from an outside of the vehicle such as a sun ray or the like, and has a relatively high insulation structure, which yields an advantage of high electricity/heat storage effects.

In an eighth example of the present disclosure, the vehicle temperature control apparatus may be provided with: an interrupter (20, 21, 26, 64) that interrupts and resumes heat storage in the heat capacitive element (1) and heat dissipation from the heat dissipation portion (19, 31) to the temperature control object; and a controller (13) that controls the interrupter (20, 21, 26, 64) based on a determination result of heat storage requirement whether the heat capacitive element (1) is required to store heat therein. In this case, when the controller (13) determines that the heat capacitive element (1) is required to store heat, the controller (13) controls the interrupter (20, 21, 26, 64) so that heat is firstly stored in the heat capacitive element (1) and is then dissipated from the heat capacitive element (1) to the temperature control object.

According to the above, a storing of heat in the heat capacitive element (1) and dissipating of heat to the temperature control object are performed appropriately, thereby enabling a more effective temperature control by using the heat capacitive element (1).

In a ninth example of the present disclosure, a vehicle temperature control apparatus for controlling temperature of a temperature control object, which is at least one of inside air of a vehicle compartment and a vehicle component includes: a heat capacitive element (1) capable of storing heat; a heat dissipation portion (15, 19, 31) that dissipates heat stored in the heat capacitive element (1) to the temperature control object; an interrupter (20, 21, 26, 64) that interrupts and resumes heat storage in the heat capacitive element (1) and heat dissipation from the heat capacitive element (1) to the temperature control object; and a controller (13) that controls the interrupter (20, 21, 26, 64) based on a determination result of heat storage requirement whether the heat capacitive element (1) is required to store heat therein. Furthermore, when the controller (13) determines that the heat capacitive element (1) is required to store heat, the controller (13) controls the interrupter (20, 21, 26, 64) so that heat is firstly stored in the heat capacitive element (1) and then the stored heat is dissipated from the heat capacitive element (1) to the temperature control object.

According to the above, since heat stored in the heat capacitive element (1) and heat dissipation to the temperature control object are performed appropriately, temperature control is efficiently performed by using the heat capacitive element (1).

In a tenth example of the present disclosure, the controller (13) may calculate a target temperature of the heat capacitive element (1) and controls the interrupter (20, 21, 26, 64) based on the target temperature, and the controller (13) may change the target temperature to be different from each other between a case in which it is determined that the heat storage in the heat capacitive element (1) is required, and a case in which it is determined that the heat storage in the heat capacitive element (1) is not required. Thus, heat storage in the heat capacitive element (1) can be performed more appropriately For example, according to an eleventh example of the present disclosure, the controller (13) may set the target temperature to be higher in a case in which a storage of a heat energy in the heat capacitive element (1) is determined to be required, as compared with a case in which the storage of the heat energy in the heat capacitive element (1) is determined to be not required.

More specifically, according to a twelfth example of the present disclosure, the controller (13) may set the target temperature to be lower in a case in which a storage of a cold energy in the heat capacitive element (1) is determined to be required, than a case in which the storage of the cold energy in the heat capacitive element (1) is determined to be not required.

In a thirteenth example of the present disclosure, the vehicle temperature control apparatus may include a heat collection portion (10, 60) that collects heat remaining in the vehicle to the heat capacitive element (1). In this case, the interrupter (20, 21, 26, 64) is configured to interrupt and resume heat collection by the heat collection portion (10, 60), and the controller (13) controls the interrupter (20, 21, 26, 64) such that heat collection by the heat collection portion (10, 60) is started when an ignition switch of the vehicle is turned off. In such manner, the remaining heat in the vehicle at a vehicle stop time is effectively used for temperature control.

In addition, "heat collection by the heat collection portion (10, 60) is started when an ignition switch of the vehicle is turned off" in the present disclosure not only includes a case that heat collection is started immediately after the turning off of the ignition switch of the vehicle, but also includes other case that heat collection is started at a time when two conditions are fulfilled, i.e., a condition of the turning off of the ignition switch of the vehicle and a certain other condition. An example of fulfillment of the two conditions, i.e., a condition of the turning off of the ignition switch of the vehicle and a certain other condition, may be a case in which, after the turning off of the ignition switch of the vehicle, a certain time has passed.

In a fourteenth example of the present disclosure, the vehicle temperature control apparatus may include a heat collection portion (10, 60) that collects heat remaining in the vehicle to the heat capacitive element (1). In this case, the interrupter (20, 21, 26, 64) is configured to interrupt and resume heat collection by the heat collection portion (10, 60), and the controller (13) determines whether heat is surplus in the vehicle during a vehicle running time, and controls the interrupter (20, 21, 26, 64) such that heat collection by the heat collection portion (10, 60) is performed even during the vehicle running time when the controller (13) determines that heat is surplus in the vehicle. In such manner, the surplus heat in the vehicle during the vehicle running time is effectively used for temperature control.

In a fifteenth example of the present disclosure, an in-vehicle thermal system includes: a battery heat exchanger (1b) exchanging heat between a secondary battery (1a) and a cooling fluid; a refrigerant-cooling heat exchanger (16) which cools, by using the cooling fluid, a refrigerant that flows from a condenser (33) to a decompression device (37, 44) in a refrigeration cycle (11) for an air-conditioning device; a pump (12) which circulates the cooling fluid between the battery heat exchanger and the refrigerant-cooling heat exchanger; a bypass passage (23) which guides the cooling fluid discharged from the battery heat exchanger to an inlet side of the battery heat exchanger by bypassing the refrigerant-cooling heat exchanger; a first valve (26) which opens a passage between (i) one of the bypass passage and the refrigerant-cooling heat exchanger and (ii) the battery heat exchanger, and closes a passage between (iii) other one of the bypass passage and the refrigerant-cooling heat exchanger and (iv) the battery heat exchanger; a cooler (14) which cools the cooling fluid; a first controller which controls the first valve to cool the cooling fluid by the cooler, and to form a closed circuit for circulating the cooling fluid through the battery heat exchanger, the bypass passage and the pump by opening the passage between the bypass passage and the battery heat exchanger when the secondary battery is charged by a charger (2); a first temperature obtaining portion (S420) which obtains temperature of the cooling fluid; a second temperature obtaining portion (S410) which obtains temperature of the refrigerant that flows from the condenser to the decompression device; a first determination portion (S430) which determines whether the temperature obtained by the first temperature obtaining portion is lower than the temperature obtained by the second temperature obtaining portion; and a second controller (S470, S480) which controls the first valve to form a closed circuit for circulating the cooling fluid through the battery heat exchanger, the refrigerant-cooling heat exchanger and the pump, by opening the passage between the battery heat exchanger and the refrigerant-cooling heat exchanger when the first determination portion determines that the temperature obtained by the first temperature obtaining portion is lower than the temperature obtained by the second temperature obtaining portion after the first controller is operated.

In such case, when the secondary battery is charged, the closed circuit is formed for cooling the cooling fluid and for circulating the cooling fluid through the battery heat exchanger, the bypass passage, and the pump. Therefore, the cold energy is stored in the cooling fluid and the secondary battery. Then, after an end of charging of the secondary battery, the closed circuit for circulating the cooling fluid through the battery heat exchanger, the refrigerant-cooling heat exchanger, and the pump is formed. Therefore, in the refrigerant-cooling heat exchanger, the refrigerant is cooled by using the cold energy stored in the cooling fluid and the battery. Thus, the degree of supercooling of the refrigerant which comes out from the condenser is increased, and the efficiency of the air-conditioning refrigeration cycle apparatus is improved. Therefore, the energy for driving the compressor which constitutes the air-conditioning refrigeration cycle apparatus is reduced. As a result, the required power for air-conditioning in the vehicle is reduced by using the cold energy stored in the secondary battery.

In a sixteenth example of the present disclosure, the in-vehicle thermal system may include a second determination portion (S440) which determines whether the temperature obtained by the first temperature obtaining portion is lower than a threshold value. In this case, when the second determination portion determines that the temperature obtained by the first temperature obtaining portion is lower than the threshold value, the second controller is operated, and, when the second determination portion determines that the temperature obtained by the first temperature obtaining portion is higher than the threshold value, the second controller is not operated. In this case, the threshold value is a value that is calculated by subtracting a predetermined value form an upper limit value of the permissive temperature range of the secondary battery.

In such case, when temperature of the cooling fluid is higher than the threshold value, the second controller does not perform a control. Then, if temperature of the secondary battery rises to a high temperature, besides hindering a sufficient output capacity of the secondary battery, a usable period (i.e., a battery life) of the secondary battery may be shortened. In this case, the output capacity means a capacity of the secondary battery for outputting the electric power.

When the temperature of the cooling fluid is higher than the threshold value, the second controller may be allowed not to perform a control. Therefore, in the refrigerant-cooling heat exchanger, heat exchange between the refrigerant and the cooling fluid is stopped. Thus, the temperature rise of the cooling fluid is restricted, and the temperature rise of the secondary battery by the cooling fluid is thus restricted. Therefore, in addition to restricting a deterioration of the output capacity of the secondary battery, the decrease of the usable period of the secondary battery is restricted.

In a seventeenth example of the present disclosure, the cooler (14) may be an evaporator which is a part of the air-conditioning device and which cools the cooling fluid by using the refrigerant that flows from the decompression device to a compressor.

In an eighteenth example of the present disclosure, the in-vehicle thermal system may include: a radiator (24) that is disposed at a position between the inlet and the outlet of the refrigerant-cooling heat exchanger (16) and cools the cooling fluid by using outside air of the vehicle compartment; a second valve (20, 25) which opens and closes a passage between the radiator, the refrigerant-cooling heat exchanger (14) and the battery heat exchanger (1b); a third temperature obtaining portion (S400) which obtains temperature of the outside air of the vehicle; and a third determination portion (S460) which determines whether the temperature obtained by the third temperature obtaining portion is lower than the temperature obtained by the first temperature obtaining portion. In this case, when the third determination portion determines that the temperature obtained by the third temperature obtaining portion is lower than the temperature obtained by the first temperature obtaining portion, the second controller (S470) controls the first valve and the second valve to open the passage between the radiator (24), the refrigerant-cooling heat exchanger (14) and the battery heat exchanger (1b), and to form a closed circuit through which the cooling fluid circulates from the battery heat exchanger to the refrigerant-cooling heat exchanger to the radiator and to the pump.

When the temperature of the outside air is lower than the temperature of the cooling fluid, the second controller controls the first valve and the second valve for forming a closed circuit through which the cooling fluid circulates from the battery heat exchanger to the refrigerant-cooling heat exchanger to the radiator and to the pump. Therefore, the cooling fluid is cooled in the radiator by using the outside air, and the cooled cooling fluid is used to supercool the refrigerant. In such manner, the degree of supercooling of the refrigerant is increased by utilizing the vehicle outside air.

In a nineteenth example of the present disclosure, the condenser (33) may be configured by (i) a heat exchanger which cools and condenses the refrigerant discharged from the compressor of the air-conditioning device, and (ii) a supercooling portion that supercools liquid refrigerant flowing from the heat exchanger.

What is claimed is:

1. A vehicle temperature control apparatus for controlling temperature of a temperature control object which is at least one of inside air of a vehicle compartment and a vehicle component, the vehicle temperature control apparatus comprising:
    a heat capacitive element capable of storing heat;
    a coolant circuit in which a cooling water for cooling the heat capacitive element circulates, the heat capacitive element being located in the coolant circuit;
    a refrigeration cycle in which refrigerant circulates, and heat is absorbed from a low temperature side of the refrigerant and is dissipated to a high temperature side of the refrigerant;
    a heat exchanger disposed to exchange heat between the refrigerant in the refrigeration cycle and the cooling water in the coolant circuit;
    a first heat dissipation portion configured to dissipate heat contained in the refrigerant of the refrigeration cycle to the temperature control object;
    an interrupter that interrupts and resumes heat storage in the heat capacitive element and heat dissipation from the heat dissipation portion to the temperature control object;
    a controller that controls the interrupter based on a determination result of heat storage requirement whether the heat capacitive element is required to store heat therein; and
    a second heat dissipation portion disposed in the coolant circuit, the second heat dissipation portion dissipating heat contained in the heat capacitive element to the temperature control object, wherein
    the controller controls the interrupter so that heat is firstly stored in the heat capacitive element and is then dissipated from the heat capacitive element to the temperature control object, when the controller determines that the heat capacitive element is required to store heat,
    the controller calculates a target temperature of the heat capacitive element and controls the interrupter based on the target temperature,
    the controller changes the target temperature to be different from each other between a case in which it is determined that the heat storage in the heat capacitive element is required, and a case in which it is determined that the heat storage in the heat capacitive element is not required, and
    the heat capacitive element is a battery capable of storing and supplying electric power, the battery being located upstream or downstream of the heat exchanger in the coolant circuit.

2. The vehicle temperature control apparatus of claim 1, wherein
the first heat dissipation portion is configured to heat the temperature control object by using the refrigerant of the refrigeration cycle, and
the heat exchanger is disposed on a low-pressure side of the refrigeration cycle.

3. The vehicle temperature control apparatus of claim 1, wherein
the first heat dissipation portion is configured to cool the temperature control object by using the refrigerant of the refrigeration cycle, and
the heat exchanger is disposed on a high-pressure side of the refrigeration cycle.

4. The vehicle temperature control apparatus of claim 1, wherein
the second heat dissipation portion dissipates heat stored in the heat capacitive element to the temperature control object without using the refrigerant of the refrigeration cycle.

5. The vehicle temperature control apparatus of claim 4 further comprising:
a switch unit that switches between two modes, one mode that performs heat exchange for transferring heat stored in the heat capacitive element to the refrigerant of the refrigeration cycle by using the heat exchanger, and other mode that dissipates the heat stored in the heat capacitive element to the temperature control object by using the second heat dissipation portion.

6. The vehicle temperature control apparatus of claim 1, wherein
the controller sets the target temperature to be higher in a case in which a storage of a heat energy in the heat capacitive element is determined to be required, as compared with a case in which the storage of the heat energy in the heat capacitive element is determined to be not required.

7. The vehicle temperature control apparatus of claim 1, wherein
the controller sets the target temperature to be lower in a case in which a storage of a cold energy in the heat capacitive element is determined to be required, than a case in which the storage of the cold energy in the heat capacitive element is determined to be not required.

8. The vehicle temperature control apparatus of claim 1, wherein the refrigeration cycle is separate from the cooling circuit.

9. A vehicle temperature control apparatus for controlling temperature of a temperature control object which is at least one of inside air of a vehicle compartment and a vehicle component, the vehicle temperature control apparatus comprising:
a heat capacitive element capable of storing heat;
a refrigeration cycle in which heat is absorbed from a low temperature side and is dissipated to a high temperature side;
a heat exchanger that causes the heat stored in the heat capacitive element to be exchanged with a refrigerant of the refrigeration cycle;
a first heat dissipation portion configured to dissipate heat contained in the refrigerant of the refrigeration cycle to the temperature control object;
an interrupter that interrupts and resumes a heat storage in the heat capacitive element and heat dissipation from the heat dissipation portion to the temperature control object;
a controller that controls the interrupter based on a determination result of heat storage requirement whether the heat capacitive element is required to store heat therein; and
a heat collection portion that collects heat remaining in the vehicle to the heat capacitive element, wherein
the controller controls the interrupter so that heat is firstly stored in the heat capacitive element and is then dissipated from the heat capacitive element to the temperature control object, when the controller determines that the heat capacitive element is required to store heat,
the controller calculates a target temperature of the heat capacitive element and controls the interrupter based on the target temperature,
the controller changes the target temperature to be different from each other between a case in which it is determined that the heat storage in the heat capacitive element is required, and a case in which it is determined that the heat storage in the heat capacitive element is not required;
the interrupter is configured to interrupt and resume heat collection by the heat collection portion, and
the controller controls the interrupter such that heat collection by the heat collection portion is started when an ignition switch of the vehicle is turned off.

10. The vehicle temperature control apparatus of claim 9, wherein
the heat dissipation portion is configured to heat the temperature control object by using the refrigerant of the refrigeration cycle, and
the heat exchanger is disposed on a low-pressure side of the refrigeration cycle.

11. The vehicle temperature control apparatus of claim 9, wherein
the heat dissipation portion is configured to cool the temperature control object by using the refrigerant of the refrigeration cycle, and
the heat exchanger is disposed on a high-pressure side of the refrigeration cycle.

12. The vehicle temperature control apparatus of claim 9 further comprising:
a second heat dissipation portion that dissipates heat stored in the heat capacitive element to the temperature control object without using the refrigerant of the refrigeration cycle.

13. The vehicle temperature control apparatus of claim 12 further comprising:
a switch unit that switches between two modes, one mode that performs heat exchange for transferring heat stored in the heat capacitive element to the refrigerant of the refrigeration cycle by using the heat exchanger, and other mode that dissipates the heat stored in the heat capacitive element to the temperature control object by using the second heat dissipation portion.

14. The vehicle temperature control apparatus of claim 9, wherein
the controller sets the target temperature to be higher in a case in which a storage of a heat energy in the heat capacitive element is determined to be required, as compared with a case in which the storage of the heat energy in the heat capacitive element is determined to be not required.

15. A vehicle temperature control apparatus for controlling temperature of a temperature control object which is at least one of inside air of a vehicle compartment and a vehicle component, the vehicle temperature control apparatus comprising:

a heat capacitive element capable of storing heat;

a refrigeration cycle in which heat is absorbed from a low temperature side and is dissipated to a high temperature side;

a heat exchanger that causes the heat stored in the heat capacitive element to be exchanged with a refrigerant of the refrigeration cycle;

a first heat dissipation portion configured to dissipate heat contained in the refrigerant of the refrigeration cycle to the temperature control object;

an interrupter that interrupts and resumes a heat storage in the heat capacitive element and heat dissipation from the heat dissipation portion to the temperature control object;

a controller that controls the interrupter based on a determination result of heat storage requirement whether the heat capacitive element is required to store heat therein; and a heat collection portion that collects heat remaining in the vehicle to the heat capacitive element, wherein the controller controls the interrupter so that heat is firstly stored in the heat capacitive element and is then dissipated from the heat capacitive element to the temperature control object, when the controller determines that the heat capacitive element is required to store heat, the controller calculates a target temperature of the heat capacitive element and controls the interrupter based on the target temperature, the controller changes the target temperature to be different from each other between a case in which it is determined that the heat storage in the heat capacitive element is required, and a case in which it is determined that the heat storage in the heat capacitive element is not required;

the interrupter is configured to interrupt and resume heat collection by the heat collection portion, and the controller determines whether heat is surplus in the vehicle during a vehicle running time, and controls the interrupter such that heat collection by the heat collection portion is performed even during the vehicle running time when the controller determines that heat is surplus in the vehicle.

16. The vehicle temperature control apparatus of claim 15, wherein
the heat dissipation portion is configured to heat the temperature control object by using the refrigerant of the refrigeration cycle, and
the heat exchanger is disposed on a low-pressure side of the refrigeration cycle.

17. The vehicle temperature control apparatus of claim 15, wherein
the heat dissipation portion is configured to cool the temperature control object by using the refrigerant of the refrigeration cycle, and
the heat exchanger is disposed on a high-pressure side of the refrigeration cycle.

18. The vehicle temperature control apparatus of claim 15 further comprising:
a second heat dissipation portion that dissipates heat stored in the heat capacitive element to the temperature control object without using the refrigerant of the refrigeration cycle.

19. The vehicle temperature control apparatus of claim 18 further comprising:
a switch unit that switches between two modes, one mode that performs heat exchange for transferring heat stored in the heat capacitive element to the refrigerant of the refrigeration cycle by using the heat exchanger, and other mode that dissipates the heat stored in the heat capacitive element to the temperature control object by using the second heat dissipation portion.

20. The vehicle temperature control apparatus of claim 15, wherein
the controller sets the target temperature to be higher in a case in which a storage of a heat energy in the heat capacitive element is determined to be required, as compared with a case in which the storage of the heat energy in the heat capacitive element is determined to be not required.

\* \* \* \* \*